United States Patent [19]
Mahany

[11] Patent Number: 5,696,903
[45] Date of Patent: Dec. 9, 1997

[54] HIERARCHICAL COMMUNICATIONS SYSTEM USING MICROLINK, DATA RATE SWITCHING, FREQUENCY HOPPING AND VEHICULAR LOCAL AREA NETWORKING

[75] Inventor: Ronald L. Mahany, Cedar Rapids, Iowa

[73] Assignee: Norand Corporation, Cedar Rapids, Iowa

[21] Appl. No.: 236,413

[22] Filed: Apr. 29, 1994

Related U.S. Application Data

[63] Continuation-in-part of Ser. No. 197,386, Feb. 16, 1994, abandoned, which is a continuation-in-part of Ser. No. 168,478, Dec. 16, 1993, abandoned, which is a continuation-in-part of Ser. No. 147,377, Nov. 3, 1993, abandoned, which is a continuation-in-part of Ser. No. 101,254, Aug. 3, 1993, abandoned, which is a continuation-in-part of Ser. No. 85,662, Jun. 29, 1993, abandoned, which is a continuation-in-part of Ser. No. 76,340, Jun. 11, 1993, abandoned, which is a continuation-in-part of Ser. No. 62,457, May 11, 1993, abandoned.

[51] Int. Cl.$^6$ ........................................ G06F 17/00
[52] U.S. Cl. ........................................ 395/200.58
[58] Field of Search ........................ 364/514 R, 514 C; 370/85.9; 375/202; 379/58, 59, 60; 455/63, 134; 340/131, 825.44

[56] References Cited

U.S. PATENT DOCUMENTS

| | | | |
|---|---|---|---|
| 4,639,914 | 1/1987 | Winters | 370/85.9 |
| 4,807,222 | 2/1989 | Amitay | 370/85.9 |
| 5,008,883 | 4/1991 | Eizenhofer et al. | 370/95.1 |
| 5,070,536 | 12/1991 | Mahany et al. | 455/63 |
| 5,077,830 | 12/1991 | Mallia | 455/63 |
| 5,245,051 | 9/1993 | Mahany | 375/500 |
| 5,252,979 | 10/1993 | Nyson | 455/63 |
| 5,337,044 | 8/1994 | Folger et al. | 340/825.44 |

Primary Examiner—Ellis B. Ramirez
Attorney, Agent, or Firm—Stanford & Bennett L.L.P.

[57] ABSTRACT

A hierarchical communication system is described in which two wireless local area networks exhibiting substantially different characteristics are employed to link inherently portable or mobile computer devices. A series of radio base stations make up a infrastructure network. The infrastructure network and at least one portable computer device make up the first local area network. The communication on the first local area network is accomplished by spread spectrum frequency hopping communication. A second local area network allows for radio communication between a portable computer device and peripheral devices with built-in transceivers utilized by the portable computer device. The communication in each local area network is controlled by a reservation access communication protocol. The communication protocol facilitates frequency hopping synchronization and supports adaptive data rate selection based upon the quality of communication on the communication channel. The communication protocol prevents interference between communication on the first local area network and communication on the second local area network. In a premises LAN, a series of radio base stations and a backbone LAN make up an infrastructure network. The infrastructure network and at least one mobile computing device make up a higher-power LAN, utilizing a frequency hopping protocol. A lower-power LAN allows for radio communication between a mobile computing device and peripheral devices, utilizing a single-frequency spread spectrum protocol. A vehicular LAN provides for short-range communication between a vehicle terminal and a portable terminal. When out of direct RF range of the premises LAN, the vehicle terminal maintains indirect communication when necessary with the premises LAN via one of several alternate RF channels. A microprocessor, located inside radio units which participate in multiple LAN's, selects the appropriate protocol, frequency band and power level for communicating through the network.

56 Claims, 53 Drawing Sheets

| 10 ms Freq. 1 2466 MHz | 10 ms Freq. 79 2403 MHz | 10 ms ⋯⋯⋯ | 10 ms Freq. 5 2444 MHz | 10 ms Freq. 4 2472 MHz | 10 ms Freq. 3 2417 MHz | 10 ms Freq. 2 2411 MHz | 10 ms Freq. 1 2466 MHz |
|---|---|---|---|---|---|---|---|
| 301 | 301 | 301 | 301 | 301 | 301 | 301 | 301 |

Figure 3a

| 20 ms Freq. 1 2466 MHz | 20 ms Freq. 79 2403 MHz | 20 ms ⋯⋯⋯ | 20 ms Freq. 5 2444 MHz | 20 ms Freq. 4 2472 MHz | 20 ms Freq. 3 2417 MHz | 20 ms Freq. 2 2411 MHz | 20 ms Freq. 1 2466 MHz |
|---|---|---|---|---|---|---|---|
| 303 | 303 | 303 | 303 | 303 | 303 | 303 | 303 |

Freq 1: 2466 MHz — Al. 1 20 ms, Al. 2 20 ms
Freq 2: 2411 MHz — Al. 1 20 ms, Al. 2 20 ms
Freq 3: 2417 MHz — Al. 1 20 ms, Al. 2 20 ms
Freq 5: 2444 MHz — Al. 1 20 ms, Al. 2 20 ms

Freq 1: 2466 MHz — Al. 1 20 ms, Al. 2 20 ms, Al. 3 20 ms, Al. 4 20 ms
Freq 2: 2411 MHz — Al. 1 20 ms, Al. 2 20 ms, Al. 3 20 ms, Al. 4 20 ms

401

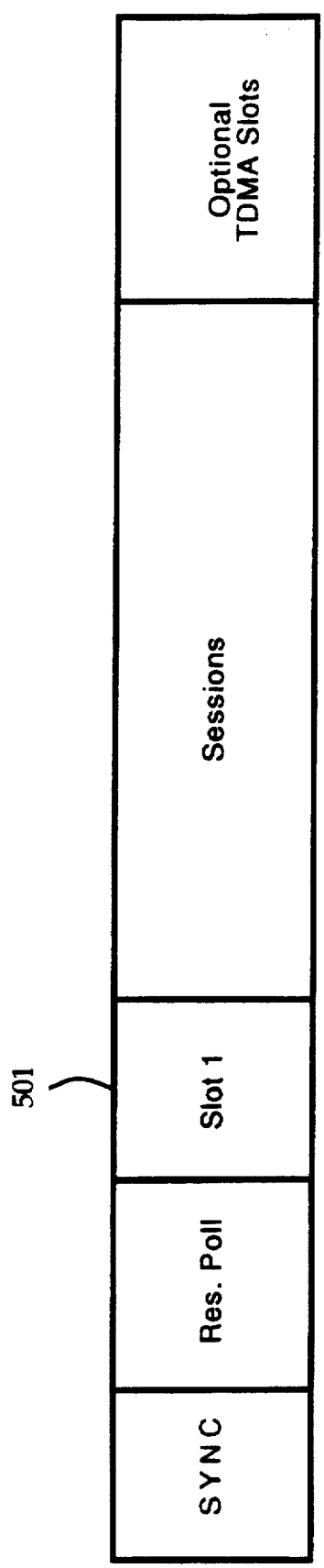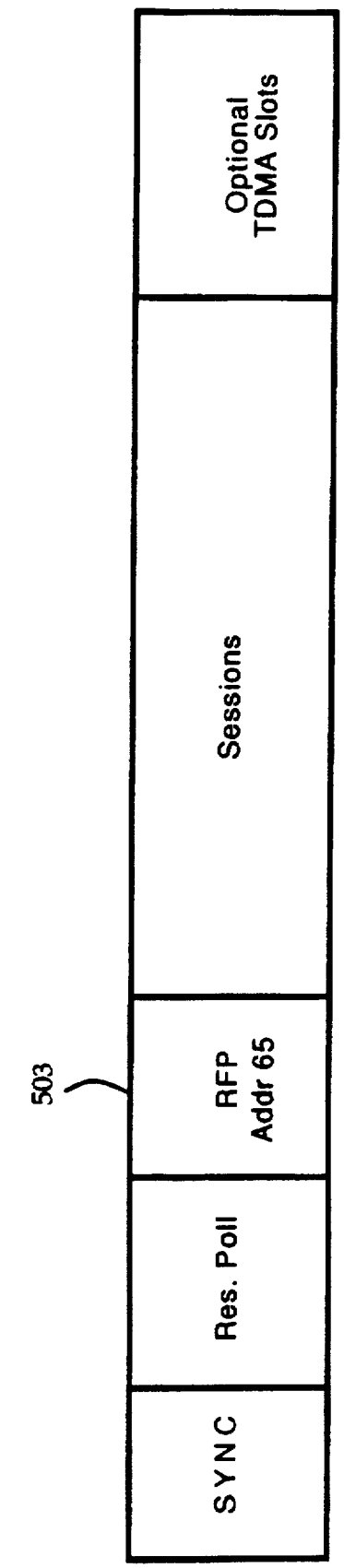
Figure 5a
Figure 5b

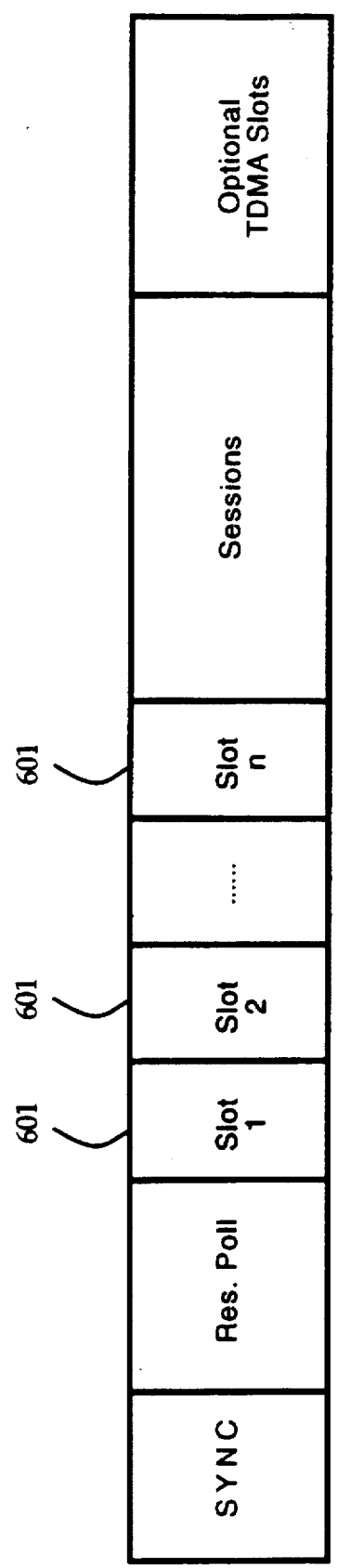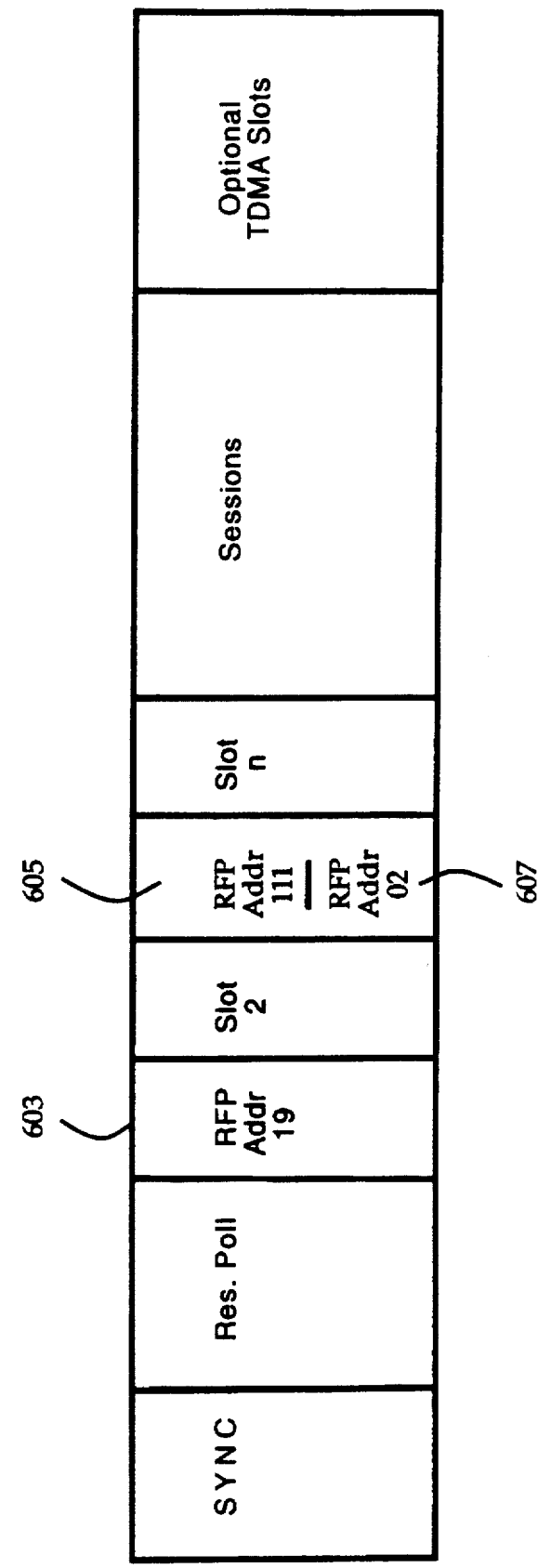

SYNC

| Byte | Content | Definition | |
|---|---|---|---|
| 1 | FLAG | Frame Delimiter | |
| 2 | Dest. Address 1 | Destination Address (SYNC = Broadcast = $FFFF_H$) | |
| 3 | Dest. Address 2 | Destination Address, 2nd Byte | |
| 4 | TYPE | Message Type=SYNC, Priority Sync, or Priority SYNC with HELLO | |
| 5 | Source Address 1 | Control Point Address | |
| 6 | Source Address 2 | Control Point Address, 2nd Byte | |
| 7* | SYSTEM ID | System Identifier (LAN ID) | |
| 8* | NET ID | Net ID | |
| 9* | Command/Status 1 | Control Point Status | |
|  |  | 2 Bits | Control Point Type |
|  |  | 2 Bits | Loading Factor |
|  |  | 1 Bit | Scheduled Service Availability |
|  |  | 3 Bits | Reserved |
| 10* | Command/Status 2 | Scheduled Services | |
|  |  | 5 Bits | Number of Allocated TDMA Time Slots |
|  |  | 3 Bits | Number of Available Time Slots |
| 11* | Random | Randomly Selected Character for Improved Encryption | |
| 12 | CRC 1 | Error Check | |
| 13 | CRC 2 | Error Check | |
| 14 | FLAG | Frame Delimiter | |

*Optionally Encrypted Bytes

Figure 26

Reservation Poll 2700

| Byte | Content | Definition | |
|---|---|---|---|
| 1 | FLAG | Frame Delimiter | |
| 2 | Dest. Address 1 | Destination Address (RES = Broadcast = FFFF$_H$) | |
| 3 | Dest. Address 2 | Destination Address, 2nd Byte | |
| 4 | TYPE | Message Type = RES POLL | |
| 5 | SLOT PARMS | 3 Bits | Number of Slots |
| 6 | | 5 Bits | Probability Factor |
| 7* | Sequence | | Hopping Sequence ID |
| 8* | Index | | Hopping Sequence Index |
| 9* | NET PARMS | 3 Bits | Hop Rate |
| | | 2 Bits | AI's per Hop |
| | | 3 Bits | Reserved |
| 10 | CRC 1 | Error Check | |
| 11 | CRC 2 | Error Check | |
| 12 | FLAG | Frame Delimiter | |

HIERARCHICAL COMMUNICATIONS SYSTEM USING MICROLINK, DATA RATE SWITCHING, FREQUENCY HOPPING AND VEHICULAR LOCAL AREA NETWORKING

CROSS REFERENCE TO RELATED APPLICATIONS (Claiming Benefit Under 35 U.S.C. 120)

This application is a continuation-in-part of U.S. application Ser. No. 08/197,386 filed Feb. 16, 1994, abandoned, by R. Mahany (Attorney Docket No. DN 37998F) which is in turn a continuation-in-part of U.S. application Ser. No. 08/168,478 filed Dec. 16, 1993, abandoned by R. Mahany (Attorney Docket No. DN 37998E) which is in turn a continuation-in-part of U.S. application Ser. No. 08/147,377 filed Nov. 3, 1993, abandoned, by R. Mahany (Attorney Docket No. DN 37998D) which is in turn a continuation-in-part of U.S. application Ser. No. 08/101,254 filed Aug. 3, 1993, abandoned, by R. Mahany (Attorney Docket No. DN 37998C) which is in turn a continuation-in-part of U.S. application Ser. No. 08/085,662 filed Jun. 29, 1993, abandoned, by R. Mahany (Attorney Docket No. DN 37998B) which is in turn a continuation-in-part of U.S. application Ser. No. 08/076,340 filed Jun. 11, 1993, abandoned, by R. Mahany (Attorney Docket No. DN 37998A) which is in turn a continuation-in-part of U.S. application Ser. No. 08/062,457 filed May 11, 1993, abandoned, by R. Mahany (Attorney Docket No. DN 37998).

AUTHORIZATION PURSUANT TO 37 CFR 1.71 (d) (e)

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

EARLIER APPLICATIONS AND PCT PUBLICATIONS

PCT application Ser. No. PCT/U.S.92/08610 Filed Oct. 1, 1992, as published under International Publication No. WO 93/07691 on Apr. 15, 1993.

INCORPORATION BY REFERENCE

The above referred to co-pending and earlier applications and PCT application Ser. No. PCT/U.S.92/08610 filed Oct. 1, 1992, as published under International Publication No. WO 93/07691 on Apr. 15, 1993, together with U.S. Pat. No. 5,070,536, by Mahany et al., U.S. Pat. No. 4,924,426, by Sojka, and U.S. Pat. No. 4,910,794, by Mahany, are incorporated herein by reference in their entirety, including drawings and appendices, and hereby are made a part of this application.

TECHNICAL FIELD

The present invention relates generally to local area networks used for transmitting and receiving information and more particularly to an improved method of hierarchical communications and to a singular radio using multiple communication protocols for servicing corresponding multiple radio local area networks.

BACKGROUND OF THE INVENTION

Single transmitter radio base station hierarchical networks are known and have certain inherent limitations. The use of a single transmitter often results in "dead zones," wherein portable or mobile devices are unable to communicate with the base station. Dead zones may occur when portable or mobile devices roam into coverage areas which are blocked from the base station by physical objects, such as an inner wall, for example, or which result from multipath interference.

Dead zones may also occur when a portable or mobile device simply roams outside of the physical coverage area of the base station. FCC limitations on transmission power prevent a network user from increasing the base station transmitter power to overcome the communication problems associated with dead zones.

Multiple radio base station networks have been developed to overcome a variety of problems with single radio base station networks such as spanning physical radio wave penetration barriers, wasted transmission power by portable computing devices, etc. However, multiple radio base station networks have their own inherent problems. For example, in a multiple base station network employing a single shared channel, each base station transmission is prone to collision with neighboring base station transmissions in the overlapping coverage areas between the base stations. Therefore, it often proves undesirable for each base station to use a single or common communication channel.

In contradistinction, to facilitate the roaming of portable or mobile devices from one coverage area to another, use of a common communication channel for all of the base stations is convenient. A roaming device may easily move between coverage areas without loss of connectivity to the network.

Such exemplary competing commonality factors have resulted in tradeoff decisions in network design. These factors become even more significant when implementing a frequency hopping spread spectrum network. Frequency hopping is a desirable transmission technique because of its ability to combat frequency selective fading, avoid narrowband interference, and provide multiple communications channels.

Again however, changing operating parameters between coverage areas creates difficulties for the roaming devices which move therebetween. In particular, when different communication parameters are used, a portable or mobile device roaming into a new base station coverage area is not able to communicate with the new base station without obtaining and synchronizing to the new parameters. This causes communication backlog in the network.

Moreover, even when a radio frequency network is established to cover the premises of a building or group of buildings, certain types of communication flow between certain types of devices make for inefficient use of such a network. In fact, an ordinarily efficient network configuration may be deemed intolerable in certain communication scenarios.

Computer terminals and peripheral devices are widely used. Many types of computer terminals exist which vary greatly in terms of function, power and speed. Many different types of peripheral devices also exist, such as printers, modems, graphics scanners, text scanners, code readers, magnetic card readers, external monitors, voice command interfaces, external storage devices, and so on.

Computer terminals have become dramatically smaller and more portable, as, for example, lap top computers and notebook computers. Computer terminals exist which are small enough to be mounted in a vehicle such as a delivery truck or on a fork lift. Hand held computer terminals exist which a user can carry in one hand and operate with the other.

Typical computer terminals must physically interface with peripheral devices. Thus, there must either be a cable running from the computer terminal to each peripheral device, or the computer terminal must be docked with the device while information transfer takes place.

In an office or work place setting, the physical connection is typically done with cables. These cables pose several problems. For example, many cables are required in order for a computer terminal to accommodate many peripheral devices. In addition, placement of peripheral devices is limited by cable lengths. While longer cables may be used, they are costly. Additionally, there may be a limited number of ports on a computer terminal, thus limiting the number of peripherals that may be attached.

Another problem arises when several computer terminals must share the same peripheral device, such as a printer. All of the computers must be hardwired to the printer, which may create a protocol problem if the computer terminals are of different types.

Peripheral cabling is an even greater problem in scenarios where hand-held and portable computer terminals are used. The cabling required for an operator to carry a hand-held computer terminal in one hand, have a small portable printer attached to his belt, and carry a code reader in the other hand is cumbersome and potentially even dangerous. For example, such an operator loses a great deal of mobility and flexibility while supporting a number of cabled devices. In addition, as cables wear out and break, exposed electric current could shock the operator, or create a spark and potentially cause a fire or explosion in some work areas.

The requirement of physically connecting the computer terminals and peripherals severely reduces the efficiency gained by making the devices smaller. An operator must somehow account for all of the devices in a system and keep them all connected. This can be very inconvenient. For example, an operator having a notebook computer and a modem in a briefcase may wish to have the freedom to move around with the computer but without the modem. He may, for example, wish to work at various locations on a job sight and at various times transmit or receive information via his modem. If the modem and the computer are hard wired together, he must either carry the modem with him or keep connecting and disconnecting it.

Furthermore, cabling can be expensive because cables frequently prove to be unreliable and must be replaced frequently. In portable environments, cables are subject to frequent handling, temperature extremes, dropping and other physical trauma. It is not uncommon for the cables or the connectors for the cables on the devices to need replacing every three months or so.

Attempts to alleviate or eliminate these problems have been made but have not been entirely successful. One solution is to incorporate a computer terminal and all of the peripherals into one unit. However, this solution proves unsatisfactory for several reasons. For example, the incorporation of many devices into one unit greatly increases the size and weight of the unit, thus jeopardizing its portability. Furthermore, incorporating all of the functions into one unit greatly reduces and, in most cases eliminates, the flexibility of the overall system. A user may only wish to use a hand-held computer terminal at times, but at other times may also need to use a printer or occasionally a code reader. An all-incorporated unit thus becomes either overly large because it must include everything, or very limiting because it does not include everything.

Another solution has been to set up Local Area Networks (LAN's) utilizing various forms of RF (Radio Frequency) communication. The LAN's to date, however, have been designed for large scale wireless communications between several portable computer terminals and a host computer. Therein, the host computer, itself generally a stationary device, manages a series of stationary peripherals that, upon requests to the host, may be utilized by the portable terminals. Other large scale wireless communications have also been developed which provide for RF communication between several computer terminals and peripheral devices, but have proven to be ineffective as an overall solution. For example, these systems require the peripheral devices to remain active at all times to listen for an occasional communication. Although this requirement may be acceptable for stationary peripheral devices receiving virtually unlimited power (i.e., when plugged into an AC outlet), it proves detrimental to portable peripherals by unnecessarily draining battery power. Similarly, in such systems, the computer terminals are also required to remain active to receive an occasional communication not only from the other terminals or the host, but also from the peripherals. Again, often unnecessarily, battery power is wasted.

In addition, such large scale systems are designed for long range RF communication and often require either a licensed frequency or must be operated using spread spectrum technology. Radios in such systems are typically cost prohibitive, prove too large for convenient use with personal computers and small peripheral devices, and require a great deal of transmission energy utilization.

Furthermore, these systems do not provide for efficient communication between portable computer devices and peripherals. For example, a portable computer device may be mounted in a delivery truck and a driver may desire to transmit data to, or receive data from, a host computer or peripheral device at a remote warehouse location. While permitting such transmission, such wide area networks (WANs) only provide point-to-point communications, use a narrow bandwidth, and often have heavy communication traffic. As a result, WANs are generally slow and expensive and simply do not provide an effective overall solution.

Additionally, in order for a computer device to be effectively portable in these systems, it must be capable of participating on any number of LANs operating with different communication parameters and protocols. Thus, each portable computer device requires a plurality of built-in radio transceivers, one to accommodate each of such LANs. As a result, portable computer devices can become costly, excessively large, heavy, and power hungry.

Thus, there is a need for a radio frequency communication system and associated radio that supports the use of network peripherals and solves the foregoing problems relating to power conservation and portability.

DISCLOSURE OF THE INVENTION

A hierarchical communication network wherein communication with roaming portable or mobile devices is expedited by advising the portable or mobile devices of the communication parameters of neighboring base stations. Specifically, neighboring base stations operating with different communication parameters communicate among themselves their respective communication parameters. Each base station advises its attached roaming devices of the communication parameters of its neighboring base stations to facilitate the movement of the roaming device among base station coverage areas.

These communication parameters may include the addresses of and the cost of connection through the neighboring base stations, their channel frequency hopping sequences, their channel frequencies, and their spread spectrum parameters.

The hierarchical network of the present invention provides wireless peripheralization of mobile computer devices and data collection devices. The mobile computer devices communicate over an extended area via a first local area network. The first local area network is a high power radio communications system. Each mobile computer device can communicate with peripheral devices via a second local area network. The second local area network is a lower power wireless communications system such as a Microlink Local Area Network.

A mobile computer device, also called the parent device, and its peripherals communicate within a limited area utilizing a low power local area network while the low power local area network is capable of moving within an independent wireless network that provides coverage over a much broader service area. Thus, the hierarchical communications system is actually two independent wireless communications networks, with an intelligent member, the parent device, which is common to both and which selectively processes and controls the flow of information between devices connected to the two respective networks.

The present invention is capable of operation within Local Area Radio Networks ("LAN"). Mobile computers or data collection devices and peripherals operate within a building, or campus of buildings serviced by a wireless LAN. Devices that are constituents of the Premises Wireless Local Area Network ("WLAN") may also contain facilities (transceivers and protocols) for communicating with their peripherals via the separate low power, short range microlink radio LAN. The parent device contains significant processing power, such that information received from various peripherals and other user input means, such as a keyboard attached to the parent unit, is combined to form a message that is communicated over the wider area Premises WLAN. Information received from peripherals is selectively communicated over the Premises WLAN in accordance with an application program, emulation mode, or operating system resident in the parent device.

Likewise, information received from the Premises WLAN may be processed and selectively forwarded to a peripheral. For example, a record received through the WLAN may be combined with information obtained locally through another peripheral or user input means and processed by a local application to generate an invoice or shipping document that is then sent wirelessly to a portable printer peripheral.

The parent device may enable communication between peripheral devices within the microlink service area. This communication may be forwarded through the parent device, or direct, peer to peer communications between peripherals may occur. The former will occur if the peripherals are within communication range of the parent but not each other, or if other system design constrains, such as power management dictate a centralized coordination function for power management or data transfer efficiency.

The present invention is also capable of operation within Wide Area Radio Networks (WAN's). Vehicular, mobile data communications applications are currently serviced by a variety of public and common carrier radio WAN's that provide connectively to computer resources anywhere in the world. The radio WAN's are generally bandwidth limited, and users are charged for service on the basis of the amount of data transferred. There is therefore sound economic justification for controlling the amount of information conveyed over the wide are network.

The hierarchical network provides means of connecting a group of devices with data intensive information transfer requirements within a localized area of operations, to a data service network that allows data exchange with devices located at arbitrary distances removed. Local area operations can be carried out using radio spectrum that is not subject to airtime fees. The intelligence of the parent device is key in processing information generated locally and passing only essential information through the radio WAN to minimize cost of use. Information that is not time critical may be selectively processed and stored for later batch downloading through wired modems or wireless communication with a docking station located at a depot or central office.

The autonomous operation of the local area network allows it to continue to function when it is out of range of the WAN, when the WAN is inaccessible during peak usage periods, or when economics dictate that WAN communication is unjustified.

The network and associated radio of the present invention provides wireless peripheralization of roaming computing devices and data collection devices. The roaming computing devices communicate over an extended area via a first local area network. The first local area network is a high power radio communications system. Each mobile computer device can communicate with peripheral devices via a second, low-power local area network. Additionally, the roaming computing device, also called the parent device, and peripherals may communicate within a limited area while moving within an independent wireless network that provides coverage over a much broader service area. Thus, the communications system comprises at least two independent wireless networks, with the parent device participating in the multiple networks by selectively processing and controlling the flow of information among devices connected to the multiple networks.

In some embodiments, roaming computing or data collection devices and their peripherals communicate within a building or group of buildings serviced by a wireless LAN, hereinafter called a premises LAN. Devices that are constituents of the premises LAN may also contain facilities (transceivers and protocols) for communicating with their peripherals via the separate low power, short range radio LAN, hereinafter a peripheral LAN or MicroLAN. The parent device contains significant processing power, such that information received from various peripherals and other user input means, such as a keyboard attached to the parent unit, is combined to form a message that is communicated over the premises LAN. Information received from peripherals is selectively communicated over the premises LAN in accordance with an application program, emulation mode, or operating system resident in the parent device.

Likewise, information received from the premises LAN may be processed and selectively forwarded to a peripheral. For example, a record received through the premises LAN may be combined with information obtained locally through another peripheral or user input means and processed by a local application to generate an invoice or shipping document that is then sent wirelessly to a portable printer peripheral.

The parent device may also enable communication among peripheral devices within the peripheral LAN service area. Such communication may be either forwarded from source to destination peripherals through the parent device, or directly exchanged (peer to peer communications). The former occurs if the peripherals are within communication range of the parent but not each other, or if other system design constraints, such as power management dictate a centralized coordination function for power management or data transfer efficiency.

The present invention is also capable of operation within radio Wide Area Networks (WAN's). Vehicular based data communication is currently serviced by a variety of public and common carrier radio WAN's that provide connectivity to computer resources anywhere in the world, such as RAM Mobile Data, ARDIS, MPEL, data PCS, SMR, etc. The radio WAN's are generally bandwidth limited, and users are charged for service on the basis of the mount of data transferred. The hierarchical network provides means of connecting a premises LAN with a group of remote devices via a radio WAN so as to minimize the expense and delays of such radio WAN's.

For example, communication between a parent device or radio terminal mounted in a vehicle, hereinafter a "vehicle terminal", and hand-held mobile terminal(s) that roam in an area local to the vehicle can be carded out using radio communication not subject to air time fees. Hereinafter, the network formed by the vehicle terminal and associated hand-held terminal(s) is referred to as a "vehicular LAN".

The intelligence of the parent device, in the previous example a vehicle terminal, is key in processing information generated locally in the vehicular LAN and passing only essential information through the radio WAN to minimize cost of use. Information that is not time critical may be selectively processed and stored for later batch downloading via the premises LAN using hard-wired modems or wireless communication at a docking station located at a depot or central office.

The autonomous operation of the vehicular LAN allows it to continue to function when it is out of range of the WAN, when the WAN is inaccessible during peak usage periods, or when economics dictate that WAN communication is unjustified.

The present invention relates generally to local area networks and, more specifically, to a communication system for maintaining connectivity between devices on networks which have different operating parameters while limiting the power drain of battery powered devices.

In addition, a roaming computing device may have a single radio unit which has a control processor, memory, and a transceiver. The transceiver is capable of participating in at least a first and second local area network which operate using a first and second communication protocol, respectively. The radio unit may participate as a slave to the first network pursuant to the first protocol and as a master to the second network pursuant to the second protocol, and the control processor resolves conflicts between the first and second protocols.

In a further embodiment of the present invention, the control processor causes the radio unit to enter a state of low power consumption when the radio unit is not communicating on either the first or second network.

An object of the present invention is to provide a hierarchical communications system.

Another object of the invention to provide a method and apparatus wherein collisions are minimized in overlapping coverage areas in a multiple base station network while providing a seamless communication network to support roaming devices.

Yet another object of the invention to provide a method and apparatus wherein collisions are minimized in overlapping coverage areas by utilizing uncommon communication channel characteristics in a multiple base station network, while still providing seamless communication for roaming devices by informing roaming devices of the nature of the neighboring base station communication channel characteristics.

A still further object of the invention to provide a communication network wherein base stations communicate with roaming devices to help conserve transmission power usage.

A further object of the present invention is to provide a hierarchical communications system utilizing spread spectrum frequency hopping communication.

A still further object of the present invention is to provide a hierarchical communications system utilizing selective data baud rate switching.

Other objects, advantages, and novel features of the present invention will become apparent from the following detailed description of the invention when considered in conjunction with the accompanying drawings.

BRIEF DESCRIPTION OF THE DRAWINGS

FIGS. 3A and 3B illustrate the frequency of operation periodically changing corresponding to access interval boundaries in a frequency hopping communication system of the present invention.

FIGS. 4A and 4B illustrate more than one access interval being used per hop in a frequency hopping communication system of the present invention.

FIG. 5A illustrates an embodiment of an access interval used by the hierarchical network of the present invention wherein a reservation phase is Idle Sense Multiple Access.

FIG. 5B illustrates an embodiment of an access interval used by the hierarchical network of the(present invention wherein a device response follows a reservation poll.

FIG. 6A illustrates an embodiment of an access interval used by the hierarchical network of the present invention having multiple reservation slots for transmission of a Request For Poll.

FIG. 6B illustrates an embodiment of an access interval used by the hierarchical network of the present invention wherein general devices are contending for channel access.

FIG. 26 illustrates the information contained in a sample SYNC message;

FIG. 27 illustrates the information contained in a sample Reservation Poll;

DETAILED DESCRIPTION OF THE INVENTION

Figure 1A:
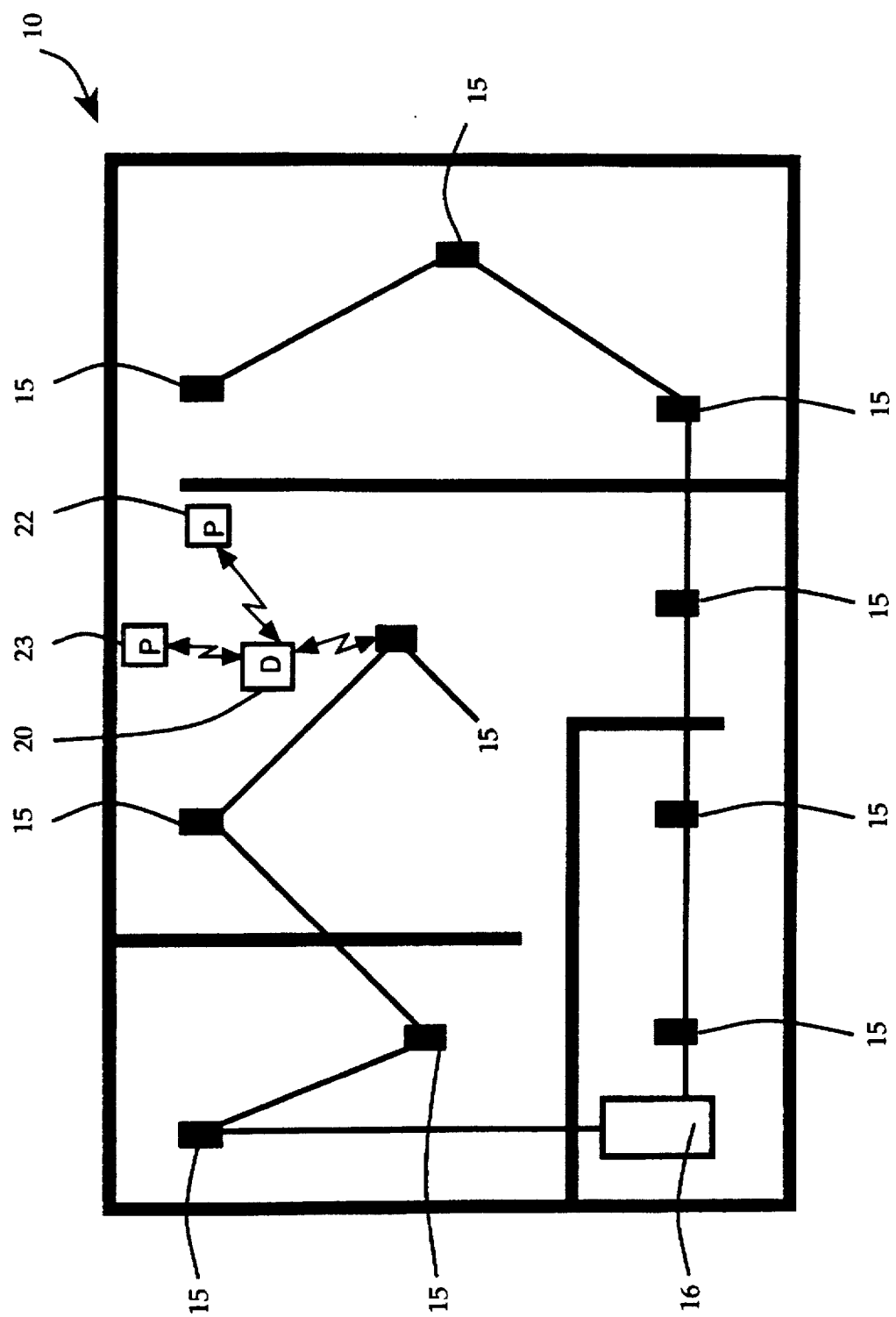
FIG. 1A is a diagrammatic illustration of a hierarchal communication system built in accordance with the present invention.

Referring now to the drawing wherein like reference numerals designate identical or corresponding pans throughout the several views, FIG. 1A shows a hierarchal communication system (10) built in accordance with the present invention. In the hierarchal communication system (10), a first local area network includes a infrastructure network comprising of radio base stations (15) and a data base sewer (16) which may be part of a more extensive, wired LAN. A portable or mobile computer device (20) such as a hand held computer terminal or vehicle mounted computer terminal includes a radio transceiver for communicating with the radio base stations (15). Thus, a computer device (20) can communicate with the data base sewer (16) or other computer devices via the radio base stations (15). The radio base stations (15) which make up the infrastructure network can either be wired together directly or communicate by means of radio frequency. The radio base stations (15), the data base server (16) and any portable or mobile computer devices (20) operating within the infrastructure network comprise the first local area network.

Communication between the radio base stations (15) and the computer device (20) utilizes spread spectrum frequency hopping communication and is controlled by a reservation access communications protocol. The communication protocol facilitates frequency hopping and supports adaptive data rate selection. The data rate is selected based upon the quality of communication on the communication channel.

A second local area network is formed between the computer device (20) and at least one peripheral device (22) such as in a Microlink Network (described below).

The peripheral devices (22) may be printers, bar code scanners, magnetic card readers, input stylus, etc. Each peripheral device 22 has a built-in radio transceiver to communicate with the computer device 20. The communication between the computer device (20) and the peripheral devices (22) is also controlled by the reservation access communication protocol. The reservation access communication protocol prevents interference between communication on the first local area network and communication on the second local area network (e.g. the Microlink Network).

A Microlink Network is, generally, a short range local area network consisting of a portable/mobile device and one or more peripherals. Peripherals are often slaved to a single portable/mobile device, but may be shared by two or more. A Microlink Network replaces cabled connection between a portable/mobile device and associated peripherals. In a preferred embodiment, the Microlink Network is a single frequency low power network operating at 2.400 to 2.483 GHz under 15.249 of the United States Federal Communications Commissions (FCC) rules. The FCC regulations allow unlicensed communications at effective radiated power levels of approximately 500 microwatts or less.

The Microlink Network is intended to provide communications between two or more devices operating within near proximity, e.g., distances of a few tens of feet. Constituents of this LAN are generally devices that do not require access to resources outside their immediate group, or which can suffice with indirect access through one member (parent) of the Microlink Network that has access to the first LAN. For example, a central control or processing device connected to the first LAN may direct the activities of one or more of the peripheral devices (22). Alternatively, the second LAN may provide a short range wireless connection with a device connected to the first LAN to facilitate electronic data interchange in conformance with standards such as DEX/UCS, without the need for mechanical docking mechanisms or cables.

The characteristics of the second LAN permit it to use radio transceiver of lower cost, lower power consumption, and generally more simplistic operation than permitted by the first LAN. However, the similarities between the first and second LAN are such that a device constructed for operation on the first LAN can include features, such as a means of reducing transmitter power, which will allow it to operate on the second LAN with minimal additional cost or size. This allows a device to communicate within both types of LAN's through a single transceiver.

Figure 1B:
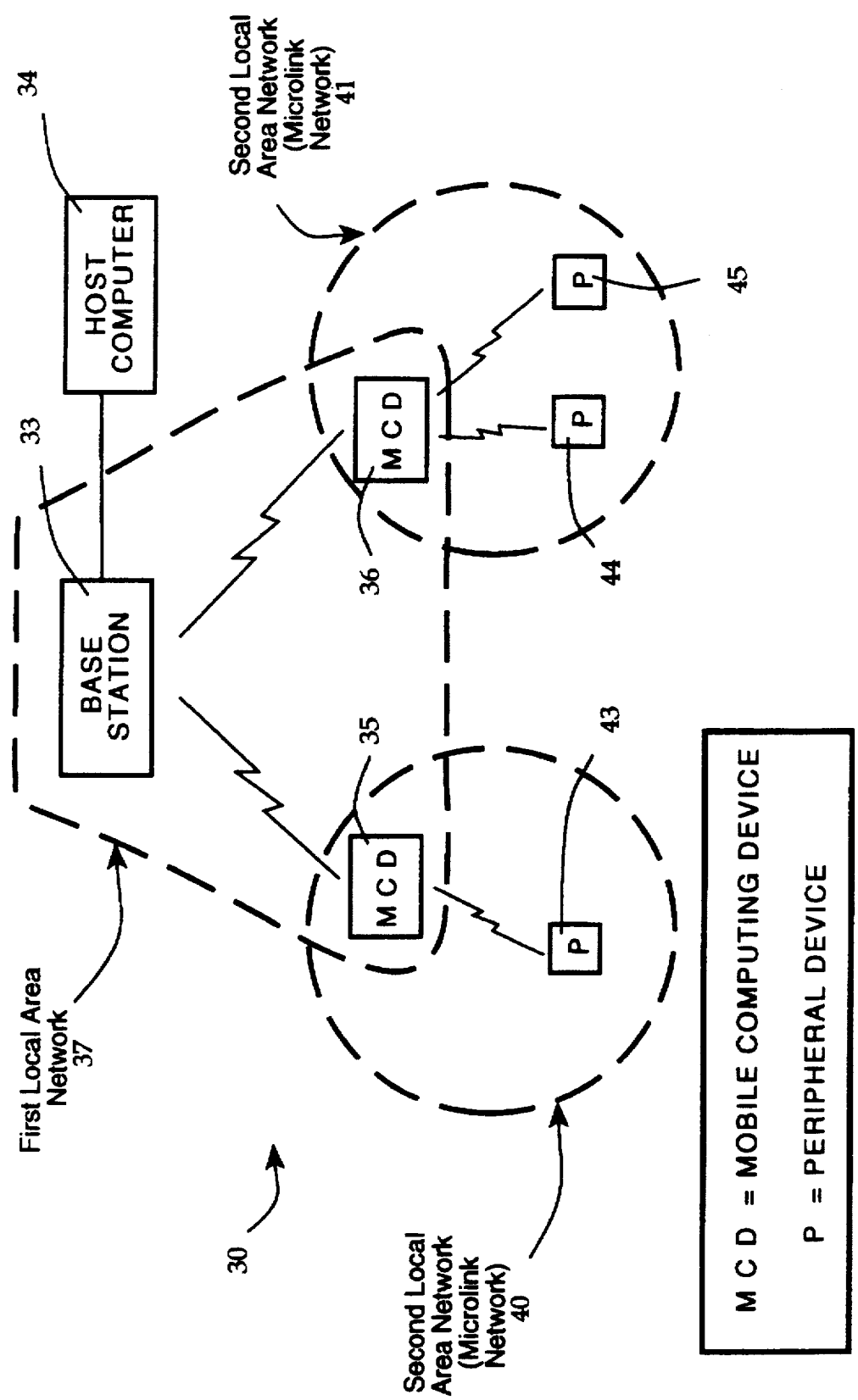
FIG. 1B is a diagrammatic illustration of another hierarchal communication system built in accordance with the present invention.

Referring to FIG. 1B, a small hierarchal communication system (30) built in accordance with the present invention is shown. A base station (33) and two mobile computing devices (35 and 36), or parent devices, form the first local area network (37). The first local area network 37 is also called A Premises Wireless Local Area Network. The first local area network (37) allows communication between the mobile computing devices (35 and 36) and a host computer (34). The mobile computing devices (35 and 36) can roam anywhere within the range of the base station (33) and still communicate with the host computer (34) via the first local area network (37).

Two second local area networks (40 and 41) allow for wireless communication between each mobile computing device (35 and 36) and its respective peripheral devices (43, 44 and 45) when the mobile computing device is not communicating on the first local area network (37). The second local area networks are also called Microlink Networks. The first Microlink Network (40) is made up of the mobile computing device (35) and the peripheral device (43). The second Microlink Network (41) is made up of the mobile computing device (36) and the two peripheral devices (44 and 45).

Figure 1C:
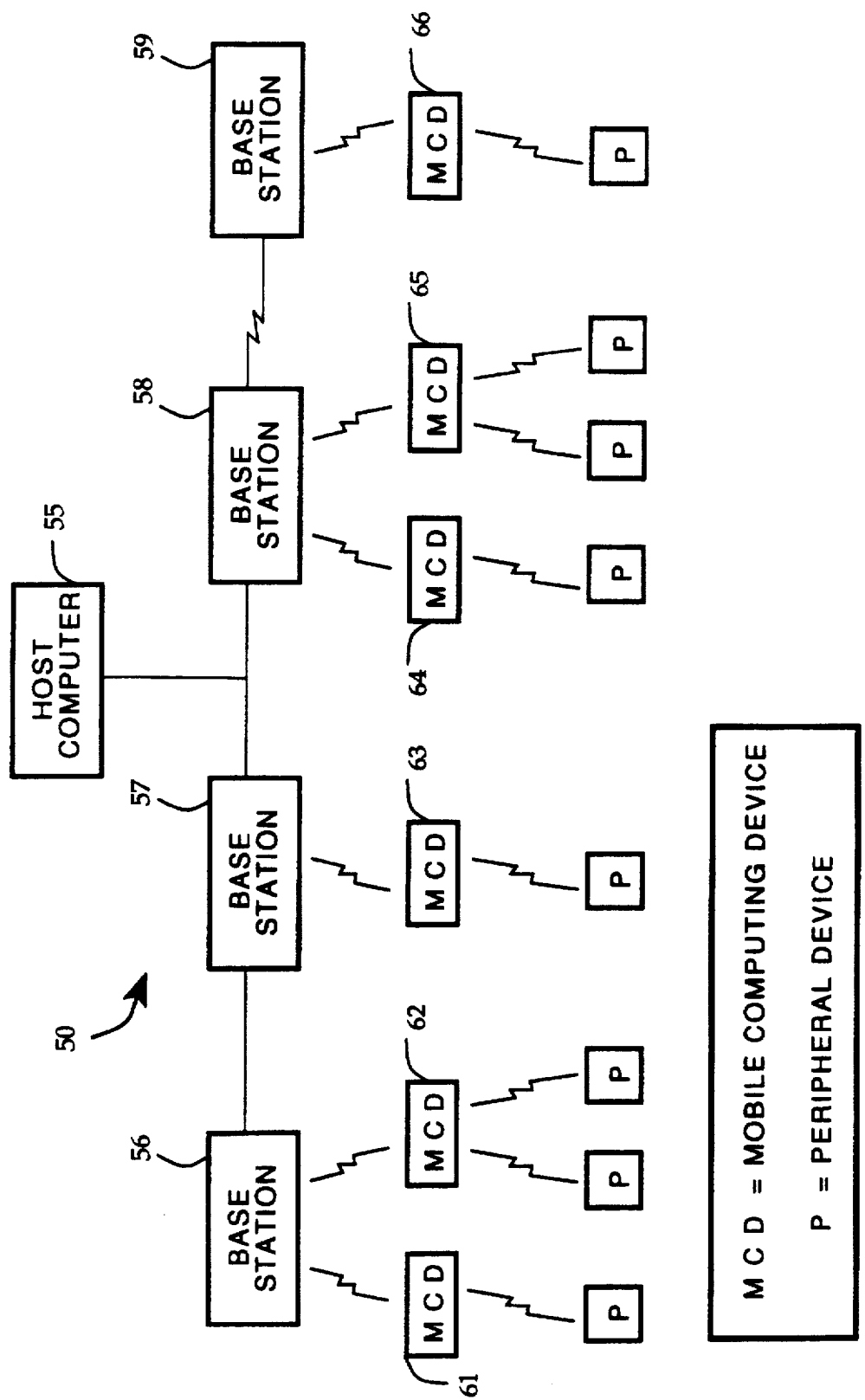
FIG. 1C is a diagrammatic illustration of still another hierarchal communication system built in accordance with the present invention.

Referring to FIG. 1C, a larger hierarchal communication system (50) built in accordance with the present invention is shown. The host computer (55), which could be pan of a network, is connected to several base stations (56, 57, 58 and 59) which allows for the area covered by the first local area network to be much larger, all of the base stations need not be hard wired together. In the present embodiment, base station (59) communicates with the other base stations (56, 57 and 58), and therefore ultimately with the host computer (55), via wireless communication. Each base station (56, 57, 58 and 59) can support multiple mobile computing devices. All of the base stations and all of the mobile computing devices make up the first local area network.

Each base station operates with a different set of communication parameters. For example, each base station may use a different frequency hopping sequence. Additionally, different base stations may not employ a common master clock and will not be synchronized so as to have the frequency hopping sequences start at the same time.

Mobile computing devices (61, 62, 63, 64, 65 and 66) are capable of roaming into the vicinity of any of the base stations (56, 57, 58 and 59) and connecting thereto. For example, mobile computing device (62) could roam into the coverage area of base station (57), and could disconnect from base station (56) and connect to base station (57), without losing connectivity in the overall network.

Each mobile computing device (61, 62, 63, 64, 65 and 66) is the parent device in a second local area network, or Microlink Network. Each second local area network is made up of the parent device and its peripheral devices. The first local area network and each second local area network are independent local area networks, with each mobile computing device (61, 62, 63, 64, 65 and 66) having significant processing intelligence such that it is common to both its second local area network and the first local area network, and can provide means to communicate between networks.

Figure 2:
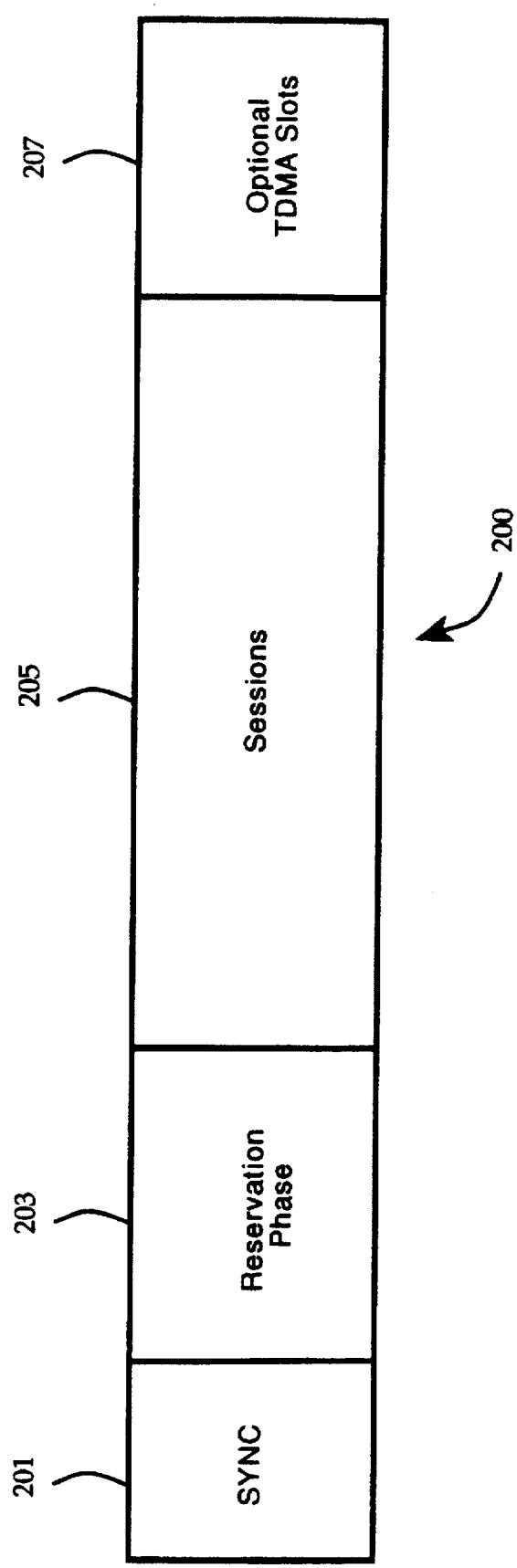
FIG. 2 illustrates an embodiment of a basic access interval structure used by a hierarchical network of the present invention.

FIG. 2 illustrates an embodiment of a basic Access Interval (200)"AI") structure used by the hierarchical network in the present invention. Generally, an Access Interval is the basic communication unit, a fixed block of time, that allocates bandwidth to synchronization, media access, polled communications, contention based communications, and scheduled services. The Access Interval in FIG. 2 includes a SYNC header (201) generated by a Control Point ("CP") device of a NET. The term NET describes a group of users of a given hopping sequence or a hopping sequence itself. The Control Point device is generally the base station (15) referenced above with regard to FIG. 1. The SYNC header (201) is used by constituents of the NET to attain and maintain hopping synchronization. A reservation phase (203) follows permitting a reservation poll, which provides the NET constituents an opportunity to gain access to media. A sessions frame (205) is next allocated for communication protocol. A frame (207) follows for optional time division multiple access ("TDMA") slots in order to accommodate scheduled services. Scheduled services, for example, real time voice or slow scan video, are such that they require a dedicated time slot to provide acceptable quality of service. The function of frames (201, 203, 205 and 207) will be discussed in greater detail below.

Figure 21:
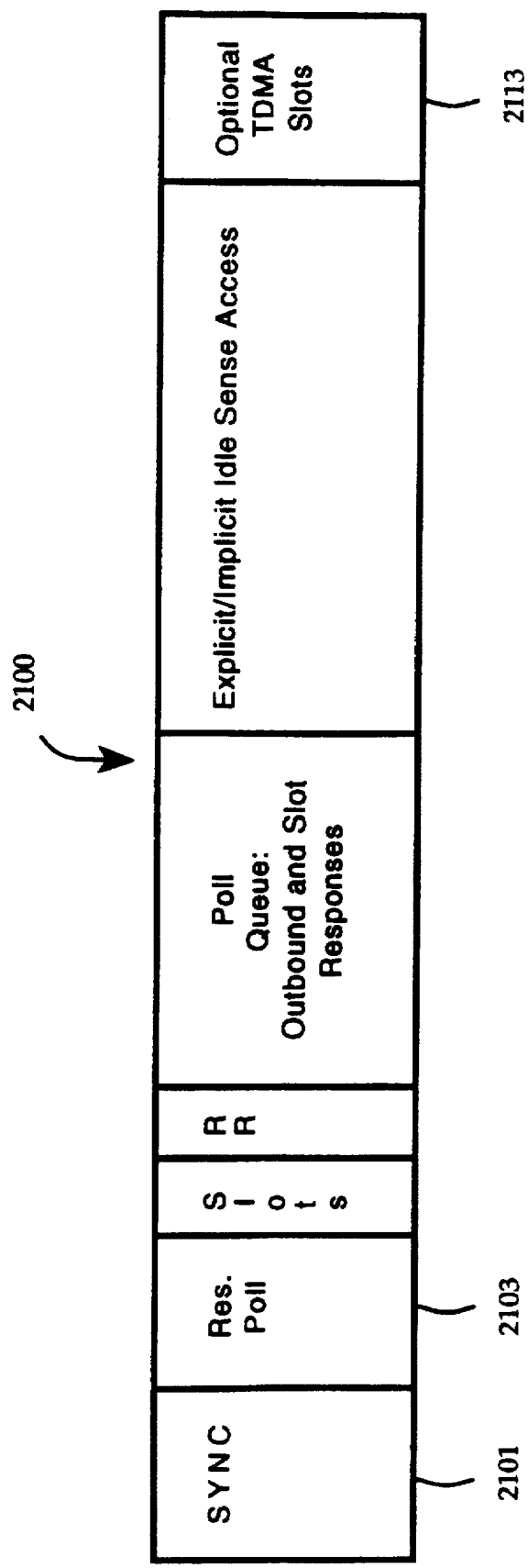
FIG. 21 illustrates a sequence in an access interval used by the hierarchical network of the present invention with the Time Division Multiple Access slots positioned at the end of the access interval.

As was shown in FIG. 2, FIG. 21 illustrates a sequence in an access interval (2100) used by the hierarchical network of the present invention with the Time Division Multiple Access slots (2113) positioned at the end of the access interval (2100). In present example, if this were also a HELLO interval, the HELLO would immediately follow the SYNC (1201). Location of the Time Division Multiple Access slots at such a position provides certain advantages including, for example, (1) the SYNC (2101), HELLO (not shown), Reservation Poll (2103), may all be combined into a single transmission (concatenated frames); (2) hopping information may be moved to or included in the Reservation Poll (2103) allowing for a shorter preamble in the SYNC (2101); and (3) the HELLO messages will occur early in the Access Interval (2100) providing for shorter receiver on times for sleeping terminals.

Figure 22:
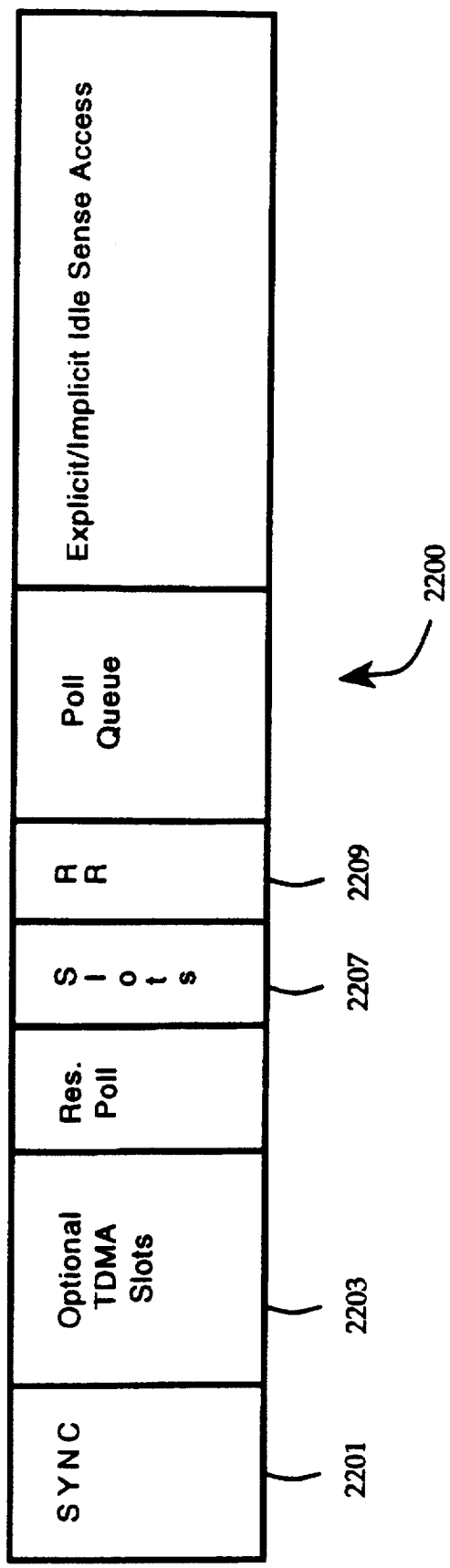
FIG. 22 illustrates a sequence in an access interval used by the hierarchical network of the present invention with the Time Division Multiple Access slots positioned immediately following the SYNC.

The Time Division Multiple Access slots may also be located at different points within the access interval. Positioning the Time Division Multiple Access slots allow for various systemic advantages. Referring now to FIG. 22, an access interval (2200) is illustrated showing the Time Division Multiple Access slots (2203) immediately following the SYNC (2201). Location of the Time Division Multiple Access slots (2203) at this position provides certain advantages including, for example, (1) better timing accuracy is achieved when the Time Division Multiple Access slots (2203) immediately follow the SYNC (2201); (2) Session Overruns do not interfere with the Time Division Multiple Access slots (2203); (3) devices which do not use the Time Division Multiple Access slots (2203) do not necessarily need to be informed of the Time Division Multiple Access slot allocation; and (4) HELLO message may follow Time Division Multiple Access slots (2203), Reservation Slots (2207) or Reservation Resolution Poll (2209).

Figure 23:
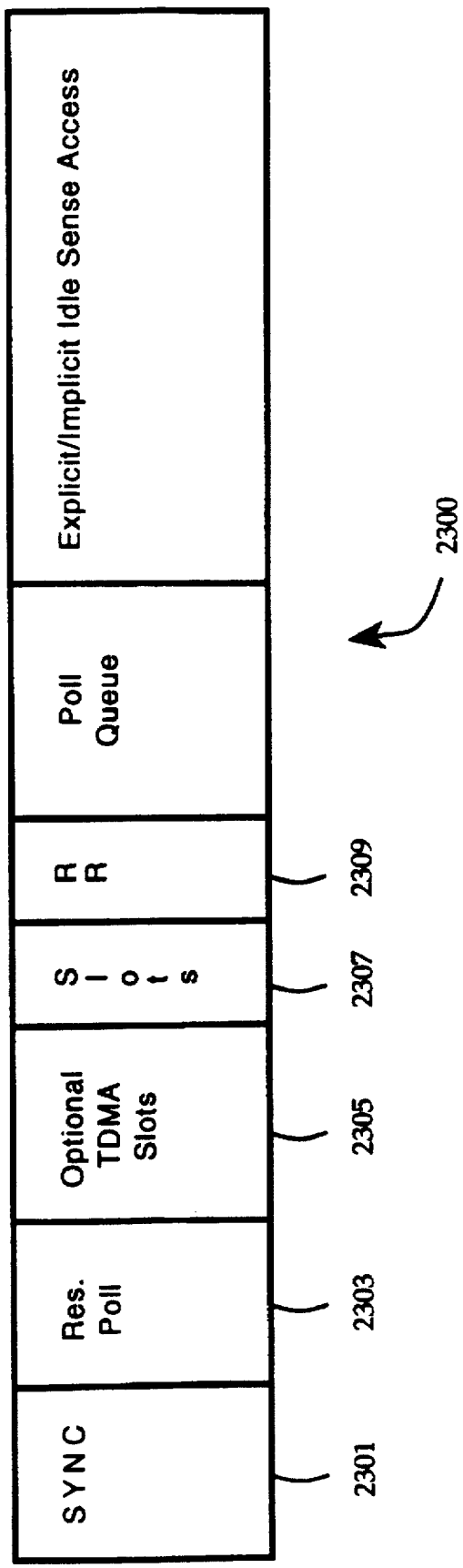
FIG. 23 illustrates a sequence in an access interval used by the hierarchical network of the present invention with the Time Division Multiple Access slots positioned immediately following the SYNC and Reservation Poll.

Referring now to FIG. 23, an access interval (2300) is illustrated showing the Time Division Multiple Access slots (2305) immediately following the SYNC (2301) and the Reservation Poll (2303). In the present example, if this were a HELLO interval, a HELLO message would immediately follow the Reservation Resolution Poll (2309).

Location of the Time Division Multiple Access slots (2305) at the position shown in FIG. 23 provides certain advantages including, for example, (1) the Time Division Multiple Access slot timing is keyed to SYNC (2301) for better accuracy; (2) the number of Time Division Multiple Access slots (2305) may be indicated in SYNC (2301) or the Reservation Poll (2303), providing greater flexibility; (3) Session frame overruns do not interfere with Time Division Multiple Access slots (2305); (4) only one maintenance transmission is required per Access Interval (2300); and (5) hopping information may be moved to or included in the Reservation Poll (2303), permitting a shorter preamble in SYNC (2301).

In the access interval (2300) configuration shown in FIG. 23, it is possible that the Time Division Multiple Access slots (2305) and the response slots (2307) could be the same. The Reservation Poll (2303) would allocate the correct number of slots and indicate which are reserved for Time Division Multiple Access. For example, to use Idle Sense Multiple Access (1 slot) with 1 inbound and 1 outbound Time Division Multiple Access slots, three slots would be allocated with the first two slots reserved. The appropriate Time Division Multiple Access slot duration is 80 bits at a hop rate of 200 hops per second which is just about the expected duration of a Request for Poll. At slower hop rates, multiple slots could be allocated to Time Division Multiple Access allowing the Time Division Multiple Access slot duration to be constant regardless of hop rate.

Figure 24:
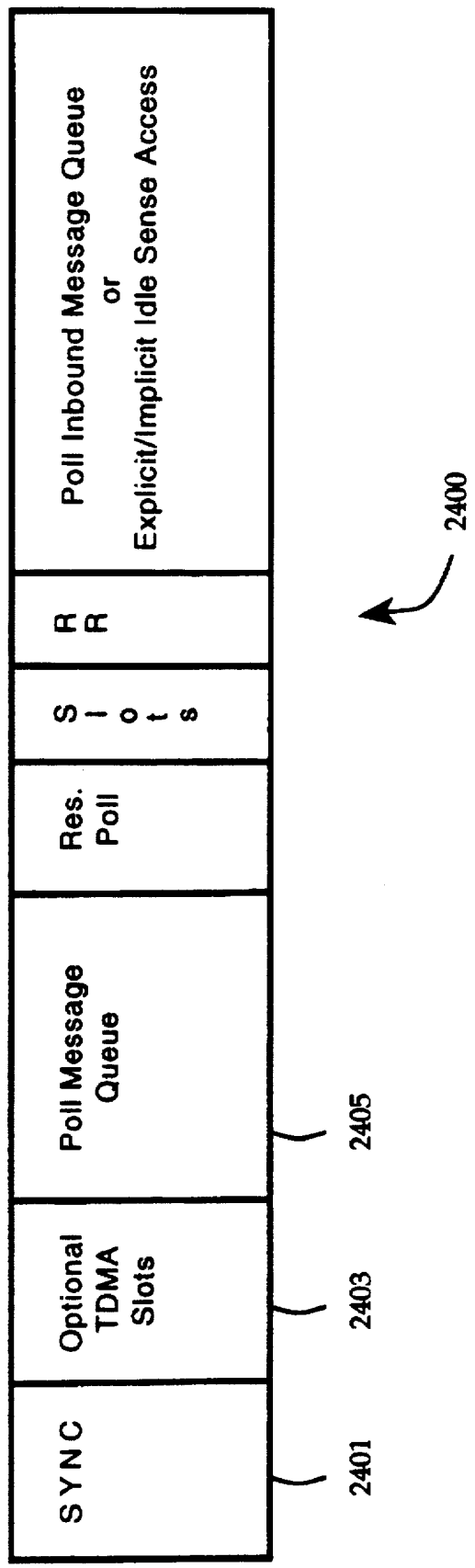
FIG. 24 illustrates another sequence in an access interval used by the hierarchical network of the present invention with the Time Division Multiple Access slots positioned immediately following the SYNC.

Referring now to FIG. 24, another access interval (2400) is illustrated showing the Time Division Multiple Access slots (2403) immediately following the SYNC (2401). In this example the Poll Message Queue (2405) immediately follows the Time Division Multiple Access slots (2403). The configuration shown in FIG. 24 provides for certain advantages including for example, (1) the Time Division Multiple Access slot timing is keyed to SYNC (2401) for better accuracy; and (2) Session frame overruns do not interfere with Time Division Multiple Access slots (2403).

The configurations shown in FIG. 21 and in FIG. 23 are preferred because they allow the Reservation Poll messages to be transmitted immediately following the SYNC and because of the power management and interference reduction advantages.

In one embodiment of the Access Interval structure, all message transmissions use standard high-level data link control ("HDLC") data framing. Each message is delimited by High-Level Data Link Control Flags, consisting of the binary string 01111110, at the beginning of the message. A preamble, consisting of a known data pattern, precedes the initial FLAG. This preamble is used to attain clock and bit synchronization prior to start of data. Receiver antenna selection is also made during the preamble for antenna diversity. A CRC for error detection immediately precedes the ending FLAG. Data is NRZ-I (differentially) encoded to improve data clock recovery. High-Level Data Link Control NRZ-I data is run-length-limited to six consecutive bits of the same state. Alternatively, a shift register scrambler could be applied instead of differential encoding to obtain sufficient transitions for clock recovery. Data frames may be concatenated, with two or more frames sent during the same transmission, with a single FLAG separating them. An example of this is SYNC, followed by a HELLO or Reservation Poll (SYNC, HELLO and Reservation Poll are discussed more fully below).

While much of the following discussion centers on frequency hopping in the Infrastructured Network because of the unique issues which arise in a frequency hopping design, the Access Interval structure of the present invention is also suitable for single channel and direct sequence spread spectrum systems. The consistent timing of channel access, and the relative freedom from collisions due to channel contention, provide desirable benefits in systems that support portable, battery powered devices regardless of modulation type or channelization. Functions that are unique to frequency hopping may be omitted if other channelization approaches are used.

FIGS. 3a and 3b illustrate the frequency of operation periodically changing corresponding to Access Interval boundaries in a frequency hopping system. Frequency hopping systems use a hopping sequence, which is a repeating list of frequencies of length (n) selected in a pseudo random order and is known to all devices within a coverage area. FIG. 3a illustrates a frequency hopping system having one Access Interval (301) per frequency hop (the hop occurring every 10 milliseconds) and a length of 79. FIG. 3b illustrates a frequency hopping system having one Access Interval (303) per frequency hop (the hop occurring every 20 milliseconds) and a length of 79. The 20 ms time frame is preferred for a protocol stack that uses a maximum network layer frame of up to 1536 bytes payload while maintaining two real time voice communications channels. Access interval duration may be optimized for other conditions. Access Interval length is communicated to the NET during the SYNC portion of the Access Interval. This allows Access Interval duration, and other NET parameters to be adjusted without reprogramming every device within the NET.

The Access Interval is a building block. The length of the Access Interval can be optimized based on network layer packet size, expected mix of Bandwidth on Demand ("BWOD"), Asynchronous and Scheduled Access traffic, expected velocities of devices within the NET, acceptable duration of channel outages, latency or delay for scheduled services, etc. The preferred Access Interval duration of 20 ms (and maximum packet length of 256 Bytes at 1 MBIT/sec) represents a value optimized for systems with device velocities up to 15 MPH, and a mix between Bandwidth On Demand and scheduled service traffic.

Within a frequency hopping network, one or more Access Intervals may be used during each dwell in a frequency hopping system. A dwell is the length of time (d) each frequency in the hopping sequence is occupied by the system. For example, FIGS. 4a and 4b show illustrations of cases where more than one 20 ms Access Interval (401) is used per hop. This may be appropriate for some instances where it is undesirable to hop at higher rates because of relatively long frequency switching times of the radio hardware, where import, export, or regulatory restrictions disallow hopping at a faster rate, or in some applications where it is desirable to maintain operation on each channel for a longer period. An example of the latter is the case where larger files or data records are transferred routinely.

In a frequency hopping operation, the Access Interval (200) of FIG. 2 begins with a SYNC header (201). As mentioned above, the SYNC is generated by the Control Point (CP) device of the NET. The SYNC is used by constituents of the NET to attain and maintain hopping synchronization. Included in the SYNC are:

1. Address of the Control Point device.
2. Identification of the Hopping Sequence, and index of the current frequency within the hop table.
3. Identification of the hop rate, number of Access Intervals per hop, and Access Intervals before next hop.
4. A timing character for synchronization of device local clocks to the NET clock contained within the Control Point device.
5. Status field indicating reduced SYNC transmissions due to low NET activity (Priority SYNC Indicator).
6. Status field indicating if the Access Interval will contain a broadcast message to all devices within the NET.
7. Status field indicating Infrastructured or Spontaneous Network operation.
8. The SYNC field information is optionally encrypted using a block encryption algorithm, with a key provided by the network user. A random character is added to each SYNC message to provide scrambling.

However, there are two circumstances during which a SYNC message is not transmitted: (1) co-channel interference; and (2) low NET utilization. With regard to co-channel interference, before issuing a SYNC message, the Control Point device performs channel monitoring for a brief interval. If the Received Signal Strength Indicator (RSSI) level indicates an ON channel signal greater than the system defer threshold, then the Access Interval is skipped. Alternatively, a strong ON channel signal may dictate a reduction in Control Point device power to limit the interference distance of the net for the duration of the Access Interval. A system defer threshold 30 dB above the receiver sensitivity is a preferred choice. Communication within the NET is deferred for the duration of the Access Interval if SYNC is not transmitted due to co-channel interference.

In times of low system utilization, SYNC and Reservation Poll messages are reduced to every third Access Interval. The SYNC message includes a status field indicating this mode of operation. This allows devices to access the NET, even during Access Intervals where SYNC is skipped, by using an Implicit Idle Sense algorithm. If the hopping sequence is 79 frequencies in length as shown in FIGS. 3a and 3b, use of every third Access Interval guarantees that a SYNC message will be transmitted on each frequency within the hopping sequence once each three cycles of the sequence, regardless of whether 1, 2 or 4 Access Intervals occur each hop dwell. This addresses US and European regulatory requirements for uniform channel occupancy, and improves the prospects for synchronization of new units coming into the NET during periods when the NET is otherwise inactive. SYNC messages that are on multiples of 3 Access intervals are labeled as priority SYNC messages. "Sleeping" terminals use priority SYNCs to manage their internal sleep algorithms. Sleeping terminals and Implicit Idle Sense are discussed in more detail below.

It should be noted that SYNC messages are preceded by dead time, which must be allocated to account for timing uncertainty between NET clocks and local clocks within NET constituents. In frequency hopping systems, the dead time must also include frequency switching time for the RF modem.

The Reservation Poll frame (203) immediately follows the SYNC header (201). The two messages are concatenated High-Level Data Link Control frames separated by one or more flags. The reservation poll provides NET constituents an opportunity to gain access to the media. It includes:

1. A field specifying one or more access slots.
2. A field specifying a probability factor between 0 and 1.
3. A list of addresses for which the base stations has pending messages in queue.
4. Allocation of Time Division Multiple Access slots for scheduled services by address.
5. Control Point device Transmitted Power level for SYNC and Reservation Polls.

The number of access slots, n, and the access probability factor, p, are used by the Control Point device to manage contention on the channel. They may each be increased or decreased from Access Interval to Access Interval to optimize access opportunity versus overhead.

If the NET is lightly loaded, the pending message list is short, and the NET is not subject to significant interference from other nearby NETs, the control point device will generally specify a single slot (501) as shown in FIG. 5a, with a p factor <1. In this case, the reservation phase is Idle Sense Multiple Access ("ISMA"). Devices with transmission requirements that successfully detect the Reservation Poll will transmit a Request for Poll ("REP") with probability p and defer transmission with probability 1-p. FIG. 5b shows a device response (address 65) (503) following the reservation poll.

In cases when the transmission density is higher, n multiple reservation slots will be specified, generally with a probability factor p of 1. In this case a device will randomly choose one of n slots for transmission of their Request for Poll. The slotted reservation approach is particularly appropriate in instances where many NETs are operating in near proximity, since it diminishes reliance on listen before talk ("LBT") (explained more fully below). The number of slots n is determined by a slot allocation algorithm that allocates additional slots as system loading increases. FIG. 6a shows multiple slots (601).

In cases where NET loading is extreme, the Control Point may indicate a number of slots, e.g., not more than 6, and a probability less than 1. This will cause some number of devices to defer responding with a Request for Poll in any of the slots. This prevents the control point device from introducing the overhead of a large number of slots in response to heavy demand for communications, by dictating that some units back off until demand diminishes.

A pending message list is included in the Reservation Poll. The pending message list includes the addresses of devices for which the Control Point device has messages in queue. Devices receiving their address may contend for the channel by responding with a Request For Poll (RFP) in the slot response phase. FIG. 6b shows several devices (603, 605 and 607) contending for channel access. Messages that the Control Point device receives through the wired infrastructure that are destined for Type 1 devices, and inactive Type 3 devices whose awake window has expired, are immediately buffered, and the device addresses are added to the pending message list. When a message is received through the infrastructure for a Type 2 device, or an active Type 3 device, their address is prioritized at the top of the polling queue. (Device Types and polling queue are described below.) The pending message list is aged over a period of several seconds. If pending messages are not accessed within this period, they are dropped.

Devices with transmission requirements respond in slots with a Request for Poll. This message type includes the addresses of the Control Point device and requesting device, the type and length of the message it has to transmit, and a field that identifies the type of device. Devices that detect their address in the pending message list also contend for access in this manner.

As mentioned above, devices may be Type 1, Type 2, or Type 3. Type 1 devices are those which require critical battery management. These may be in a power saving, non-operational mode much of the time, only occasionally "waking" to receive sufficient numbers of SYNC and Reservation Poll messages to maintain connectivity to the NET. Type 2 devices are those that are typically powered up and monitoring the NET at all times. Type 3 units are devices that will remain awake for a window period following their last transmission in anticipation of a response. Other device types employing different power management schemes may be added.

Slot responses are subject to collision in both the single and multiple slot cases. Collisions may occur when two or more devices attempt to send Request for Polls in the same slot. However, if the signal strength of one device is significantly stronger than the others, it is likely to capture the slot, and be serviced as if it were the only responding unit. FIG. 6b shows two devices (605), address 111, and (607), address 02, that may be subject to collision or capture.

The Control Point device may or may not be able to detect collisions by detecting evidence of recovered clock or data in a slot, or by detecting an increase in RF energy in the receiver (using the Received Signal Strength Indicator, ("RSSI")) corresponding to the slot interval. Collision detection is used in the slot allocation algorithm for determining addition or deletion of slots in upcoming Reservation Polls.

As an optional feature to improve collision detection in the multiple slot case, devices that respond in later slots may transmit the addresses of devices they detect in earlier slots as part of their Request for Poll. Request for Polls which result in collisions at the Control Point device often are captured at other remote devices, since the spatial relationship between devices that created the collision at the base does not exist for other device locations within the NET. The duration of the response slots must be increased slightly to provide this capability.

If the Control Point device receives one or more valid Request for Polls following a Reservation Poll, it issues a Reservation Resolution ("RR") Poll and places the addresses of the identified devices in a polling queue. The Reservation Resolution message also serves as a poll of the first unit Access I queue. Addresses from previous Access Intervals and addresses of intended recipients of outbound messages are also in the queue.

If the Polling Queue is empty, then no valid Request for Polls were received or collision detected and no Reservation Resolution poll is issued. If within this scenario a collision is detected, a CLEAR message indicating an Explicit Idle Sense (explained more fully below) is transmitted containing a reduced probability factor to allow colliding units to immediately reattempt NET access.

Outbound messages obtained through the network infrastructure may result in recipient addresses being prioritized in the queue, that is, if the recipients are active devices— Type 2 devices or Type 3 devices whose awake window has not expired. This eliminates the need for channel contention for many outbound messages, improving efficiency. Messages for Type 1 devices are buffered, and the recipient address is placed in the pending message list for the next Access Interval.

Generally the queue is polled on a first in first out (FIFO) basis. The polling order is:

a. Addresses of active units with outbound messages.

b. Addresses from previous Access Intervals c. Addresses from the current Access Interval Since propagation characteristics vary with time and operating frequency, it is counterproductive to attempt retries if Poll responses are not received. If a response to a Poll is not received, the next address in the queue is polled after a short response time-out period. Addresses of unsuccessful Polls remain in the queue for Polling during the next Access Interval. Addresses are aged, so that after several unsuccessful Polls they are dropped from the queue. Addresses linked to outbound messages are added to the pending message list. Devices with inbound requirements must re-enter the queue through the next reservation phase.

Data is transferred in fragments. A maximum fragment payload of 256 bytes is used in the preferred implementation. If transfer of network packets larger than of 256 bytes is required, two or more fragments are transferred. Fragments may be any length up to the maximum, eliminating the inefficiency that results when messages that are not integer multiples of the fragment length are transmitted in systems that employ fixed sizes.

Figure 7A:
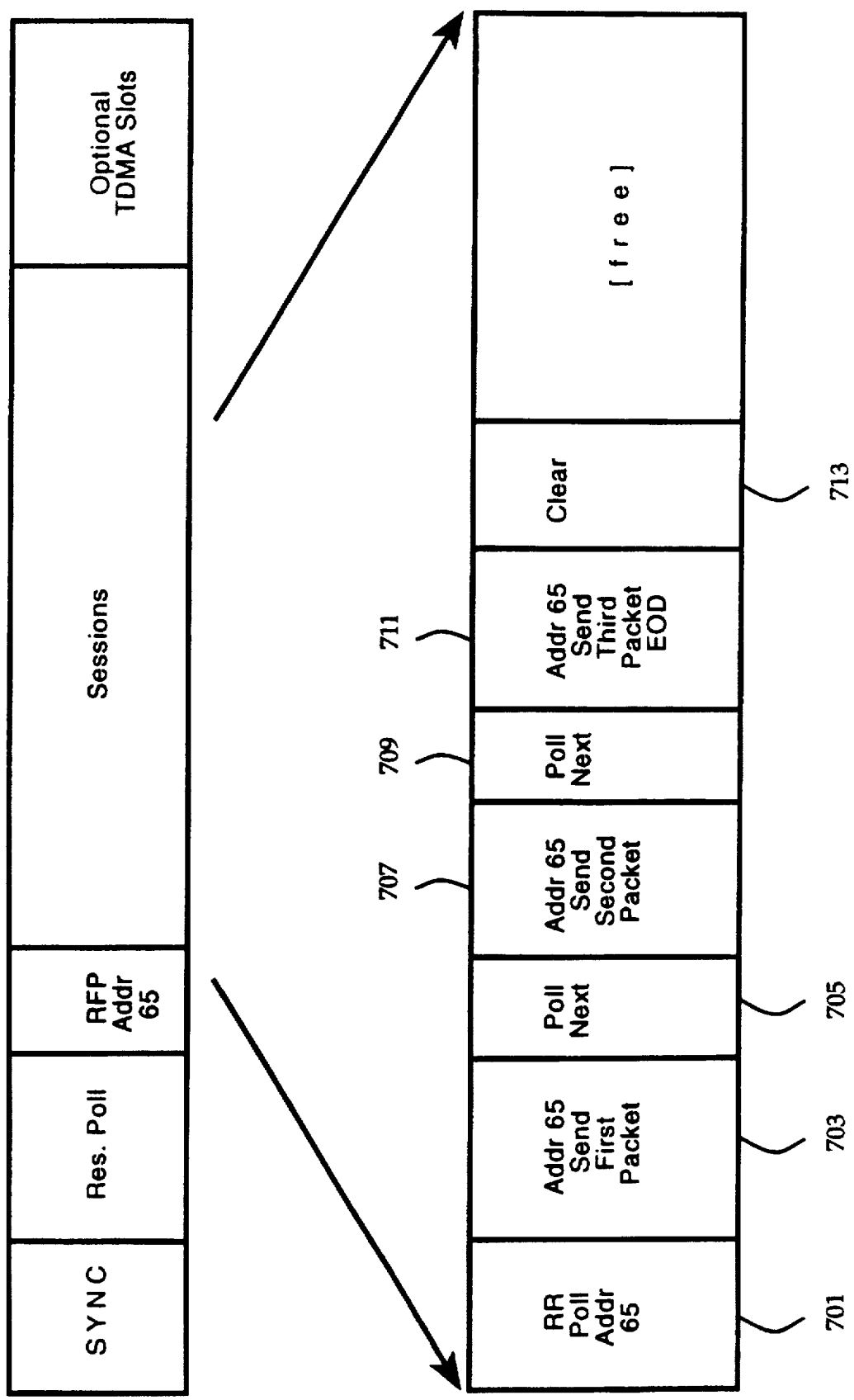
FIG. 7A illustrates a sequence in an access interval used by the hierarchical network of the present invention for transferring data from a remote device to a control point device.

The sequence for transferring data from a remote device to the control point device is illustrated in FIG. 7a. It is assumed that address 65 is the first address in the polling queue. The Reservation Resolution poll (701) from the control point device includes the device address and the message length that device 65 provided in its initial Request for Poll. A first fragment (703) transmitted back from device 65 is a full length fragment. Its header includes a fragment identifier and a field providing indication of the total length of the message. Length information is included in most message types during the sessions period to provide reservation information to devices that may wish to attempt to access the NET following an Explicit Idle Sense (explained more fully below).

Following successful receipt of the first fragment, the Control Point device sends a second poll (705), which both acknowledges the first fragment, and initiates transmission of the second. The length parameter is decremented to reflect that the time required for completion of the message transfer is reduced. A second fragment (707) is transmitted in response, and also contains a decremented length field. Following receipt of the second fragment (707), the Control Point device sends a third poll (709). This pattern is continued until a final fragment (711) containing an End of Data (EOD) indication is received. In FIG. 7, the final fragment is shorter than a maximum length fragment. The Control Point device sends a final Acknowledge (ACK), and the device sends a final CLEAR (713) to indicate conclusion of the transmission. The CLEAR message contains a probability factor p for Explicit Idle Sense (explained more fully below). The value of p is determined by the Control Point device in the ACK and echoed by the device termination communication. A p of zero indicates that the control point device will be initiating other communications immediately following receipt of the CLEAR message. A probability other than 0 indicates an Explicit Idle Sense.

If for some reason a fragment is not successfully received, the next poll from the Control Point device would indicate a REJECT, and request re-transmission of the same fragment. The length field would remain fixed at the previous value, prolonging reservation of the channel for the duration of the message. After a fragment is transmitted more than once without successful reception, the Control Point device may suspend attempts to communicate with the device based upon a retry limit, and begin polling of the next address in the queue.

Figure 19A:
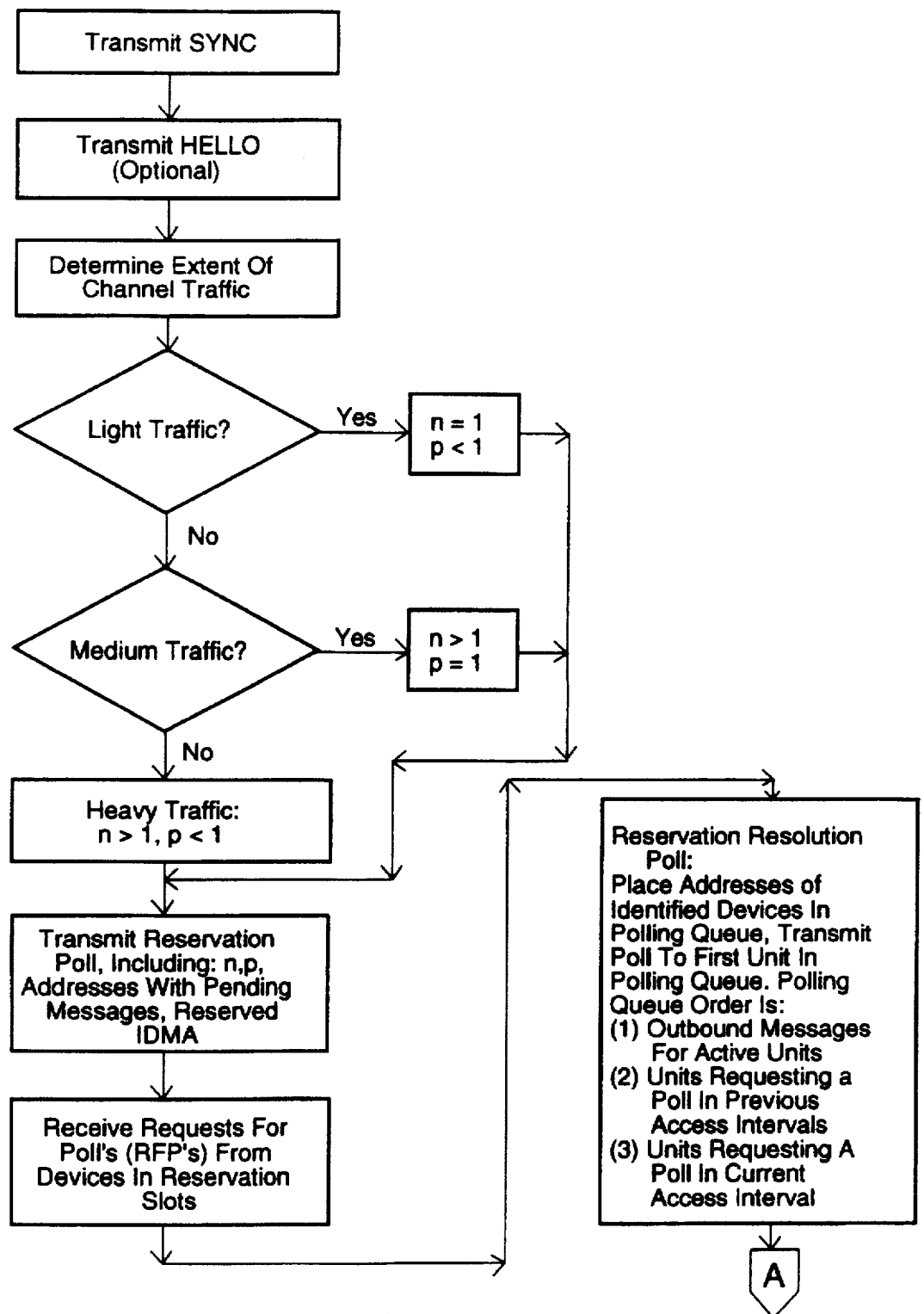
FIGS. 19A and 19B are flow charts illustrating an access interval during inbound communication.
Figures 1, 19B:
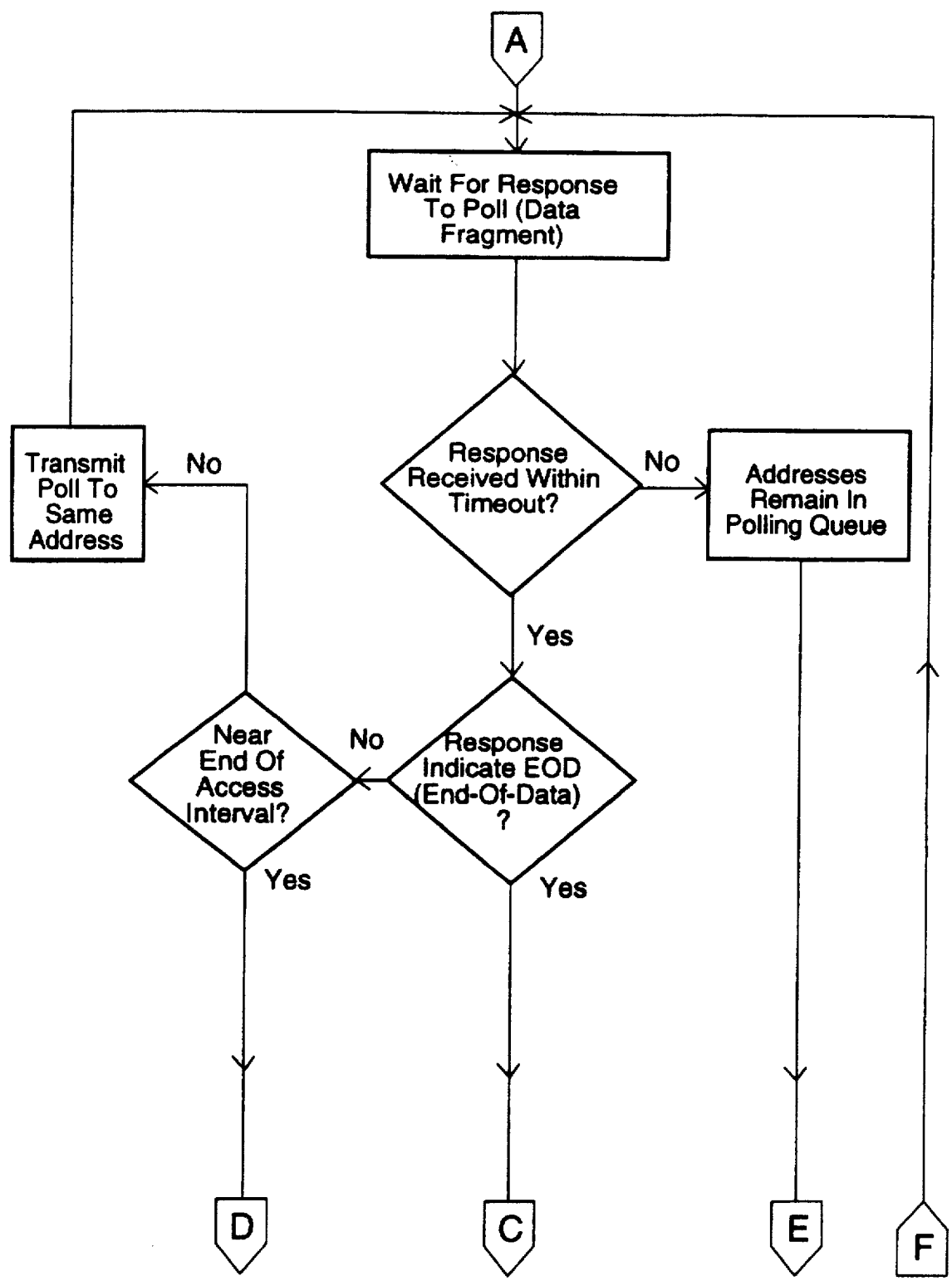
Figures 2, 19B:
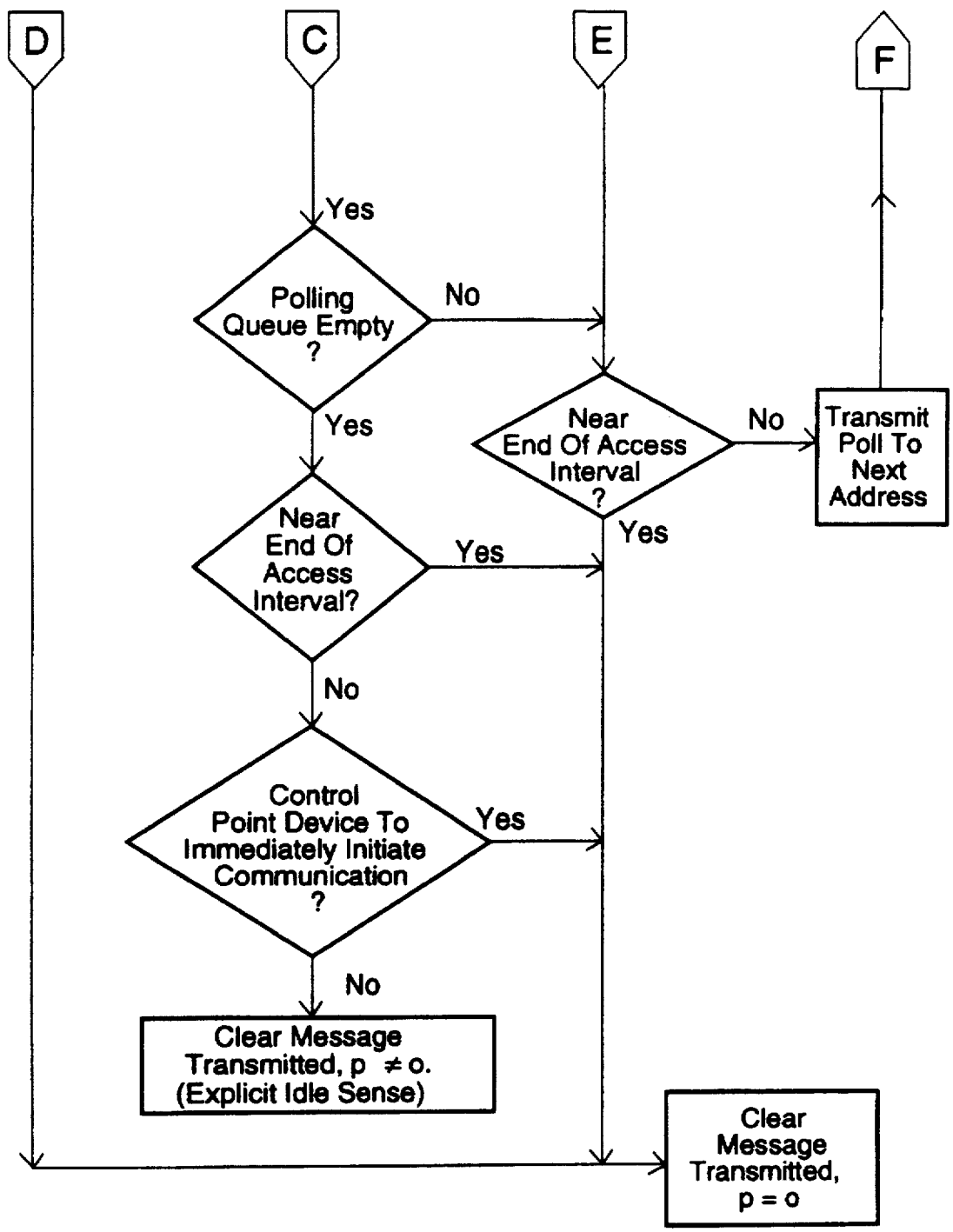
Figure 20A:
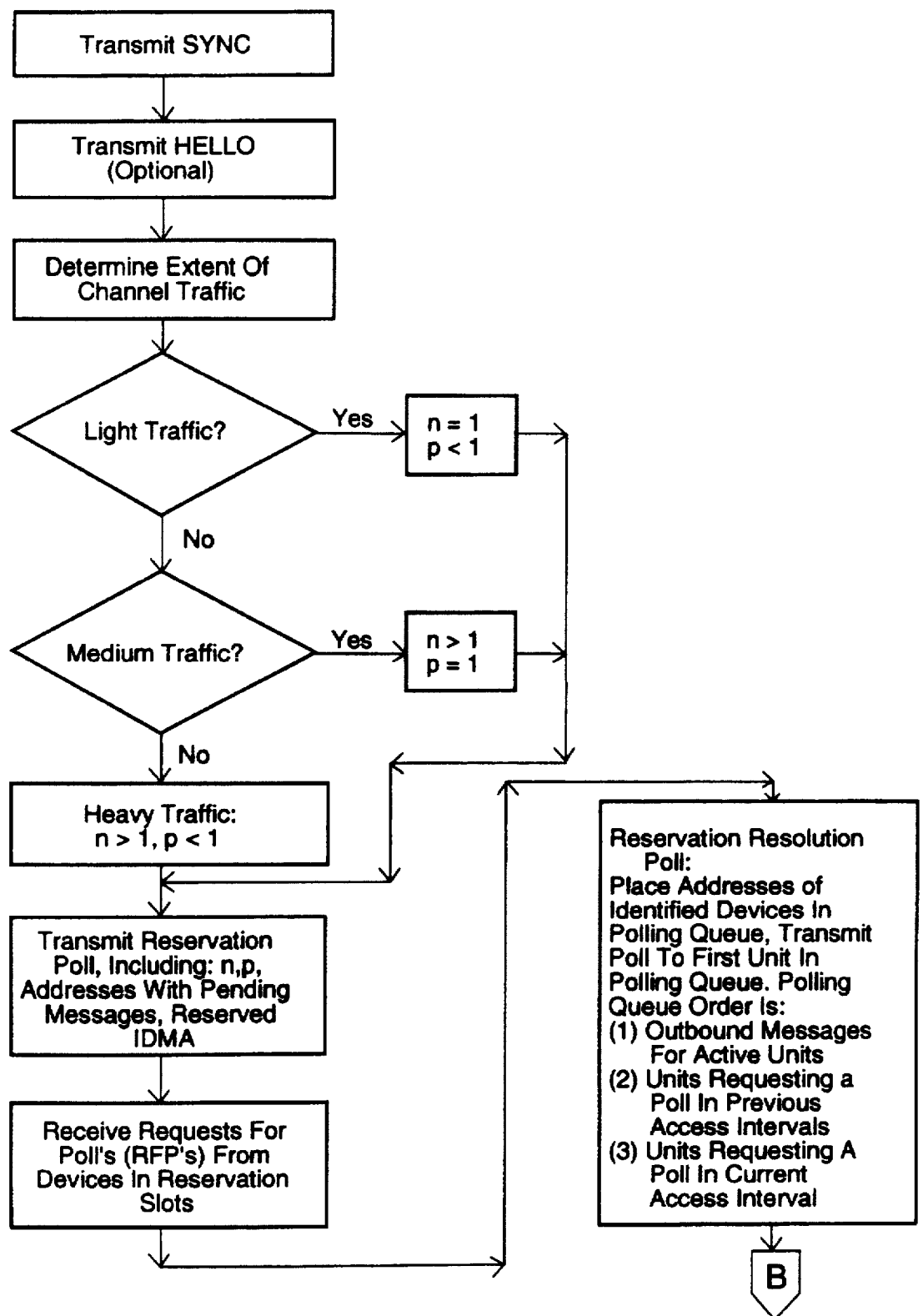
FIGS. 20A and 20B are flow charts illustrating an access interval during outbound communication.
Figures 1, 20B:
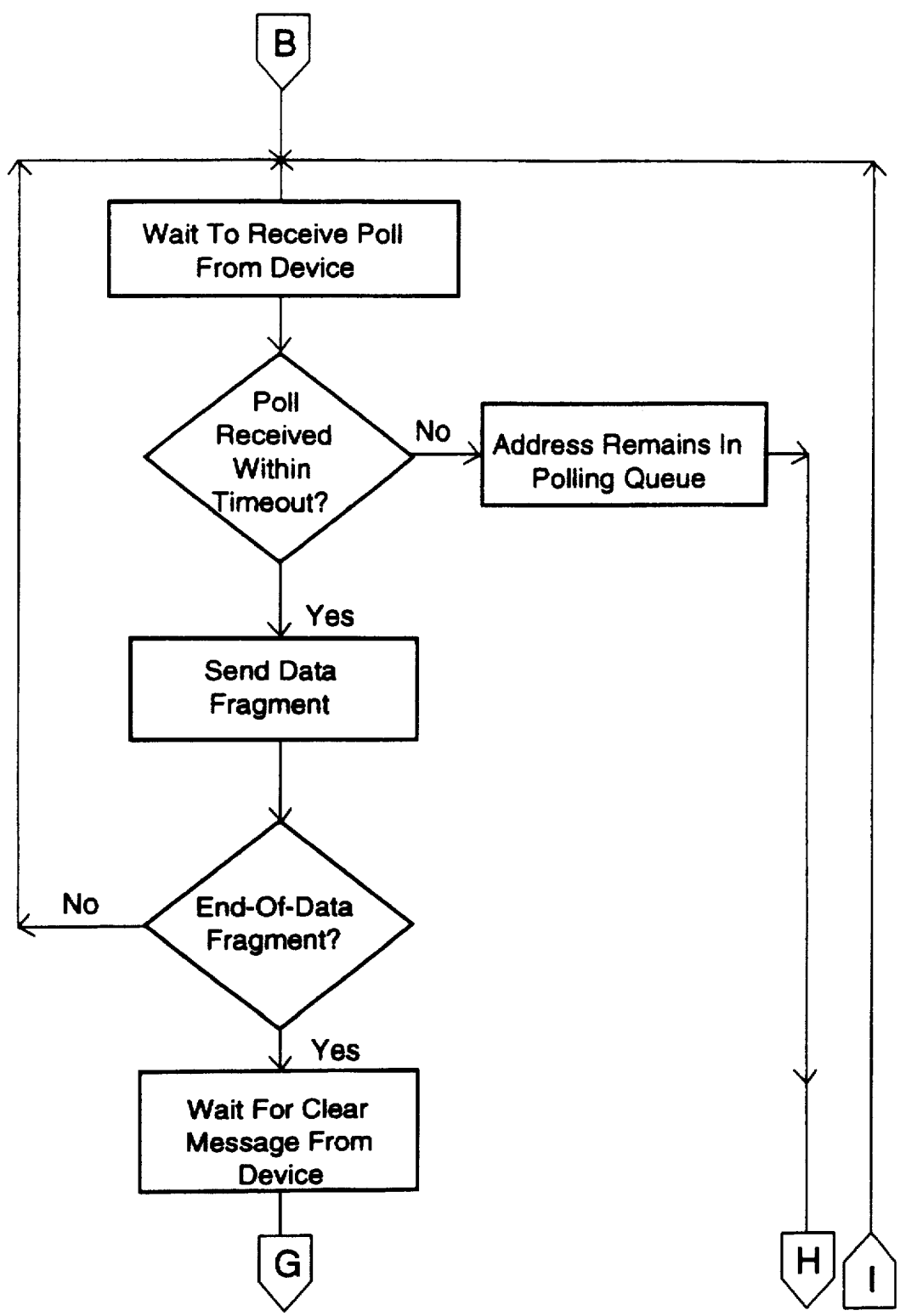
Figures 2, 20B:
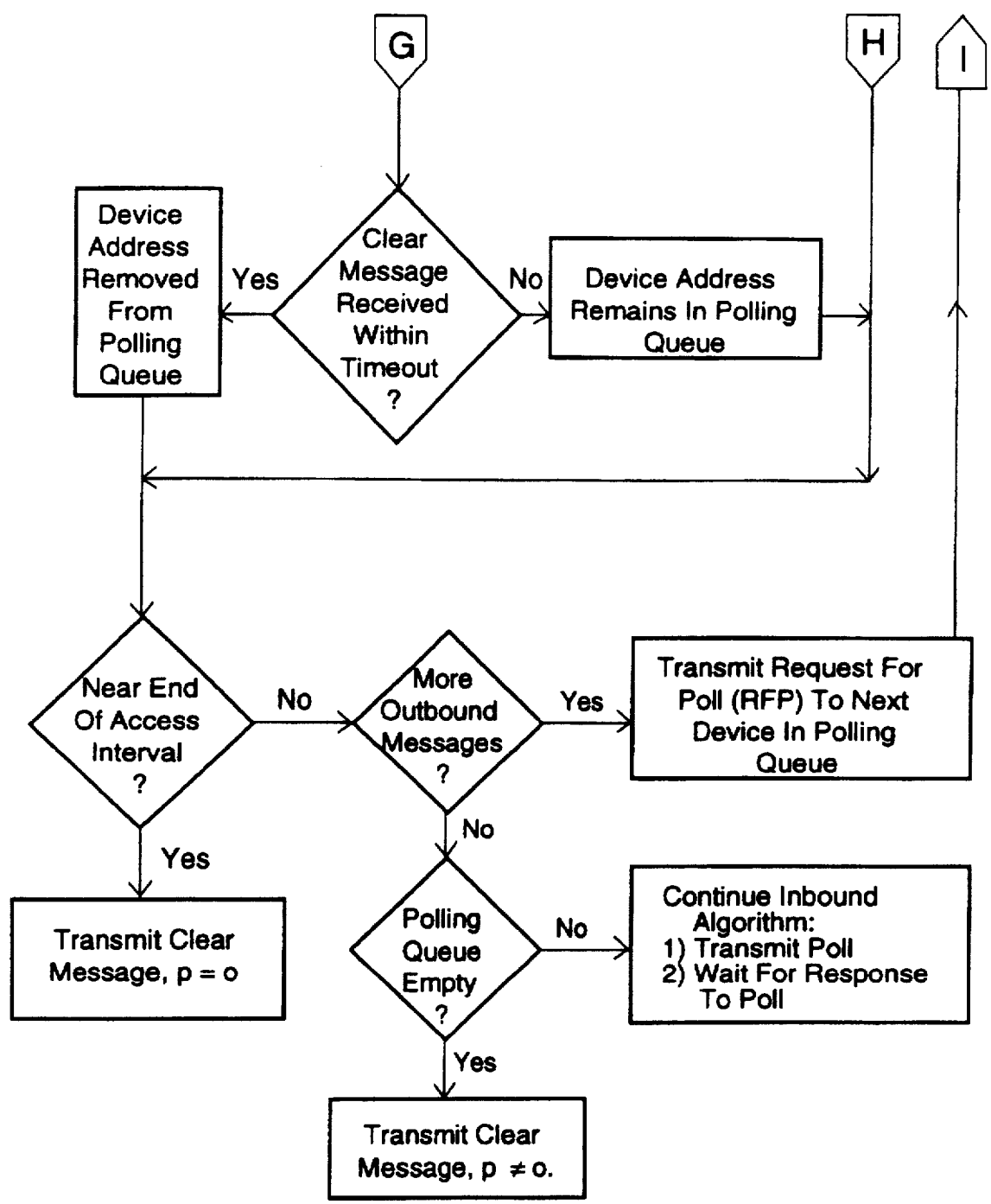

A flow chart depicting how inbound messages are received during an access interval is shown in FIGS. 19A and 19B. A flow chart depicting how outbound messages are transmitted during an access interval is shown in FIGS. 20A and 20B.

Figure 7B:
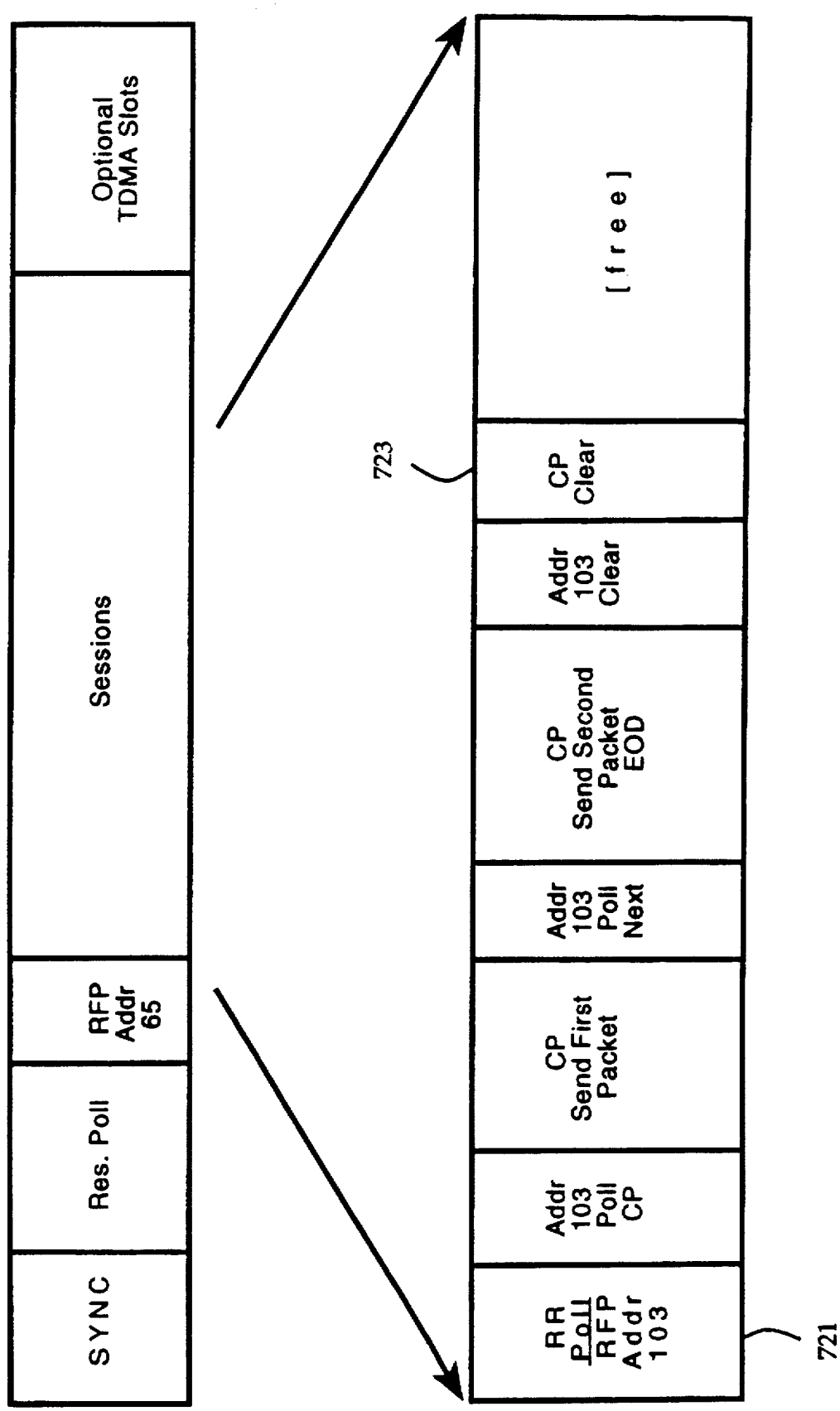
FIG. 7B illustrates a sequence in an access interval used by the hierarchical network of the present invention for transferring data from a control point device to a remote device.

Outbound messages are transmitted in a similar fashion as inbound messages, with the Control Point and device roles largely reversed as illustrated in FIG. 7b. When the Control Point reaches an address in the queue for which it has an outbound message, the Control Point transmits a Request for Poll (721) identifying the address of the device and the length of the message. The response back from the device would be a poll with an embedded length field. The same POLL/FRAGMENT/ACK/CLEAR structure and retry mechanisms as described above with regard to inbound messages in reference to FIG. 7a are maintained. The CLEAR from the device indicates a probability p of zero. If the polling queue is empty, the Control Point may send a final or terminating CLEAR (723) containing a probability for Explicit Idle Sense.

All terminating ACK or CLEAR messages contain fields to aid in synchronization of new units to the NET. The content of these fields is identical to that in the SYNC message, except that the timing character is deleted. Synchronization is discussed more fully below.

Broadcast Messages intended for groups of addresses, or all addresses within a NET may be transmitted during the sessions period. Broadcast messages are not individually acknowledged. These messages may be communicated at intervals over the course of several Access Intervals to provide reliable communication. Messages such as SYNC and Reservation Polls are specialized broadcast messages, with dedicated bandwidth in the Access Interval structure.

Security of payload data is left to the higher protocol layers. Application programs resident in portable/mobile devices may employ encryption or other means of providing protection against undesired use of transmitted data.

Portable/mobile devices may employ transmitter power control during the sessions period to reduce potential interference with other NETs that may occasionally be on the same or adjacent channels. These devices will use Received Signal Strength Indicator readings from outbound messages to determine if transmitter power may be reduced for their inbound transmission. Because of the need to maintain channel reservations and Listen Before Talk capabilities, the Control Point device does not use transmitter power control. Since Control Point devices are generally part of an installed system infrastructure, they are likely to be physically separated from devices operating in other NETs. They are therefore less likely to cause interference to devices in other NETs than portable devices, which may operate in clear proximity to devices in other NETs.

Often, control point devices will empty the polling queue before the conclusion of the access interval. Two mechanisms within the Access Control Protocol, Explicit and Implicit Idle Sense, are provided to improve bandwidth utilization. These supplemental access mechanisms often provide means for devices that failed to gain reservations during the reservation phase to gain access to the NET within the Access Interval. To assume an Explicit or Implicit Idle Sense, a device must have detected a valid SYNC and Reservation Poll in the current Access Interval.

The incorporation of a probability factor $p \neq 0$ in the final (terminating) ACK or CLEAR from the control point device provides the function of an Explicit Idle Sense (mentioned above). Devices with transmission requirements solicit Request for Polls using the same rules normally used for a single slot Reservation Poll. Successfully identified addresses are placed in the polling queue, and are polled immediately or in the next Access Interval depending on the time remaining in the current Access Interval. The p factor for Explicit Idle Sense is subject to the same optimization algorithm as the Reservation Poll probability.

Communication of channel reservations, in the form of the length fields in Polls and Message Fragments is useful to units seeking to access the NET through Explicit Idle Sense. Reservations allow devices to predictably power down during the period that another device has reserved the NET to conserve battery power, without loosing the ability to gain access to the NET.

Implicit Idle Sense provides an additional means of channel access. An Implicit Idle Sense is assumed whenever a device detects a quiet interval period greater than or equal to the duration of a Poll plus the maximum fragment length after a channel reservation has expired. Detection based upon simple physical metrics, such as a change in Received Signal Strength Indicator or lack of receiver clock recovery during the quiet interval, are preferred methods of ascertaining channel activity. Algorithms based upon these types of indicators are generally less likely to provide a false indication of an inactive channel than those that require successful decoding of transmissions to determine channel activity. False invocation of an Implicit Idle Sense is the only mechanism by which data transmissions are subject to collision within the NET. Thus, the Implicit Algorithm must be conservative.

Quiet interval sensing may begin at the following times within the Access Interval:

a. Any time after the last reservation slot following a Reservation Poll;

b. Any time after a terminating ACK or CLEAR indicating an Explicit Idle Sense;

c. Following an unsuccessful response to a single Slot Reservation Poll; or d. Any time prior to reserved Time Division Multiple Access time slots at the end of the Access Interval.

It is preferable that devices detecting a quiet interval use a p persistent algorithm for channel access to avoid collisions. The probability factor for Implicit Idle Sense Access will generally be less than or equal to the factor in Explicit Idle Sense.

A device must receive the SYNC and Reservation Polls at the beginning of an Access Interval to use Implicit Idle Sense. The Reservation Poll provides indication of guaranteed bandwidth allocation to scheduled services at the end of the Access Interval, which may shorten the period available for Bandwidth On Demand communications.

Devices requiring scheduled services must contend for the channel in the same fashion as those requiring Bandwidth On Demand access. When polled, these initiating devices will initiate a connection request that indicates the number of inbound and outbound Time Division Multiple Access slots required for communication, and the address of the target device with which communication is desired. The network infrastructure will then attempt to establish the connection to the target device. Once the connection is established, the Control Point device will signal the allocation of slots to the initiating device. Time Division Multiple Access slots are relinquished by transmitting a disconnect message to the control point device in the Time Division Multiple Access slot until the disconnect is confirmed in the next Reservation Poll.

The transmission requirements of speech and slow scan video (scheduled services) are similar. In one embodiment, Time Division Multiple Access slots are allocated as multiples of 160 bits payload at 1 MBIT/sec, plus overhead for a total of 300 µs. For 10 ms access intervals, acceptable voice communication can be obtained by allocating 1 Time Division Multiple Access slot each for inbound and outbound communication per access interval. For 20 ms access intervals, two slots each way are required. A system employing 10 ms access intervals at 100 hops per second may improve transmission quality by using two or three slots each Access Interval and sending information redundantly over two or three access intervals using interleaved block codes. Scheduled transmissions are generally not subject to processing or validation by the control point device, and are passed through from source to destination. Use of interleaved error correction coding or other measures to improve reliability are transparent to the NET.

The selection of certain system parameters are important when considering scheduled services. As an example, since speech is quantified over the duration of the access interval and transmitted as a burst, the length of the access interval translates directly into a transport delay perceptible to the recipient of that speech. In real time voice communications, delays longer than 20 ms are perceptible, and delays longer than 30 ms may be unacceptable. This is particularly the case where the Network Infrastructure is interconnected with the public switched telephone network ("PSTN"), which introduces its own delays. Two way services such as voice communications are the most sensitive to transport delay because delay impacts the interaction of the communicating parties. One way services are less sensitive to transport delay. One way services are good candidates for interleaving or other forms of redundant transmission.

Similarly, the selection of hop rate is important, as hop rate determines the duration of outages that may occur. If one or more frequencies in the hop sequence are subject to interference, for instance, scheduled transmissions during those hops will be disrupted. In a system that hops slowly, detrimental outages of hundreds of milliseconds will occur resulting in poor transmission quality. Occasional losses of smaller durations, e.g., 10 ms or 20 ms, are generally less perceptible, indicating that faster hop rates are desirable if the NET is to offer real time voice transport.

Scheduled service intervals may also be used for data transport on a scheduled or priority basis. Telemetry, data logging, print spooling, modem replacement, or other functions are possible. For these activities, a few Time Division Multiple Access slots scheduled for example every fourth, eighth, or sixteenth AI are necessary.

Because of multipath and dispersion issues with 2.4 GHz transmission at relatively high data rates, the ability of the NET to adaptively switch between two or more data rates is desirable.

In one embodiment, implementation of data rate switching may be accomplished by selecting a standard rate of communications, e.g., 250 KBPS and high rate of communications of 1 Mbit/sec. Messages that contain system status information, including SYNC, Reservation Polls, Reservation Resolution Polls (Request for Polls), Polls, ACKs and CLEARS are transmitted at the standard rate. These messages are generally short, and the time required for transmission is largely determined by hardware overhead, e.g., transmitter receiver switching time. The incremental overhead introduced by transmitting these messages at the lower rate is therefore small in comparison to the total length of an access interval. The reliability of reception of these messages will increase, which will eliminate unnecessary retries in some instances where fragments are received successfully, but acknowledgements or polls are missed.

A test pattern at the higher data rate is inserted in each Poll (not in Reservation Polls, however). The Poll recipient evaluates signal quality based on the high data rate test pattern, Received Signal Strength Indicator, and other parameters to determine whether to transmit a fragment at the high rate or the low rate. Fragment lengths are selected such that high and low rate maximum fragment lengths are the same duration. In other words, a fragment at the low rate conveys approximately ¼ the payload of a fragment for the case where the data rate is four time greater. This method is generally suitable for transaction oriented communications, which frequently require short message transmissions.

Alternatively, the length field in Polls and messages can be used to allow different fragment lengths for the two data rates while still providing channel reservation information to other devices in the NET. This method also provides for forward migration. As modulation and demodulation methods improve, newer products can be added to old networks by upgrading Control Points devices. Both new and old devices share the ability to communicate at a common low data rate.

An alternate embodiment uses signaling messages such as SYNC, Reservation Polls, Request for Polls, etc., at the higher rate with fallback operation to the standard rate for the communications sessions only. SYNC and Reservation Polls at the high rate constitute a high data rate test message. The Request for Poll response to the Reservation Poll at the high rate may include a field indicating that sessions communications should take place at the fallback, standard rate. Signal quality measures such as signal strength and clock jitter are appropriate. Data rate selection information is included with the device address in the polling queue. When the device is polled, it will be polled at the rate indicated in the Request for Poll. Channel reservation information in the Reservation Resolution Poll will indicate the reservation duration based upon the data rate indicated.

In this alternate embodiment, the fact that SYNC and Reservation Polls must be detectable at the high data rate prioritizes access to the NET for those devices that have acceptable connectivity during the current access interval. This general approach has desirable characteristics in a frequency hopping system, as the propagation characteristics between devices may change significantly as the NET changes from frequency to frequency within the hopping sequence, or over several Access Intervals during the dwell time on a single frequency. Reduction in data rate in this system is primarily intended to remedy the data smearing (inter-symbol interference) effects of dispersion due to excess delay, rather than temporary poor signal to noise ratio due to frequency selective fading. Devices that receive high data rate transmissions with acceptable signal strength but high jitter are Likely to be experiencing the effect of dispersion.

The concept of allowing Polls and message fragments to occur at either a high or low data rate could create difficulties for other NET constituents that need to be able to monitor the channel for reservation information. Two embodiments for solving this problem are the use of auto-discriminating receivers or the use of fixed data rate headers for system communications.

Auto discrimination requires the receiver to process messages sent at either data rate, without necessarily having prior knowledge of the rate.

Given a high rate of 1 MBIT/SEC, and a low Rate of 250 KBPS, i.e., one being a binary multiple of the other, it is possible to devise preambles that can be received at either rate. Consider that 01 and 110 sent at the low rate correspond to 00001111 and 111111110000 at the high rate. These preambles are transmitted continuously before the transmission of the High-Level Data Link Control FLAG character at the correct data rate indicating the start of a message. In this example, a preamble of 20 bits of 01 at the low rate indicates operation at the high rate. A preamble of 30 bits of 110 indicates operation at the low rate. A receiver tuned to either rate is capable of receiving both types of preambles and initiating the proper decoding mechanisms for the intended rate of transmission.

This general technique, with appropriate selection of preamble content, is applicable to binary modulation schemes, for example, a frequency modulated system where a common frequency deviation value is used for both data rates. It is also applicable to systems where switching occurs between binary and multilevel modulation such as in pending U.S. application Ser. No. 07/910,865 filed Jul. 6, 1992 (Attorney Docket No. DN 36500ZXA) which is hereby incorporated by reference in its entirety.

Figure 25:
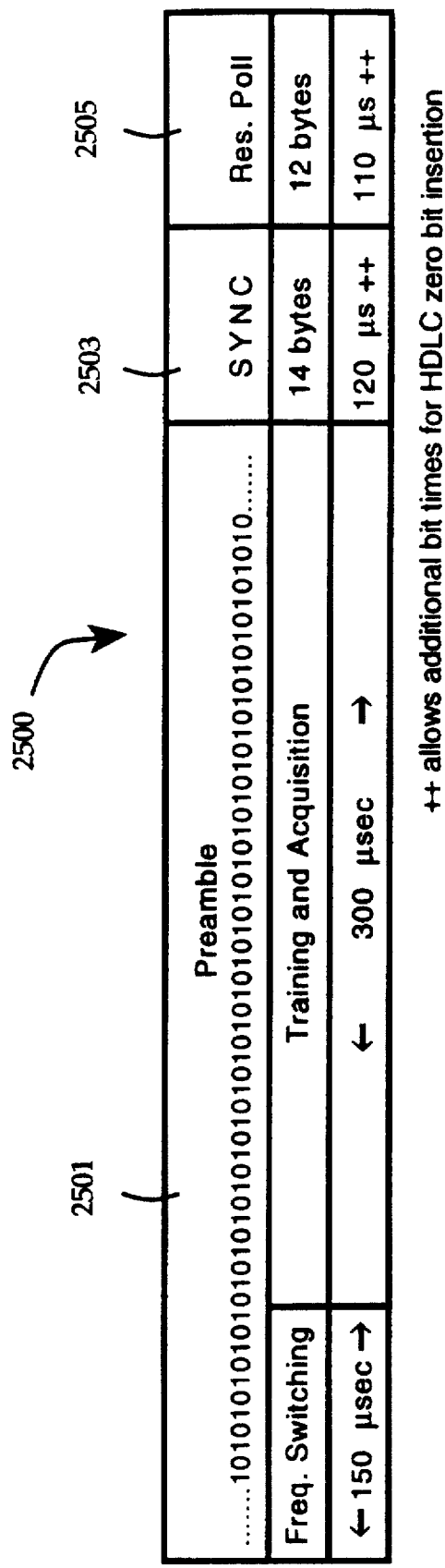
FIG. 25 illustrates a portion of an access interval including the preamble, SYNC and Reservation Poll.

Referring now to FIG. 25, a preamble (2501), a SYNC (2503) and a Reservation Poll (2505) is illustrated. The preamble (2501) starts at the beginning of the Access Interval (2500) and is applied to an RF modem while it is switching frequencies. Since the switching time is a worst case, this causes the preamble (2501) to be present and detectable prior to the allocated 150 μsec period in some instances. It would be equally appropriate to begin preamble transmission 50 or 100 μsec into the switching period if that would be more convenient. The timing has been selected to allow 100 μsec.

Referring to FIG. 26, a sample SYNC message (2600) is shown. Referring to FIG. 27, a sample Reservation Poll (2700) is shown. In these examples, the hopping synchronization information has been positioned in the Reservation Poll (2700).

With auto-discrimination, it is possible to change data rates on a per-poll basis, thereby adjusting for channel temporal dynamics. Since all devices in the NET have auto discrimination capabilities, and channel reservation information is included in message headers as a length field, the bandwidth reservation features of the NET are preserved. The maximum fragment duration may be maintained at a fixed value, meaning that low data rate fragments convey less data than their high rate counterparts, or may be scaled in the ratio of the data rates to allow consistent fragment data payloads.

An alternative to auto-discrimination is the use of headers to communicate system information. This embodiment is less preferred, but may be appropriate if economics, size, or power constraints dictate a simpler design than that required for auto-discrimination. In this embodiment, any transmission at the lower data rate is preceded by a header at the high data rate that conveys NET management information, i.e., channel reservation status. Devices other than those directly involved in polling or fragment transmission need only monitor at the high rate for channel reservation information. The header at the high rate and the following transmission at the low rate are concatenated High-Level Data Link Control frames, with an appropriate preamble for low rate clock recovery synchronization in-between.

For the communicating devices, the header can serve the additional purpose of acting as a test pattern at the high rate. For example, if a device is polled at the low rate, but successfully decodes the high rate header with adequate signal quality, it may indicate back to the polling unit to poll again at the high rate.

In an Infrastructured Network as discussed in reference to FIG. 1, many NETs may be distributed geographically to provide enhanced coverage or additional system capacity. The wired infrastructure, a standard LAN such as Ethernet or Token Ring, provides a means for coordination of NETs to achieve optimum system performance. An equally important role of the wired infrastructure is to allow resource sharing. Portable devices with limited memory capacities, processing power, and relatively small batteries may access large data bases on, or remotely initiate processing capabilities of, larger AC powered computer systems. Portable/mobile devices may also share communication with other like devices which are serviced by other NETs well beyond the radio coverage range of their own NET.

The basic method for communication of Infrastructured Network status information is the HELLO message. HELLO messages are sent routinely, but relatively infrequently, for example, every 90 Access Intervals. The HELLO transmission interval is tied to the Priority SYNC interval, so that the HELLO interval corresponds to Access Intervals where SYNC is transmitted if the network is lightly utilized.

Figure 8:
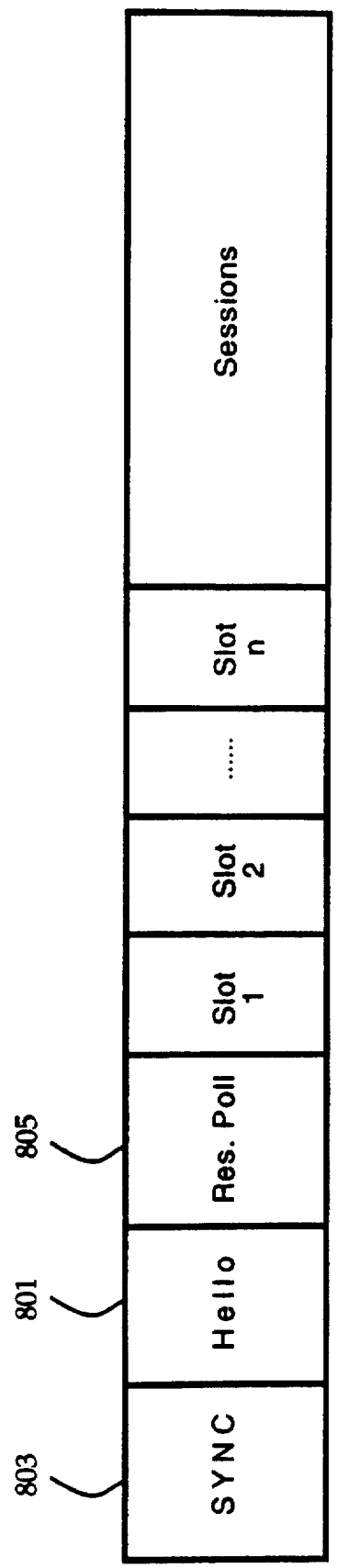
FIG. 8 illustrates a preferred embodiment of an access interval used by the hierarchical network of the present invention.

In an alternate embodiment, HELLOs could be inserted as a broadcast message at the beginning of the Sessions period. FIG. 8 illustrates a preferred Access Interval embodiment where a HELLO message (801) is inserted between a SYNC (803) and a Reservation Poll (805). The SYNC frame at the beginning of the Access Interval indicates that the Access Interval will contain a HELLO, allowing power managed devices to remain awake to receive the HELLO.

HELLO messages may also contain information regarding pending changes in the local NET. If the local NET is changing Access Interval durations or hop sequences, for instance, changes may be communicated in several consecutive HELLOs so that the information is reliably communicated to all NET constituents, permitting all devices to make the change in coordinated fashion. Further discussion of HELLO message content is provided below.

For purposes of channel management in the Access Interval structure, the maximum transmission duration by a device should be limited to the time that the device moving at a maximum expected velocity can traverse ¼ wavelength of the maximum carrier frequency. The duration may be further reduced to compensate for link bit error rate characteristics or expected duration or frequency of interference bursts. A maximum transmission duration of 2.5 ms is suitable for 1 MBIT/SEC transmission, with a device velocity of 15 mph, in a multiple NET environment.

Use of spatial or polarization antenna selection diversity is also desirable in indoor propagation environments. First, the receiving unit makes an antenna diversity decision during the preamble portion of each transmission. The antenna used for reception for each device address is then recorded in memory so that the correct antenna will be used for response messages to each address. While diversity selection is only valid for a short time, it is not necessary to age this information, because antenna selection is equiprobable even after diversity information is no longer valid.

The Access Interval structure of the present invention also inherently provides routine channel sounding for each hop. This is important in a frequency hopping system, as channel conditions will vary considerably from frequency to frequency within the hopping sequence. NET constituents must, in most cases, be able to receive SYNC and Reservation Poll transmissions from the Control Point device to attempt inbound access in an Access Interval. This provides a positive indication that the device is not experiencing a channel outage, allowing power saving and eliminating possible channel contention. Channel sounding does not need to be employed during periods where the NET is not busy since contention is unlikely in this situation.

Channel sounding for Outbound messages is accomplished through a Request for Poll/Poll cycle where handshaking messages with short time out periods must be successfully communicated before longer message transmissions may be attempted.

As discussed above with regard to FIG. 1, an Infrastructured Network consists of several base stations (15) located throughout an environment requiring wireless communications, e.g., a building or other facility, or a campus comprised of several buildings. The base stations (15) are placed to provide coverage of intended usage areas for the portable/mobile computing devices (20). Coverage areas must overlap to eliminate dead spots between coverage areas.

The base stations (15) may be interconnected via industry standard LANs, such as IEEE802.3 Ethernet, or IEEE 802.5 Token Ring. The LAN connecting the base stations (15) may be a premises LAN, connecting fixed computing devices that are not part of the radio network. Base stations may be added to an existing LAN without the need to install additional LAN cable. Alternatively, it may be desirable to install base stations on dedicated LAN segments to maximize performance of both the radio network and other collocated computer devices.

Base stations within the Infrastructured Network provide Control Point functions for individual NETs. NETs employ different hopping sequences to minimize potential interference between NETs. Regulatory restrictions generally preclude synchronization of multiple NETs to a single master clock, requiring that individual NETs operate independently from one another. The lack of the ability to coordinate timing or frequency usage between NETs introduces the potential for collisions between independent NETs with overlapping coverage areas.

Figure 9A:
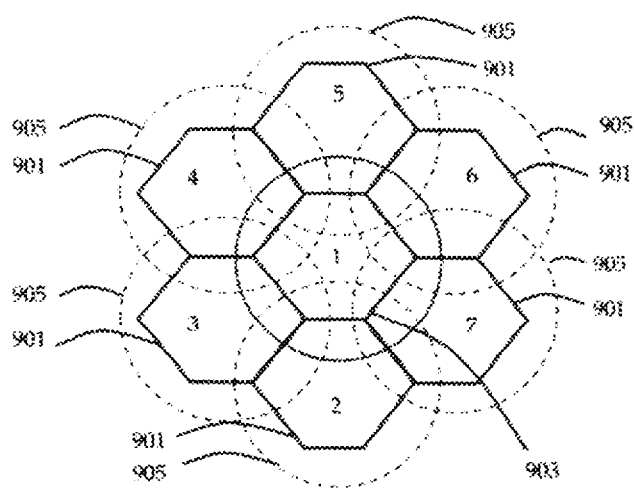
FIGS. 9A and 9B illustrate conceptually how Multiple NETS of the present invention may be employed in an idealized cellular installation.
Figure 9B:
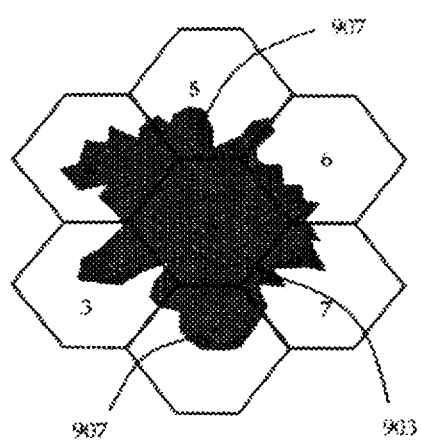

FIGS. 9a and 9b illustrate conceptually how multiple NETs may be employed in an idealized "Cellular" installation, adapted from cellular telephony. Each hexagon (901 and 903) in FIG. 9a represents the primary coverage area of a given NET. Coverage areas are modeled as circles (905) based upon some reliability criterion, for example a 5% mean fragment retry rate (on average 95% of fragments are successfully communicated on the first attempt). Typical coverage areas are determined by physical attributes of the area in which the NET operates. As is illustrated in FIG. 9b for the hexagon (NET) (903) of FIG. 9a, an actual coverage area (907) meeting the reliability criterion is likely to be irregular. This may require base stations to be offset significantly from the hexagonal grid.

Figure 10:
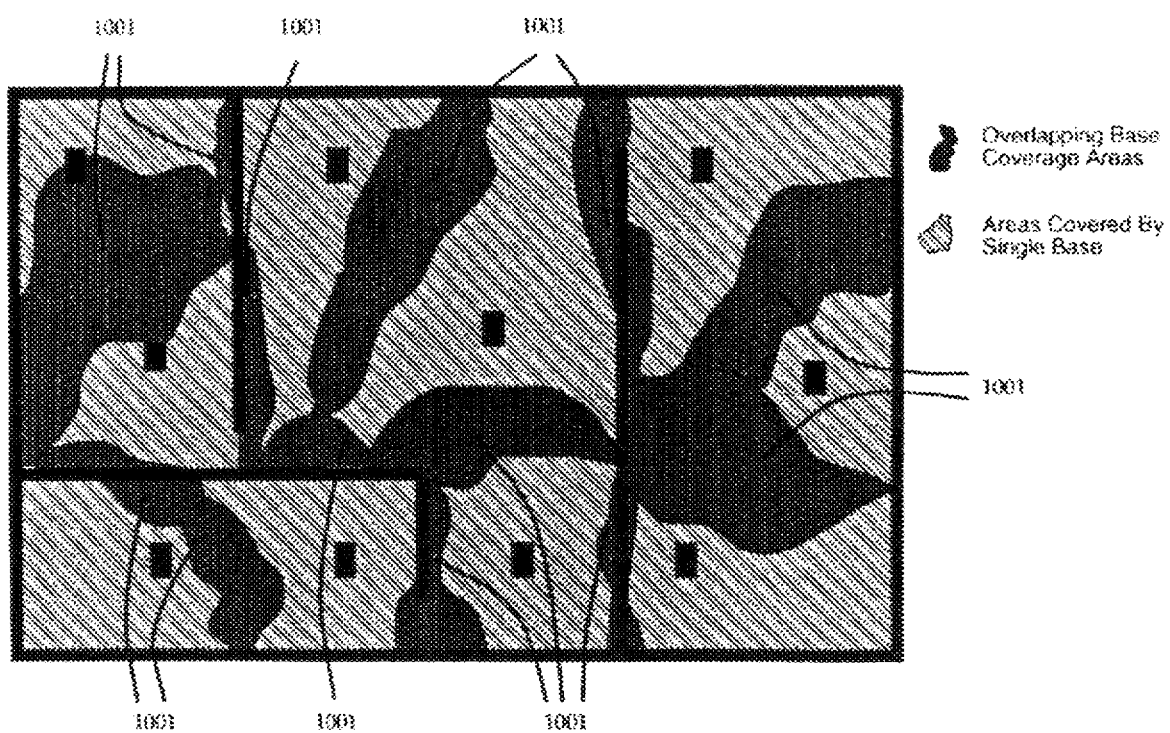
FIG. 10 illustrates a base station coverage contour overlap for the multiple NETs Infrastructured Network of FIG. 1.

FIG. 10 illustrates a coverage contour overlap for the multiple NETs Infrastructured Network of FIG. 1. Darken shaded areas (1001) indicate areas where base station coverage overlaps. Because the coverage distance of a radio system on an instantaneous basis greatly exceeds the coverage that can be provided on average to sustain a given quality of service, the overlap at any instant may be significantly greater than the coverage contours indicate.

Figure 11:
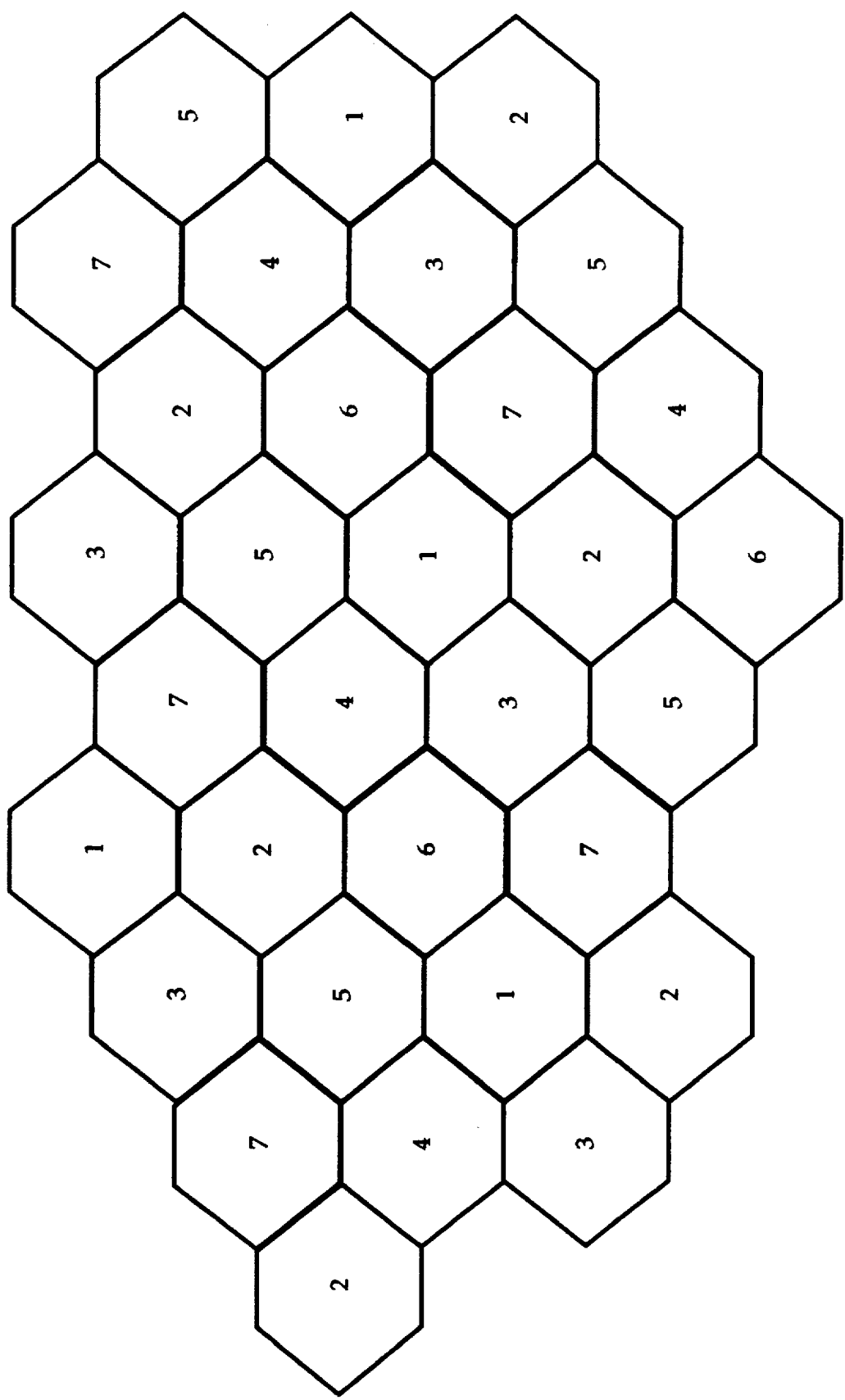
FIG. 11 illustrates hopping sequence reuse in a multiple NET configuration of the present invention.
Figure 12:
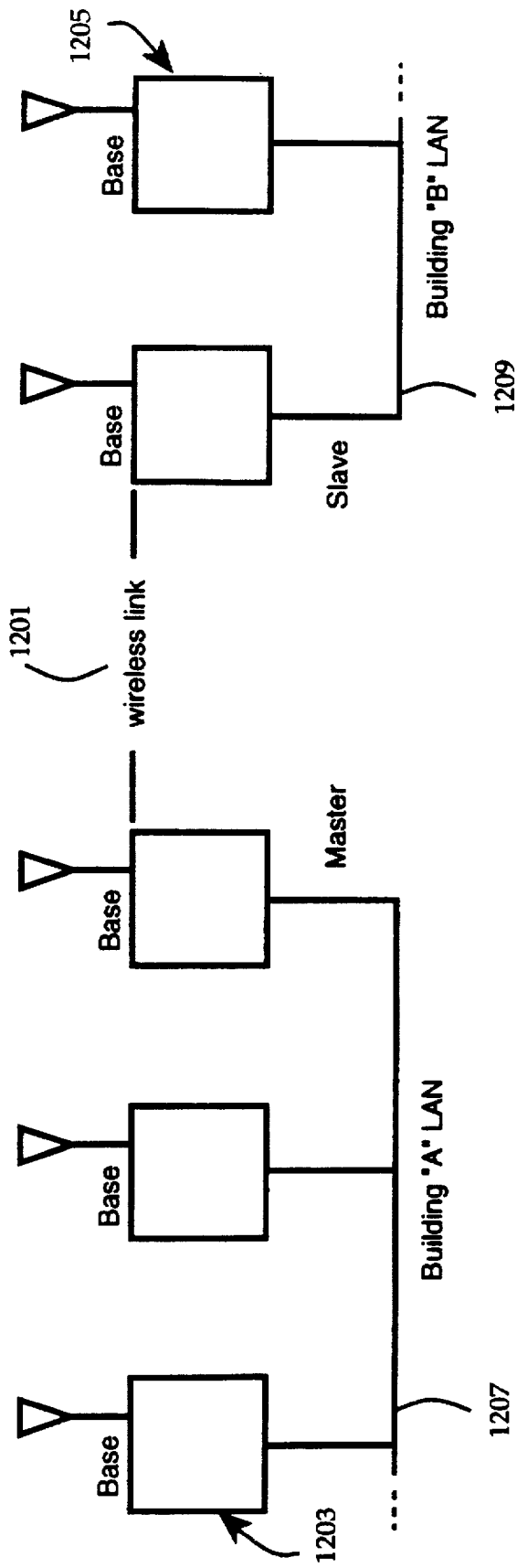
FIG. 12 illustrates a hierarchical infrastructured network of the present invention wherein a wireless link connects base stations on separate hard wired LANs.

FIG. 11 illustrates hopping sequence reuse in a multiple NET configuration. Hopping sequence re-use may be necessary if there are physical constraints on the number of hopping sequences that can be supported. For example, devices may have limited memory available for hopping sequence storage. Use of a smaller set of sequences also simplifies the task of determining sets of sequences that have acceptable cross correlation properties. In FIG. 12, 7 hopping sequences 1 through 7 are used throughout the coverage area. Other NETs may reuse the same hopping sequence at some distance removed. While 7 NETs are illustrated, larger numbers, such as 9 or 15 may provide a better compromise between minimizing the number of hopping sequences used, and reuse distance between NETs using the same sequence. Reuse requires coordination of hopping sequence assignment—either the system installer can coordinate the installation, or the system may include automated management features to assign hopping sequences to individual NETs.

Since NETs are not synchronized, different NETs that use the same hopping sequence are likely to interfere during periods where oscillator drift causes them to be temporarily synchronized. At other times, they may only interfere due to imperfect channelization. For example, for a worst case 100 ppm frequency error between two NETs using the same 79 frequency sequence at one Access Interval per hop and 50 hops per second, NETs will partially or fully overlap for a duration of 10 minutes every 4.3 hours. Typically the frequency error will be 25% to 50% of the worst case, leading to longer overlap periods occurring less frequently.

NETs using the same hopping sequence must be physically isolated from one another to reduce interference to an acceptable level. Extensive hopping sequence reuse generally requires site engineering and optimization of base station placement. Using more hopping sequences reduces the need for critical system engineering during installation. Fifteen hopping sequences is a preferred number for hopping sequence reuse, allowing simplified installation and minimal coordination.

NETs that use different hopping sequences will also temporarily synchronize in timing relationships that cause mutual co-channel interference on common channel frequencies. Since the number of channels that must be used in a sequence is a significant fraction of the total number of channels available, all sequences will share some number of frequencies in common. When sequences are time aligned so that a common frequency is used simultaneously, interference can occur. Optimization of sets of sequences for low cross correlation is necessary to prevent various time alignments of sequences from having more than one or two frequencies in common.

Optimization of hopping sequences for multiple NETs must also include analysis of imperfect channelization. The performance characteristics of the RF modems may not, for economic or power consumption reasons, provide sufficient transmitter spectral containment, receiver dynamic range, or receiver selectivity to guarantee that devices operating on different frequencies in proximity to one another will not interfere. In selecting hopping sequences for desirable cross correlation properties, adjacent and alternate adjacent channel interference must be considered. Protocol retry mechanisms for fragments lost to adjacent channel interference or limited dynamic range may be randomized to prevent continued disruption of communications in the affected NET.

Often in campus environments where systems must provide coverage in several buildings, the cost of wiring LAN cable between base stations is prohibitive. To establish connectivity between base stations in an Infrastructured Network, it may be necessary to provide wireless links between groups of base stations connected to separate LAN segments. FIG. 12 illustrates a wireless link (1201) connecting groups of base stations (1203 and 1205). The base stations (1203 and 1205) are connected on separate LAN segments (1207 and 1209).

In one embodiment, the base stations (1203 and 1205) may be configured in a wireless point to point mode, wherein one base station serves as a control point device while the others operate in a slaved mode dedicated to point to point data transfer. Slave base stations are configured to operate as portable/mobile devices, and forward communications to master bases by sending Request for Polls during reservation opportunities or Implicit Idle Sense periods. Because of the potential high traffic of point to point links, separate NETs may be allocated for this purpose, with a master communicating with one or more slave units. Master units may also communicate with other portable/mobile devices. The COST weighing (discussed below) in a slave's HELLO transmission is preferably set to a high value, to force portable/mobile devices which can connect to another NET to do so.

Figure 13:
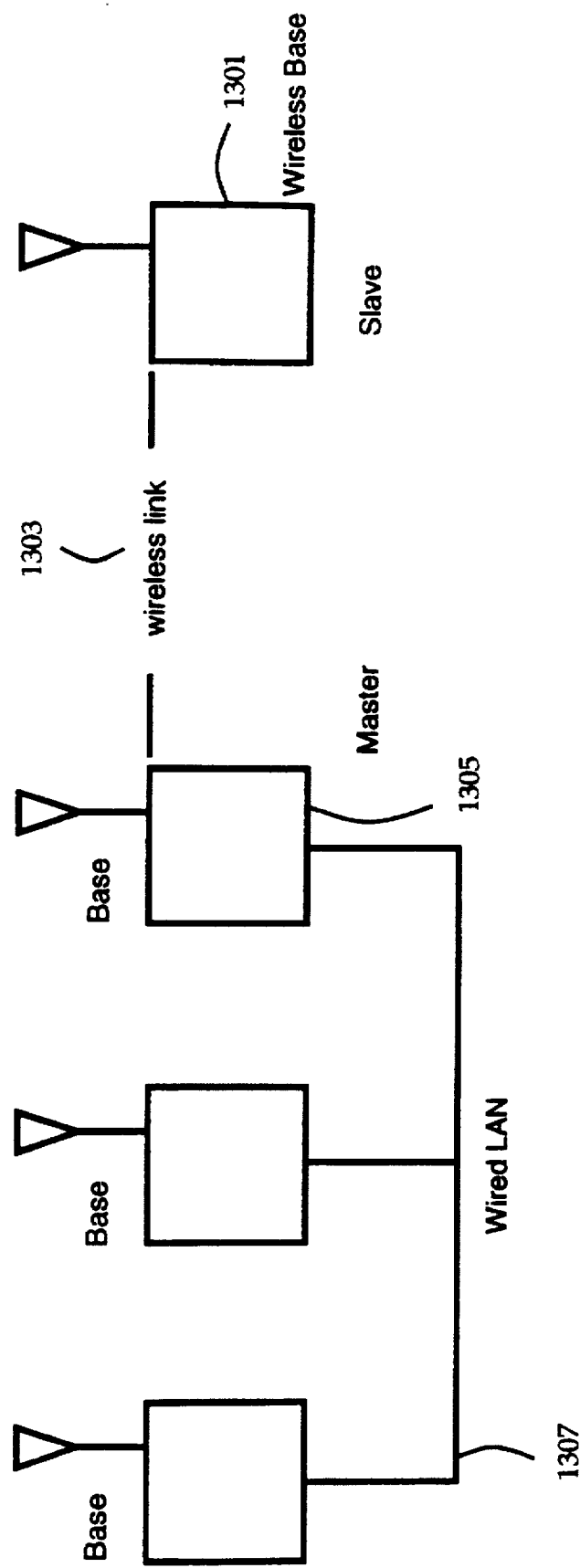
FIG. 13 illustrates a hierarchical infrastructured network of the present invention including a wireless base station.

In another embodiment, it may also be desirable to support wireless base stations. Wireless base stations serve as control points, but are not connected to the infrastructure through a LAN cable. As is illustrated in FIG. 13, a wireless base station (1301) communicates with the Infrastructured Network through a wireless link (1303) to a base station (1305) that is connected to a LAN (1307).

Wireless base stations operate as slave devices to master base stations which are connected to the wired infrastructure. The wired and wireless base stations share the same hopping sequence, and are synchronized as a common NET. Because they are not connected to the Infrastructure, wireless base stations must be used as store and forward devices. Each transmission to a wireless base must be retransmitted to the intended destination device, doubling the number of transmissions occurring in the NET. Wireless base stations are preferably used for supplementing the capabilities of the Infrastructured Network, providing spot coverage of isolated "dead spots" where data traffic is limited or where providing a wired LAN connection is difficult. Wireless base stations may also serve as emergency spares to provide coverage in the event of a failure of a primary base station. In this role, the wireless base station may be either permanently installed in selected locations, or stored in a maintenance area and quickly positioned and connected to AC or battery power to provide communications while repairs are made to the primary wired base station.

The preferred wireless base station embodiment uses interleaved access intervals. The parent wired base station and secondary wireless base station coordinate Access Intervals, the wired base station deferring every third or sixth access interval to the wireless base. Since the wired base station transmits priority SYNC messages every third Access Interval, the wireless base station may routinely be allocated one of the two intervening Access Intervals for priority SYNC communications with devices that are attached to it. Communication between the wired and wireless base stations may occur during Access Intervals initiated by either base station. Wireless base stations may also communicate with devices during an Access Interval using Implicit or Explicit Idle Sense.

This embodiment provides predictable access for devices attached to the wireless NET, and allows the same power management algorithms to be used regardless of whether the base station is wired or wireless. The wireless base station may transmit its own priority SYNC and HELLO messages. Also, devices seeking communications with the wireless base station will automatically be synchronized with the wired base as well, allowing immediate improved access to the network if their mobility has put them within range of the wired base.

Because of the constraint of sharing bandwidth with a wired base station, connectivity of wireless base stations is normally limited to one per wired base station. However, in cases where system loading is predictably and consistently light, multiple wireless base stations could share a single wired base, e.g., each transmitting in turn in the Access Intervals between the Wired Base Priority SYNC Access Intervals.

Wireless base stations are capable of supporting scheduled traffic. However, since each transmission to a wireless base station must be forwarded, scheduled transmissions through wireless base stations use twice the bandwidth as those through wired base stations. In other words, twice the number of Time Division Multiple Access slots must be allocated. To avoid introducing excessive delay, communications must be forwarded during the same Access Interval that they are received, or shorter Access Intervals must be used. Scheduled traffic slot assignments must be common to all wireless bases operating within a single NET.

Wireless base stations require reliable communication with their wired counterparts. This dictates smaller coverage contours for wireless base stations. If a wired base station provides 80,000 square feet of coverage area, a wireless base can be predicted to provide only an additional forty percent coverage improvement, due to overlap with the wired base station. Frequently, base stations are mounted at ceiling level, providing a relatively clearer transmission path between base stations than exists between bases and portable/mobile devices located in more obstructed areas near the floor. With careful site engineering and installation, a wireless base station can provide somewhat better than the forty percent predicted improvement, but still less than the coverage of an additional wired base.

As discussed above, HELLO messages are used to communicate NET and Infrastructured Network Status Messages. They facilitate load leveling and roaming within the Infrastructured Network and allow sequence maintenance to improve security and performance within the NET. HELLO messages occur periodically in Access Intervals that contain priority SYNC messages. HELLOs are sent periodically relative to the sequence length, for instance, every 90 Access Intervals. HELLOs, like SYNC information, are optionally encrypted to provide greater security.

Each HELLO message includes a field for COST. COST is a measure of the base station's ability to handle additional traffic. A device determining which of two or more base stations each with adequate signal strength with which to register will select the base with the lowest COST factor.

The base computes COST on the basis of how many devices are attached to the NET, the degree of bandwidth utilization, whether the base is wired or wireless, the number of frequencies experiencing consistent interference within the sequence, and the quality of the connection the base has within the Infrastructured Network.

Figure 14:
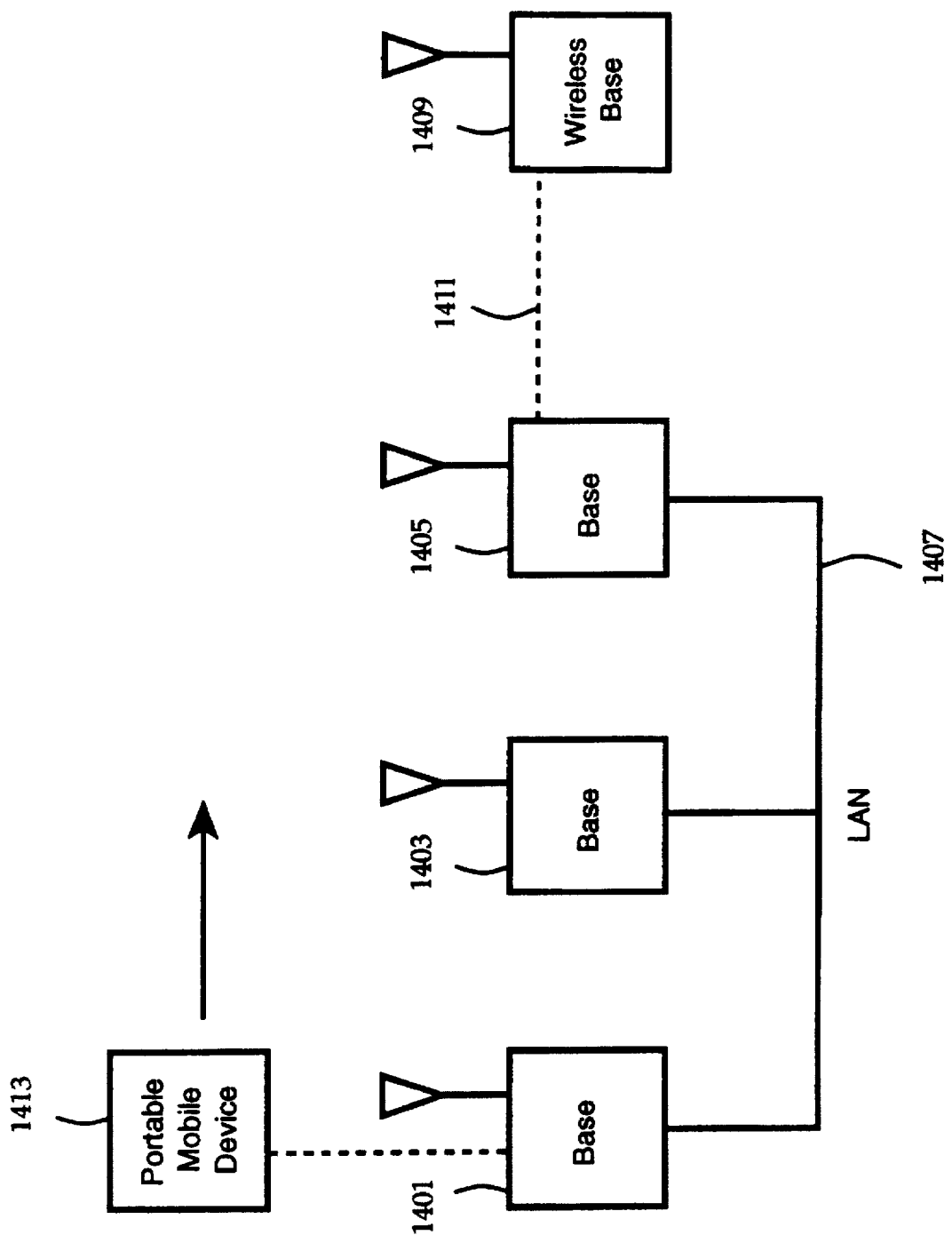
FIG. 14 illustrates conceptually base stations communicating neighboring base station information to facilitate roaming of portable/mobile devices.

FIG. 14 illustrates the concept of base stations communicating neighboring base station information through HELLO messages to facilitate roaming of portable/mobile devices. In an Infrastructured Network base stations (1401, 1403 and 1405) communicate SYNC information amongst themselves via wired backbone (LAN) (1407). In addition, a wireless base station (1409) (discussed above) similarly communicates with the base stations (1401, 1403 and 1405) via a wireless link (1411). A portable/mobile device (1413) is initially registered with base station (1401), which acts as a control point for the portable/mobile device (1413). HELLO messages transmitted by base station (1401) to portable/mobile device (1413) contain fields for neighboring base stations (1403, 1405 and 1409). These fields may indicate, for example, addresses of the neighboring bases, their COST, the hopping sequences, hopping sequence indices, number of Access Intervals per hop, and NET dock. The portable/mobile device (1413) detects the HELLOs transmitted from base station (1401) and uses the information for coarse synchronization with the other base stations (1403, 1405 and 1409). This permits the portable/mobile device to roam between base station coverage areas (i.e., between different NETs) without going through a full acquisition phase. Roaming of portable/mobile devices is discussed in more detail below.

Simply put, communication of neighbors' information permits each base station to advise its associated portable/mobile devices (i.e., those having common communication parameters) on how to capture HELLO messages from neighboring base stations having different communication parameters. Such communication parameters may include, for example, hopping sequences, spreading codes, or channel frequencies.

For example, neighbors' information transmission is appropriate in any case where the system uses more than a single channel. For instance, in a direct sequence architecture, a single spreading code is often used. Capacity can be added to such a network by employing different spreading codes at each base station. The neighbors' information included in the HELLO message from a given base station would include the spreading sequences of base stations providing coverage in adjacent coverage areas. Likewise, in a multiple frequency channelized system, HELLO messages would include the channel frequencies of adjacent base stations.

In addition to facilitating roaming, communication of neighbors' information may also facilitate the initial selection of a base station by a portable/mobile device attaching to the Infrastructured Network for the first time.

Base station HELLO messages may also facilitate adaptive base station transmitter power control. For example, each base station HELLO transmission could specify the transmitter power level being used by the base station. If a given attached portable/mobile device notes that the current base station transmitter power level is unnecessarily high (creating the possibility of interference with other base stations), the portable/mobile unit could send a message to the base station indicating as such, and the base station could adjust the transmitter power level accordingly.

HELLO messages also enable communication of information indicating to all devices that certain changes in the NET are required. For example, the NET may switch hopping sequences periodically to improve security, or to avoid interference sources that consistently interfere with one or two frequencies within a given sequence. Interference may result from outside sources, or from other NETs. Changes to the NET are communicated over the course of several HELLO messages (with a countdown) before the change occurs, so that all devices are likely to be aware of changes and synchronize at the instant of change.

In addition, if encryption is used, the encryption key may be periodically changed in HELLOs. Like hopping sequence changes, KEY changes are sent over several HELLOs, and are encrypted using the existing key until the change goes into effect.

As mentioned above, portable/mobile devices operating in the Infrastructured Network environment will routinely move between base station coverage areas. At the maximum device velocity and expected coverage area per base station, a mobile device may be expected to cross a NET coverage contour in several seconds. Because of the use of multiple, non-synchronized frequency hopping NETs, it is more difficult to provide for simple hand-off between base stations than it would be in a system that used cellular techniques with a single frequency per cell. The Infrastructured Network makes special provisions for roaming by transmitting coarse frequency hopping synchronization information in HELLO messages.

The Infrastructured Network uses a spanning tree algorithm to maintain current information regarding the general location of mobile devices within the network. When a device changes registration from one NET Control Point to another, routing information is updated throughout the infrastructure. Wired base stations may broadcast spanning tree updates to attached wireless base stations.

In the Infrastructured Network, portable/mobile devices initially select and register with a Base Station Control Point on the basis of link quality, i.e., signal quality, signal strength and COST information transmitted within HELLO messages. A device will remain attached to a particular base station until the link quality degrades below an acceptable level, then it will attempt to determine if an alternative NET is available. Different device operating scenarios dictate different roaming strategies, discussed below.

An idle device monitors SYNC and HELLO messages from the Control Point device to maintain NET connectivity. Type 2 devices do not employ power management, and always maintain theft receivers in an active state. They monitor all SYNC messages. Type 1 and Type 3 devices typically employ power management, operating in standby or sleep modes of operation for many Access Intervals before activating their receivers for monitoring SYNC and HELLO messages. Control Points are guaranteed to send Priority SYNC frames every third Access Interval. HELLOs occur every 30 th Priority SYNC frame. Power managed devices employ sleep algorithms synchronized to wake for the minimum period necessary to guarantee receipt of priority SYNC, HELLO, and Pending Message transmissions before resuming SLEEP.

Type 2 devices are typically operated from high capacity vehicular power systems, which eliminates the max for power management. These devices may travel at velocities near the maximum system design specification, dictating more frequent roaming. Type 2 devices will initiate a search for an alternative NET if SYNC messages are consistently received at signal strengths below a Roaming Threshold or if reception errors are consistently detected. Because of the effects of frequency selective fading, signal strength information is averaged over the course of several hops within the hopping sequence.

If roaming is indicated, the device initiates a Roaming Algorithm, using Neighbors' information from the most recent HELLO to attempt synchronization with another candidate NET. If SYNC is not detected within 6 hops, another candidate from the Neighbors list will be selected, and the process repeated. Once SYNC is attained on an alternative NET, the device will monitor signal strength and data errors for several hops to determine link quality. If link quality is acceptable, the device will continue monitoring until a HELLO is received. If COST is acceptable, it will then register with the new NET. The Control Point device will update the Spanning Tree over the wired backbone (or by RF if a wireless base). If link quality or COST is unacceptable, another candidate from the Neighbors list is selected and the process repeated. This continues until an acceptable connection is established. If a connection cannot be established, the device must return to the original NET or employ the initial acquisition algorithm.

Type 2 devices also have the option of monitoring other NETs before degradation of their NET connection. They may do so by monitoring their own NET for the SYNC and pending message list transmissions, then scanning other candidate NETs during the Sessions period of their NET. Other type devices may do so less frequently.

Type 1 and Type 3 devices may sleep extensively when idle, preferably activating every nine Access Intervals to resynchronize and check pending messages. Successful reception of at least one SYNC during three monitoring periods is necessary to maintain fine synchronization to the NET clock. Failure to receive two of three SYNC flames, or receipt of two or three SYNC messages with poor signal strength are possible indications of the need to further test link quality by remaining active for several consecutive SYNC transmissions. If signal strength or data errors over several hops indicates that link quality is poor, or if a received HELLO message indicates high COST, the roaming algorithm is initiated, and alternative NETs are evaluated, as in the case of Type 2 devices.

Some battery powered devices may sleep for periods of time more than nine Access Intervals. For example, devices with extremely limited battery capacity may sleep between HELLOs, or several HELLO periods, after which they must remain active for several consecutive Access Intervals to regain fine synchronization and assess whether to initiate roaming.

A Type 1, Type 2, or Type 3 device that has inbound message requirements immediately activates its receiver and waits for a SYNC and subsequent Reservation Opportunities. A device that does not detect SYNC messages over the course of six Access Intervals immediately initiates the Roaming Algorithm.

Outbound messages for devices that have changed coverage areas, but which have not yet registered with a new Control Point device, are problematic. The Infrastructured Network has forwarded the message to the Base Station that the device had previously been attached to. The base station may poll the device during one or more Access Intervals, then transmit the unit address in the pending message list periodically for several seconds before disregarding it. Once the unit attaches to a base, the message must be transferred from the previous base to that base station for delivery to the unit. All of these activities require transmission bandwidth on either the backbone or RF media, waste processing resources within the Infrastructured Network, and result in delayed delivery.

The Network has no means of distinguishing messages it cannot deliver due to roaming from messages that should be retried due to signal propagation characteristics, interference, or sleeping devices. For this reason, the roaming algorithm may be designed to allow devices to quickly detect that they have lost connectivity within their current NET, and re-attach to a more favorably located base station.

Some improvement in delivering pending messages to roaming terminals can be obtained by routinely propagating pending message lists over the wired backbone. When a device attaches to a base station, that base is able to immediately ascertain that the device has a pending message, and initiate forwarding of the message for delivery to the device.

In the preferred frequency hopping embodiment of the present invention, the hopping sequence consists of $3m\pm1$ frequencies, where m is an integer. 79 frequencies are preferred. This embodiment will support hopping rates of 100, 50 hops per second at 1 Access Interval per dwell, 25 hops per second at 2 frames per dwell, and 12.5 hops per second at 4 frames per dwell. Other rates can be supported for other Access Interval Durations. For example, if the Access Interval is optimized to 25 ms, hop rams of 80, 40, 20, and 10 hops per second would be supported.

All devices within the NET may have one or more hopping tables that contain potential hopping sequences that may be used. Up to 64 sequences may be stored in each device. Each sequence has an identifier, and each frequency in each sequence has an index. The sequence identifier and index are communicated in the SYNC transmission.

All SYNC transmissions may be block encrypted to prevent unauthorized devices from readily acquiring hopping synchronization information. To facilitate encryption, the encryption key may initially be factory set to a universal value in all devices. Users would then have the option of changing this key, by providing a new key to each device in the system. This may be accomplished through keyboard entry or other secure means. Keys may also be changed through the NET.

To facilitate hopping management, a hopping control portion of a protocol controller will download a hopping table to a radio modem, and will signal the radio modem when to hop. This approach consolidates timing functions in the protocol controller, while not requiring the controller to be concerned with conveying frequency selection data to the modem each hop.

The NET may switch hopping sequences periodically to improve security, or to avoid interference sources that consistently interfere with one or two frequencies within a given sequence. As mentioned above, changes to the NET are communicated over the course of several HELLO messages before the change occurs so that all devices are likely to be aware of changes.

Initial synchronization requires devices to ascertain the hopping sequence, the hop rate, and the specific frequency from the hopping sequence currently in use. Synchronization information is contained in two types of routine messages. The SYNC field at the beginning of an Access Interval contains synchronization information including the hopping sequence, the index of the current frequency within the sequence, the number of Access Intervals per hop, and the length of the Access Interval. It also contains a timing character that communicates the NET master dock to all listening devices. Termination messages in the Sessions period, ACK and CLEAR, contain the same information, but do not contain the timing character.

The simplest method for attaining synchronization is to Camp—select a quiet frequency that is likely to be within a sequence in use—and listen for valid synchronization information. If a SYNC message is detected, the listening device immediately has both coarse and fine synchronization, and can begin the registration process.

If SYNC is not detected, but a termination message is, then the device has acquired coarse synchronization. The particulars of the hopping sequence are known, but the boundaries of the dwells are not. To acquire fine synchronization, it begins hopping at the indicated hopping rate, listening for SYNC. If SYNC is not detected after a reasonable number of hops, preferably 12 or 15, the device reverts to camping.

The worst case scenario for synchronization is to synchronize to a single NET that is idle. Given a 79 frequency hopping sequence, one Access Interval per hop, and SYNC transmissions every third Access Interval if the NET is idle, it may take nine cycle times to guarantee that a SYNC transmission will be detected with 99.5% probability. At 50 hops per second, synchronization could require as long as 14 seconds. At 100 hops per second, 7 seconds is required.

At 2 Access Intervals per hop, a SYNC transmission is guaranteed to occur every frequency over 2 cycles of the hopping sequence. Six cycles are required for 99.5% probability of acquisition, corresponding to 19 seconds at 25 hops per second. At 4 Access Intervals per hop, at least one SYNC is guaranteed to occur each hop. Three cycles of the hopping sequence are required for 99.5% acquisition probability. At 12.5 hops per second, this also requires 19 seconds.

This illustrates the advantage of scalability. A device that uses an acquisition algorithm suitable for 2 or 4 Access Intervals per hop will also acquire a NET that hops at 1 Access Interval per hop. The algorithm may be as follows:

1. The device scans candidate frequencies until it finds one with no Received Signal Strength Indicator indication.
2. The device remains on the frequency for 6.32 seconds (2 Access Interval/hop @25 Hops/second×2, or 4 Access Interval/hop @12.5 hops/second×1), or until it detects a SYNC message or a valid terminating message.
3. If SYNC is detected, the device synchronizes its internal clock to the SYNC, and begins hopping with the NET for the next 11 hops. It may attempt registration after detecting valid SYNC and any Reservation Opportunity. If synchronization is not verified by detection of SYNC within the 11 hops, the acquisition algorithm is reinitialized.
4. If a message termination (either an ACK or CLEAR) is detected, the device immediately hops to the next frequency in the sequence and waits for the SYNC. It is coarsely synchronized to the NET but has a timing offset from the NET clock.

When the next SYNC is received, the device synchronizes its dock to the NET dock and initiates registration. If SYNC is not received within a dwell time, the device hops to the next frequency in sequence. This continues until SYNC is attained, or until 15 hops have passed without receiving SYNC, after which the acquisition sequence is restarted.

5. If coarse acquisition is not obtained within 6.3 seconds, the device selects another frequency and repeats the process beginning with step (2).

Camping provides a worst case acquisition performance that is perceptibly slow to the human user of a portable device. The preferred approach has the receiver scan all potential frequencies in ascending order, at 125 μsec increments. When the highest frequency is reached, the search begins again at the lowest frequency. The 125 μs sampling rate is much faster than the 250 μsec channel switching time specification of the RF modem. This is possible because the overall switching time specification applies to worst case frequency switching intervals, i.e., from the highest to the lowest operating frequency. By switching a single channel at a time, switching may be maintained over frequency intervals very near a synthesizer phase detectors' phase lock range, allowing nearly instantaneous frequency switching. The change from highest to lowest frequency at the end of the scan requires the standard 250 μsec.

The 125 μsec monitoring interval allows 85 μs to ascertain if receive clock has been detected prior to switching to the next frequency. The monitoring interval should be selected to be non-periodic with respect to the access interval. For example, the 125 μsec interval allows the entire hopping sequence to be scanned 2(n+1) times in a 20 ms access interval.

If clock is recovered at any frequency, the receiver remains on frequency for a Reservation Opportunity and initiates channel access through the procedure described above. The scanning approach is less deterministic in terms of acquisition probability than camping, but the search time required for 99.5% acquisition probability is about 80 Access Intervals, or three times faster than that for camping.

A hybrid approach that scans only three or four consecutive frequencies incorporates the deterministic aspects of camping with some of the improved performance of the scanning algorithm. For scanning over a small number of frequencies an up/down scan is preferred, i.e., 1,2,3,2,1,2,3 since all frequency changes can be accomplished at the faster switching rate. The end frequencies are visited less often than those in the center. The number of frequencies used, e.g., 3 or 4, is selected so that all can be scanned during the preamble duration of a minimum length transmission.

All devices are required to have unique 48 bit global addresses. Local 16 bit addresses will be assigned for reduced overhead in communications. Local addresses will not be assigned to devices whose global addresses are not on an authentication list maintained in each base station and routinely updated over the infrastructure.

Once a device has attained synchronization, it must register with the control point to be connected with the NET. It initiates this by sending a Request for Poll indicating a registration request, and including its global address. The control point will register the device, and provide a short. Network Address as an outbound message. The Control point will generate the short address if it is a single NET, or exchange the global address for a short Network Address with a Network Address Server if the NET is part of a larger Infrastructured Network.

Once a device is synchronized to a NET, it must periodically update its local clock to the NET clock communicated in the SYNC message. The SYNC message contains a character designated as the SYNC character that transfers the NET clock synchronization. This may be the beginning or ending FLAG in the SYNC message, or a specific character within the message.

The maximum expected frequency error between NET and device local clocks is 100 parts per million. To maintain a 50 µs maximum clock error, the local device clock must be re-synchronized at 500 ms intervals. At 20 ms per access interval, a non-sleeping device has up to 26 SYNC opportunities within that period in which to resynchronize and maintain required accuracy.

As mentioned above, it is desirable that battery powered devices have the capability to sleep, or power off, for extended periods of time to conserve power. The term sleeping terminal in this instance may refer to a device that powers down its radio communication hardware to save power while maintaining other functions in an operational state, or a device that power manages those functions as well. In the power managed state, the device must maintain its hop clock so that full acquisition is not required every time power management is invoked.

Devices that must sleep to manage their power consumption use Priority SYNC Messages to maintain synchronization. Priority SYNC Messages occur every three Access Intervals. In times of low NET activity, non-priority SYNC messages are omitted. By coordinating power management with Priority SYNC Messages, power managed devices can be guaranteed to wake up for Access Intervals where SYNCs will be present, even if the NET activity is low during the sleep period.

Figure 17:
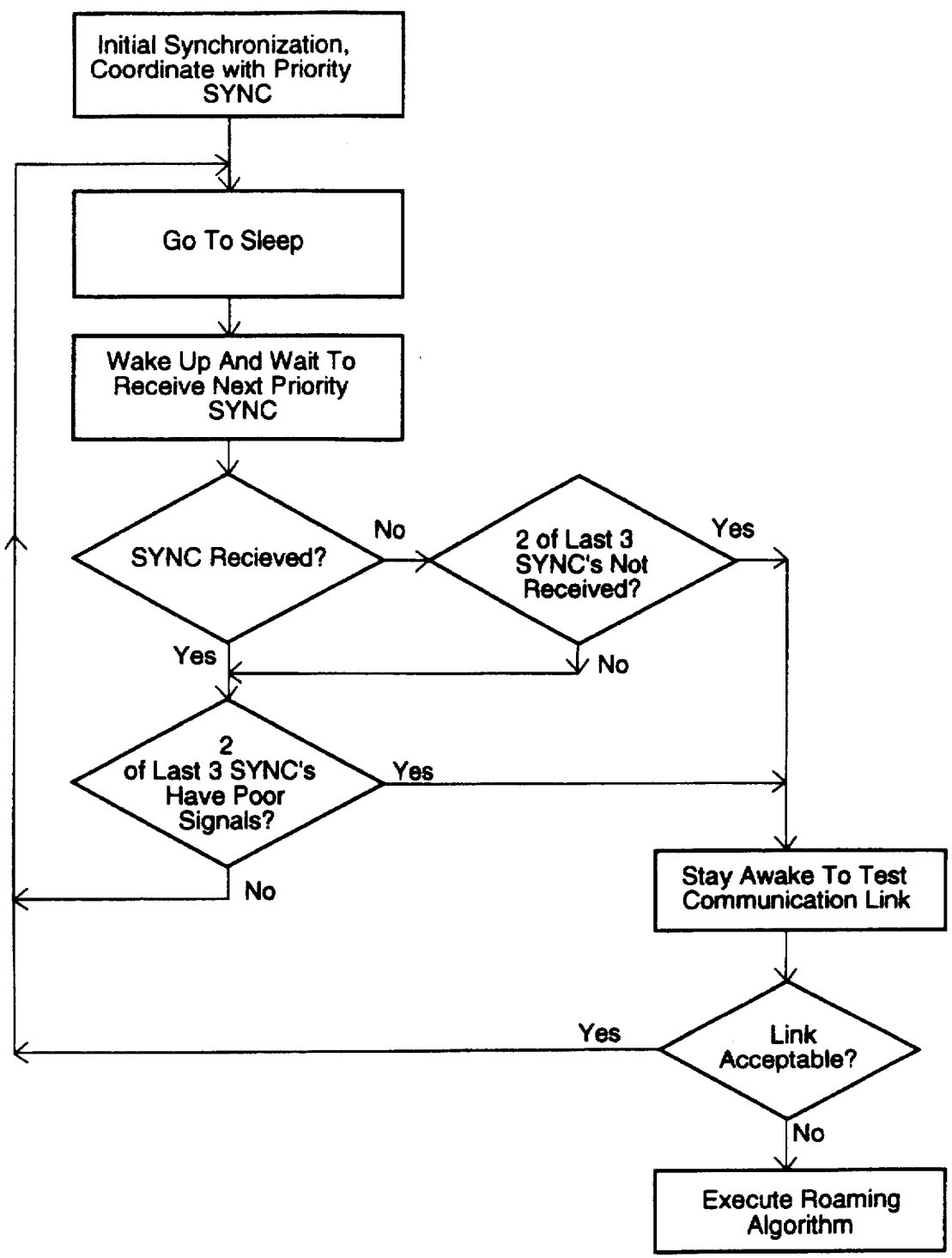
FIG. 17 is a flow chart illustrating a terminal maintaining synchronization with the network after it has gone to sleep for several access intervals.

A sleeping device with no transmission requirements may sleep for eight 20 ms access intervals, and wake only for the SYNC and Reservation Poll at the beginning of the ninth Access Interval to monitor pending messages before returning to the sleep state, for a duty cycle of less than 5%. This provides three opportunities to synchronize to the NET clock within a 540 ms window. A flow chart depicting the a device sleeping for several access intervals is shown in FIG. 17.

Figure 18:
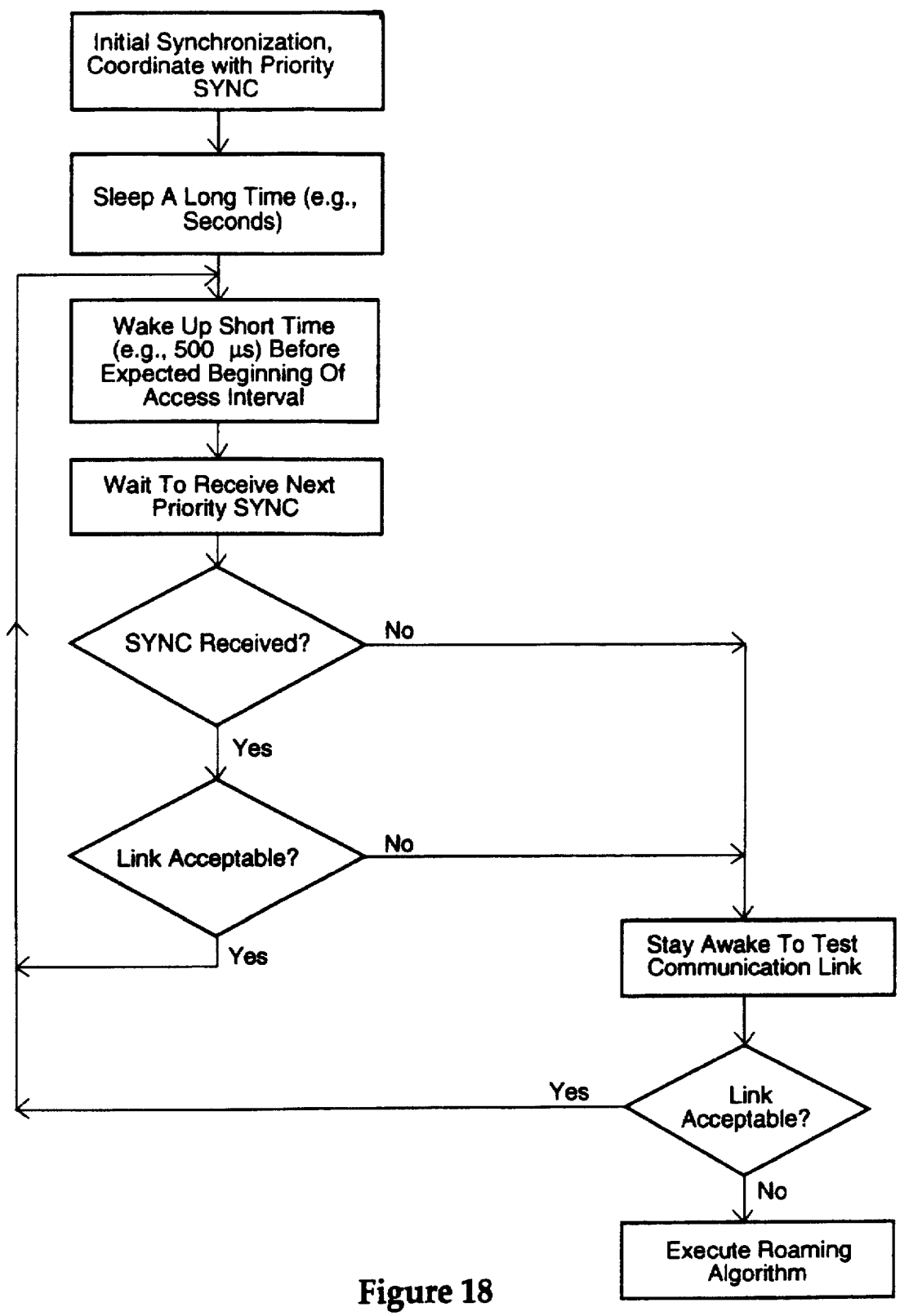
FIG. 18 is a flow chart illustrating a terminal maintaining or achieving synchronization with the network after it has gone to sleep for several seconds.

Devices may also sleep for longer periods of time, at the risk of losing fine synchronization. They may compensate by advancing their local clocks to account for the maximum timing uncertainty. For example, a terminal could sleep for 5 seconds without re-synchronizing by waking up 500 microseconds before it expects an Access Interval to begin, and successfully receive SYNC messages. This technique is valid for extended periods of time, up to the point where the maximum timing error approaches 50% of an Access Interval. A flow chart depicting the a device sleeping for several seconds is shown in FIG. 18.

A power managed device that requires communication during a sleep period may immediately wake and attempt access to the NET at the next available Reservation In the case of Infrastructured Networks, a device requiring communications may be able to register with one of several NETs operating in its vicinity. In the multiple NET case, transmissions may occur on many frequencies simultaneously. A good strategy is to synchronize to a NET that provides an acceptable communication link, then monitor HELLO messages to determine other candidate NETs before attaching to a particular NET by registering with the control point device.

A Spontaneous Wireless Network is one that is established for a limited time for a specific purpose, and which uses no infrastructure to facilitate communications between devices or provide access to outside resources. Use of spontaneous networking allows portable devices to share information, files, data, etc., in environments where establishment of an Infrastructured Network is not economically or physically possible. A Spontaneous Networking capability allows portable/mobile devices to have an equally portable network.

Requirements for Spontaneous Networks differ from Infrastructured Networks in several significant areas. The number of devices in a Spontaneous Network is likely to be smaller than the number that a single NET in an Infrastructured Network must be capable of supporting. In addition, coverage areas for Spontaneous Networks are typically smaller than coverage areas for an Infrastructured Network base station. Communication often takes place over relatively short distances, where devices are within line of sight of each other and where users are within speaking range. Furthermore, there is no roaming within a Spontaneous Network. Devices that travel out of communications range are no longer part of the network.

In an Infrastructured Network, the majority of communications are likely to involve other resources that are interconnected with the infrastructure. Portable devices with limited processing capabilities, memory, and power supplies are able to access large data bases or powerful computing engines connected to the AC power grid. Base stations within the Infrastructured Network are well suited to the role of Control Points for managing synchronization and media access within each NET.

In a Spontaneous Network, however, communications are limited to exchanges within the NET. Additionally, NET constituents may potentially leave at any time, making it difficult to assign control point responsibilities to a single device. A shared mechanism for synchronization and media access is preferable in most cases.

While use of scheduled transmission is likely in Spontaneous Networks, applications of scheduled services may differ from those provided through a network infrastructure. Applications such as messaging and two way voice communications are unlikely, whereas video transmission and telemetry exchange may be prevalent.

Battery power limitations may preclude assignment of a single device as a control point within a Spontaneous Network. The routine transmission of SYNC and access control messages places a significant power drain on a portable, battery powered device. Also, the control point architecture dictates that transmissions intended for devices other than the control point be stored and forwarded to the destination device, further increasing battery drain, and reducing system throughput.

To promote compatibility with Infrastructured Networks, the operational requirements for a portable device within a Spontaneous Network should not be required to be substantially different from those of an Infrastructured Network. The programming for operation in a Spontaneous Network should be a subset or superset of that for a portable device in an Infrastructured Network, so that a given device is readily capable of communication in both network types. Portable devices have limited program storage, memory and processing power. The ability to operate in both Infrastructured and Spontaneous Networks must be provided without requiting the use of complex algorithms, or high performance hardware that is incompatible with the constraints of portable operation.

Use of frequency hopping is desirable in Infrastructured Networks because of its ability to mitigate the effects of interference and frequency selective fading. In the case of the latter, frequency hopping allows systems to be installed with less fade margin than single frequency systems with otherwise identical radio modem characteristics, providing improved coverage.

The potentially smaller coverage area requirement of Spontaneous Networks, however, allows single frequency operation to be considered for some applications. Regulatory structures are in place in some countries to allow single frequency operation in the same bands as frequency hopping systems, providing that single frequency devices operate at reduced power levels. The lower transmit power of single frequency operation and elimination of periodic channel switching are desirable methods of reducing battery drain. The choice of single frequency or frequency hopped operation is dictated by the coverage requirements of the network, and may be left as an option to device users.

As noted earlier, the basic Access Interval structure is suited to single frequency operation as well as to frequency hopping. SYNC messages in a single frequency system substitute a single frequency indication in the hopping sequence identifier field.

A Spontaneous Network comes into existence when two or more devices establish communications, and ceases when its population falls to less than two. Before a Spontaneous Network can be established, at least two devices must agree upon a set of operating parameters for the network. Once the network is established, other devices coming into the network must be able to obtain the operating parameters and acquire access.

In contrast, a NET within an Infrastructured Network continues to exist and operate when its control point device has no constituent devices. The information transmitted within SYNC messages establishes operating parameters for the NET.

Spontaneous Networks require some form of user initialization. For example, device users may verbally communicate a minimal number of system parameters to allow their devices to establish connectivity, or cable devices together for electronic communication. The information required may include a frequency or hopping sequence assignment, designation of a control point, etc. This information may also be stored in memory in all devices that are commonly used together in a Spontaneous Network.

Alternatively, and preferably, system parameters can be exchanged wirelessly through a simple binding protocol resident in all devices. Users may locally start a program in their device that initiates binding. Binding takes place on a single frequency or group of frequencies that is well known to all devices. Binding is discussed in more detail below.

It is desirable in large Spontaneous Networks for one device to be designated as a fully functional control point, providing identical NET operation to a single NET in the Infrastructured Network case. Providing that all devices share a hopping table and encryption key, the designated device would initiate control point activities, and other devices would synchronize to the designated unit. A device with greater battery capacity, or one that can be temporarily connected to AC power is best suited to the dedicated control point function. This architecture is applicable to Client-Server applications (where the server assumes the control point function), or to other applications where a single device is the predominant source or destination of communications. A portable device used as a dedicated control point is required to have additional programming and memory capacity to manage reservation based media access, pending message lists, and scheduled service slot allocations.

In the case where communication requirements are largely peer to peer, and there is not a good candidate for a dedicated Control Point, the Control Point function may be distributed among some or all the devices within the Spontaneous Network. The interleaved Access Interval approach used for wireless base stations is employed. Initially, control point responsibilities are determined during the binding process. Users may have to designate a Control Point device when several candidates are available.

For Spontaneous Networks, Access Intervals may be simplified to reduce power consumption, program storage and processing power requirements for portable devices used as control points. Control Point devices transmit SYNC, pending message lists, and Time Division Multiple Access slot reservations normally, but only use the single slot reservation Poll (Idle Sense Multiple Access). The reservation poll contains a field indicating reduced control point functionality. This places other devices in a point-to-point communication mode, using the Implicit Idle Sense Algorithm. The probability factor p communicated in the reservation poll is used for the Implicit Idle Sense algorithm. Control point devices may use the deferred SYNC mechanism for light system loading, transmitting Priority SYNC every third Access Interval to further decrease their transmission requirements. Control point devices must monitor the reservation slot for messages addressed to them, but may sleep afterwards.

Request for Polls initiated under Implicit Idle Sense use point-to-point addressing, indicating the address of the destination device directly, rather than the control point device. This eliminates the need for the Control Point device to store and forward transmissions within the Spontaneous Network. The device detecting its address in a Request for Poll begins a session, after employing the Implicit Idle Sense algorithm, by Polling the source address identified in the Request for Poll. The terminating ACK and CLEAR messages contain an Explicit Idle Sense probability factor equal to that in the original reservation poll.

To allow for power managed devices, the Control Point device maintains a pending message list. Devices that have been unable to establish communication with a sleeping device initiate a session with the Control Point device to register the pending message. Upon becoming active, the sleeping device will initiate a Poll to the device originating the pending message. The Control Point device will eliminate the pending message indication by aging, or by receipt of communication from the destination device clearing the pending message. Control point devices are not required to store pending messages, only addresses.

As mentioned above, HELLO messages are broadcast to indicate changes in NET parameters. HELLO messages may be omitted to simplify the Control Point function in Spontaneous Networks.

Devices are assigned local addresses upon registration with the Control Point device. Devices may communicate an alias that identifies the device user to other users to the Control Point device where it is stored in an address table. The address table may be obtained by other network constituents by querying the Control Point device. A Microlink Network is a wireless Local Area Network (LAN) which serves as a short range interconnect between a portable or mobile computing device (MCD) and peripheral devices. The combination of an MCD and peripherals is referred to as a Microlink Group.

Designers of portable products are constantly challenged with reducing size, weight, and power consumption of these devices, while at the same time increasing their functionality and improving user ergonomics. Functions that may be used infrequently, or which are too large to fit within the constraints of good ergonomic design may be provided in peripheral devices, including printers, measurement and data acquisition units, optical scanners, etc. When cabled or otherwise physically connected to a portable product, these peripherals often encumber the user, preventing freedom of movement or mobility. This becomes more problematic when use of more than one peripheral is required.

A second consideration for portable product design is docking. A communication dock is a device that holsters or houses a portable unit, and provides an electrical interconnection for data exchange. Docks may be used for program downloading, data uploading, or communication with large printers, such as those used for printing full sized invoices in vehicular applications. Docking of a portable unit requires mechanical compatibility between the dock mechanism and the portable device.

Portable units are evolving rapidly. The requirement for docking capability forces newer portable product designs to be mechanically compatible with older docking schemes, or may require that new docks, or adapters, be developed for each new generation of portable device. Product specific docking approaches eliminate compatibility between devices manufactured by different suppliers. This has hindered development of uniform standards for Electronic Data Interchange between portable devices and fixed computing systems.

Physical connection between a portable device and a peripheral or dock also hinders user efficiency. Peripheral devices are generally attached with cable. If a peripheral is small enough to be carried or worn on a belt, the mobility of the user may be maintained. If a user must carry a hand-held portable device that is connected to a belt mounted peripheral the assembly cannot be set down while a task that requires movement to a location several feet away is undertaken unless the portable device and peripheral are disconnected. Likewise, connection to peripherals too large to be portable requires the user to frequently connect and disconnect the device and the peripheral.

Use of wireless Microlink interconnection greatly simplifies the task of portable devices communicating with peripherals. In doing so, wireless connectivity allows improved ergonomics in portable product design, flexibility in interconnection to one or more peripherals, freedom of movement over a radius of operation, forward and backward compatibility between portable units and peripherals, and potential communications among products manufactured by different vendors.

Constituents within a Microlink Group generally number six or fewer devices. An MCD and one or two peripherals are a typical configuration. Operating range is typically less than fifty feet.

Operations of peripheral devices are controlled by MCDs. A master/slave protocol architecture is appropriate. Portable computers serving as master are well suited to the role of Control Points for managing synchronization and media access within each Microlink Group. Peripheral communications are slaved to the master.

In contrast to an Infrastructured Network, there is no roaming within a Microlink Network and scheduled services are not supported.

In a Microlink Network, MCDs and wireless peripherals may all operate from battery power. Operating cycles between charging dictate use of power management techniques. A 250 KBPS transfer rate is appropriate in a Microlink Network, reflecting a balance between performance and complexity in peripheral devices. Further, many Microlink Groups may operate simultaneously within a small area.

Microlink Groups can be expected to function within Infrastructured Networks. The communication range, and complexity constraints on peripheral devices, however, dictate the use of single frequency operation for Microlink Groups. The RF modems within Microlink devices use frequency synthesis techniques to determine operating frequency. This allows flexibility in the selection of operating frequency to avoid interference from other systems or sources.

The Access Interval structure is appropriate for Microlink operations. The Microlink Access Interval is a subset of the Access Interval for the Infrastructured Network. HELLO messages, Implicit Idle Sense, Data Rate Switching, and scheduled services are not implemented. Peripheral devices normally sleep, activate their receivers for SYNC transmissions from the Microlink Master, and resume sleeping if no pending messages are indicated and they have no inbound transmission requirements. Access Intervals occur at regular intervals, allowing power management. Access Intervals may be skipped if the master has other priority tasks to complete.

To initialize a Microlink Group, the Microlink Master selects an operating frequency by scanning the available frequencies for one with no activity. Default values for other parameters, including Access Interval duration, are contained within the MCD's memory. Parameters may be adjusted for specific characteristics of members of the Microlink Groups.

Microlink Peripherals must be bound to a master to form a Microlink Group. Binding is initiated by invoking a binding program within the master device. Peripherals are programmed to a receptive state. This may be accomplished by a variety of means, e.g., a key sequence if a peripheral has a keyboard, or by designing peripherals to have a third position on a standard on/off switch.

Binding is accomplished by transmitting Access Intervals of known duration sequentially on a series of four frequencies spread throughout the available frequency range. The frequencies and Access Interval durations used are hard coded into all devices. Use of multiple frequencies prohibits interference on a single frequency from preventing binding.

Peripherals select one of the binding frequencies until the peripherals successfully receive and establish communication with the master. If they do not establish communication after four Access Intervals, they switch to the next frequency for four Access Interval periods. Once they establish communications, the peripherals register with the master and obtain the operating frequency and Access Interval parameters. When all devices have been bound, the user terminates the binding program and normal operation may begin.

A MCD serving as a Microlink Master may itself be a constituent of a larger wireless network. Considerable benefits arise if the radio and processing hardware that supports operation within the wireless network can also support Microlink operation. A device that is capable of frequency hopping is inherently suited to single frequency operation. If it can adjust transmitter power level and data rate to be compatible with the requirements of Microlink peripherals, it can function in both systems.

The major benefits of common hardware between Microlink, and a wider area WLAN include smaller product size, improved ergonomics, and lower cost.

Figure 15:
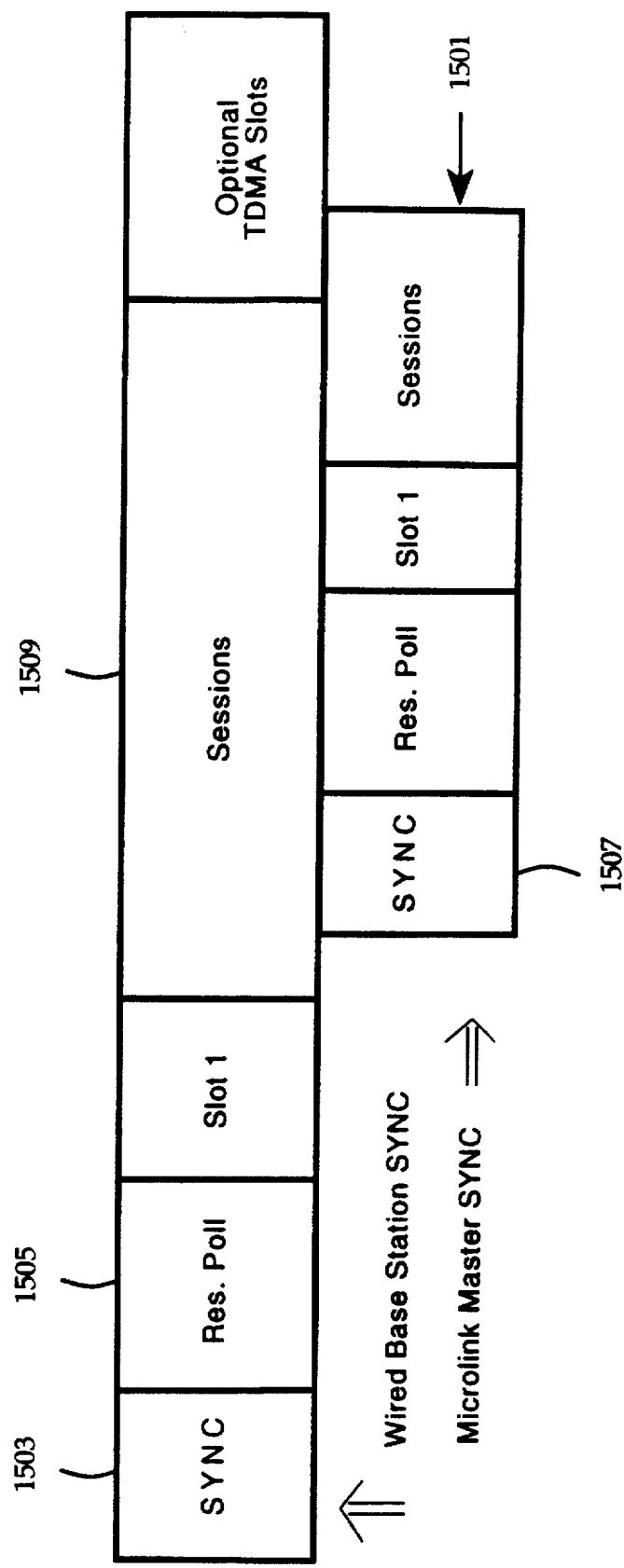
FIG. 15 illustrates a Microlink secondary access interval used by the hierarchical network of the present invention.

Referring to FIG. 15, in a hierarchical network, Microlink Masters use a secondary access interval (1501) that is synchronized to the Access Interval of a parent LAN control point. Microlink Access Intervals occur less frequently than LAN Access Intervals, e.g., every other or every third Priority SYNC Access Interval.

During the LAN Access Interval, the Microlink Master monitors the LAN control point for SYNC (1503) reservation poll (1505) and exchanges inbound and outbound message according to the normal rules of the access protocol. The Master switches to the Microlink frequency, and transmits its own SYNC frame (1507) during the session period (1509) of its parent control point allowing communication with its peripherals. The Microlink Access Interval generally is shorter than the LAN Access Interval, so that it does not extend beyond the LAN Access Interval boundary. At the end of the Microlink Access Interval (1501), the Master switches to the WLAN frequency for the next SYNC (1503).

The secondary SYNC (1507) may only be transmitted if the Microlink Master is not busy communicating through the wider area LAN. If a communication session is occurring, the master must defer SYNC, preventing communication with its peripherals during that Access Interval. The master must also defer SYNC if the current frequency in the LAN is prone to interference from the Microlink frequency, i.e., they are the same frequency or adjacent frequencies. If two consecutive SYNCs are deferred, peripherals will activate their receivers continuously for a period of time, allowing the master to transmit during any Access Interval. This approach is also applicable when the master roams between frequency hopping NETs. Since NETs are not synchronized to one another, the Microlink Group will have to adjust Access Interval boundaries each time the master roams. If peripherals do not detect SYNC within a time-out period, they may duty cycle their reception to conserve battery power.

Figure 16A:
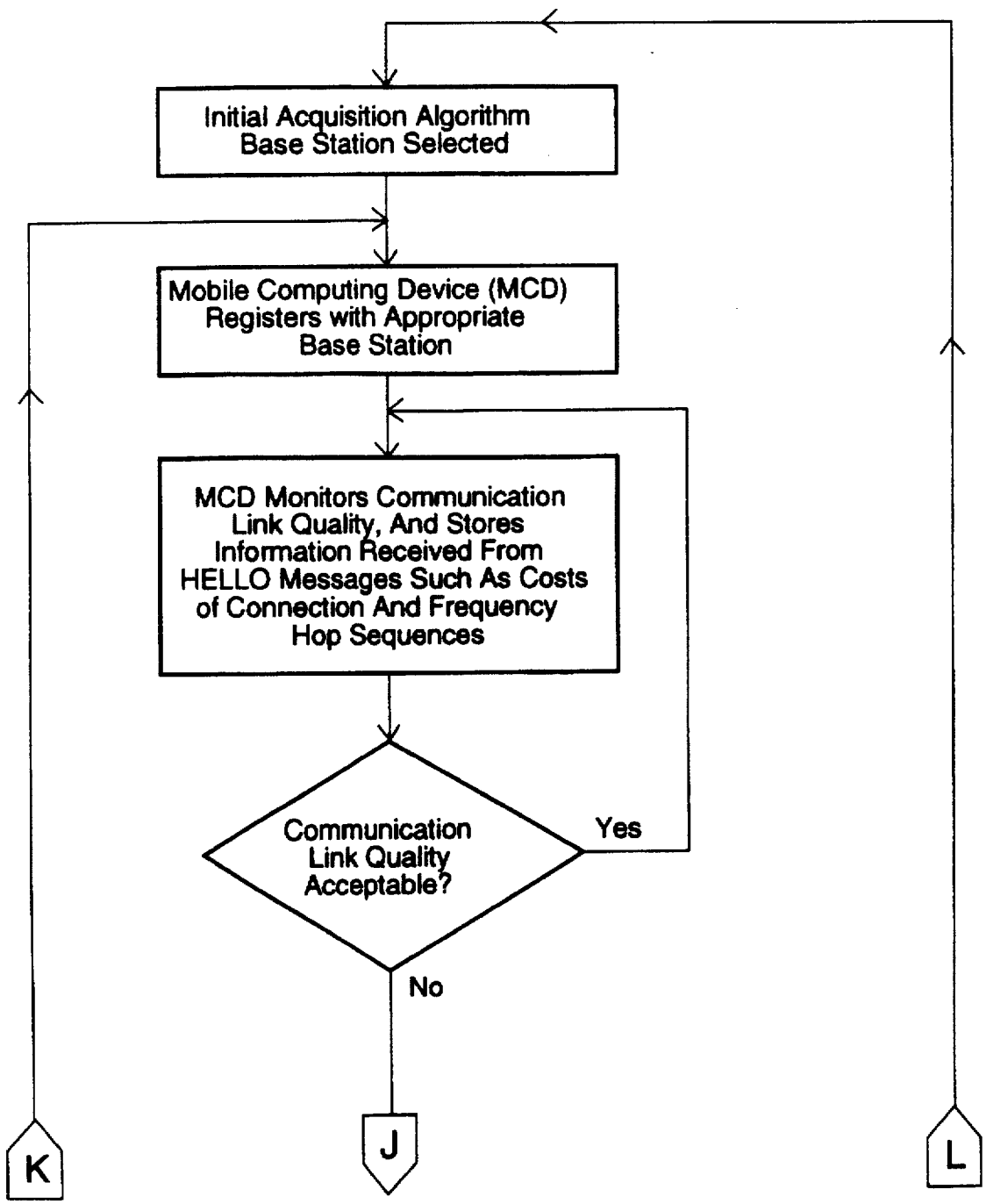
FIG. 16 is a flow chart illustrating how a mobile computing device chooses a base station with which it will communicate.
Figure 16B:
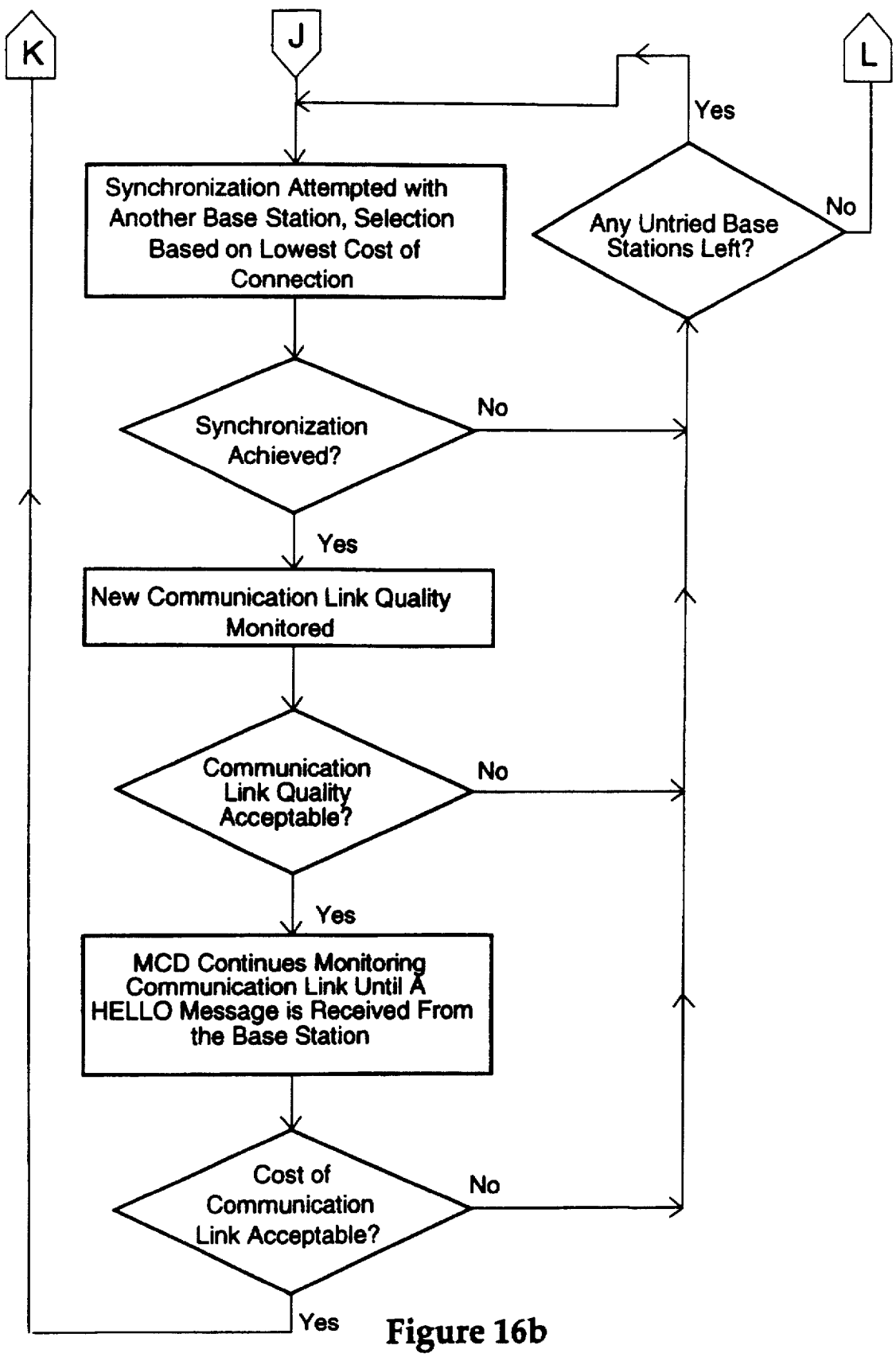

Referring to FIG. 16, a Roaming Algorithm How Diagram illustrates the how a mobile computing device will select a suitable base station. Mobile computing devices operating in the infrastructured network environment formed by the base stations will routinely move between base station coverage areas. The mobile computing devices are able to disconnect from their current base station communication link and reconnect a communication link to a different base station, as necessitated by device roaming.

Base stations transmit HELLO messages to devices in their coverage area. These HELLO messages Communicate to mobile computing devices the cost of connection through the base station, addresses of neighboring base stations, and the cost of connection through these neighboring base stations. This information allows mobile computing devices to determine the lowest cost connection available and to connect to the base station with the lowest cost.

In addition, base station HELLO message may include communication parameters of neighboring base stations, such as frequency hopping sequences and indices, spread spectrum spreading codes, or FM carrier channel frequencies. This information allows mobile computing devices to roam and change base station connections without going through a full acquisition phase of the new base station's parameters.

Mobile computing devices initially select and register with a base station control point on the basis of link quality: signal strength and cost information transmitted within HELLO messages. A device will remain attached to a particular base station until the ink quality degrades below an acceptable level; then it will attempt to determine if an alternative base station connection is available. The device initiates a roaming algorithm, using neighbors information from the most recent HELLO message to attempt connection with another candidate base station. If connection fails, another candidate from the neighbors list will be selected, and the process repeated. Once connection is made with an alternative base station, the device will monitor signal strength and data errors to determine link quality. If link quality is acceptable, the device will continue monitoring until a HELLO message is received. If the cost is acceptable, it will register with the new base station, and the base station will update the spanning tree over the infrastructure. If ink quality or cost is unacceptable, another candidate from the neighbors list is selected and the process repeated. This continues until an acceptable connection is established. If one cannot be established, the device must return to the original base station connection or employ the initial acquisition algorithm.

Figure 28A:
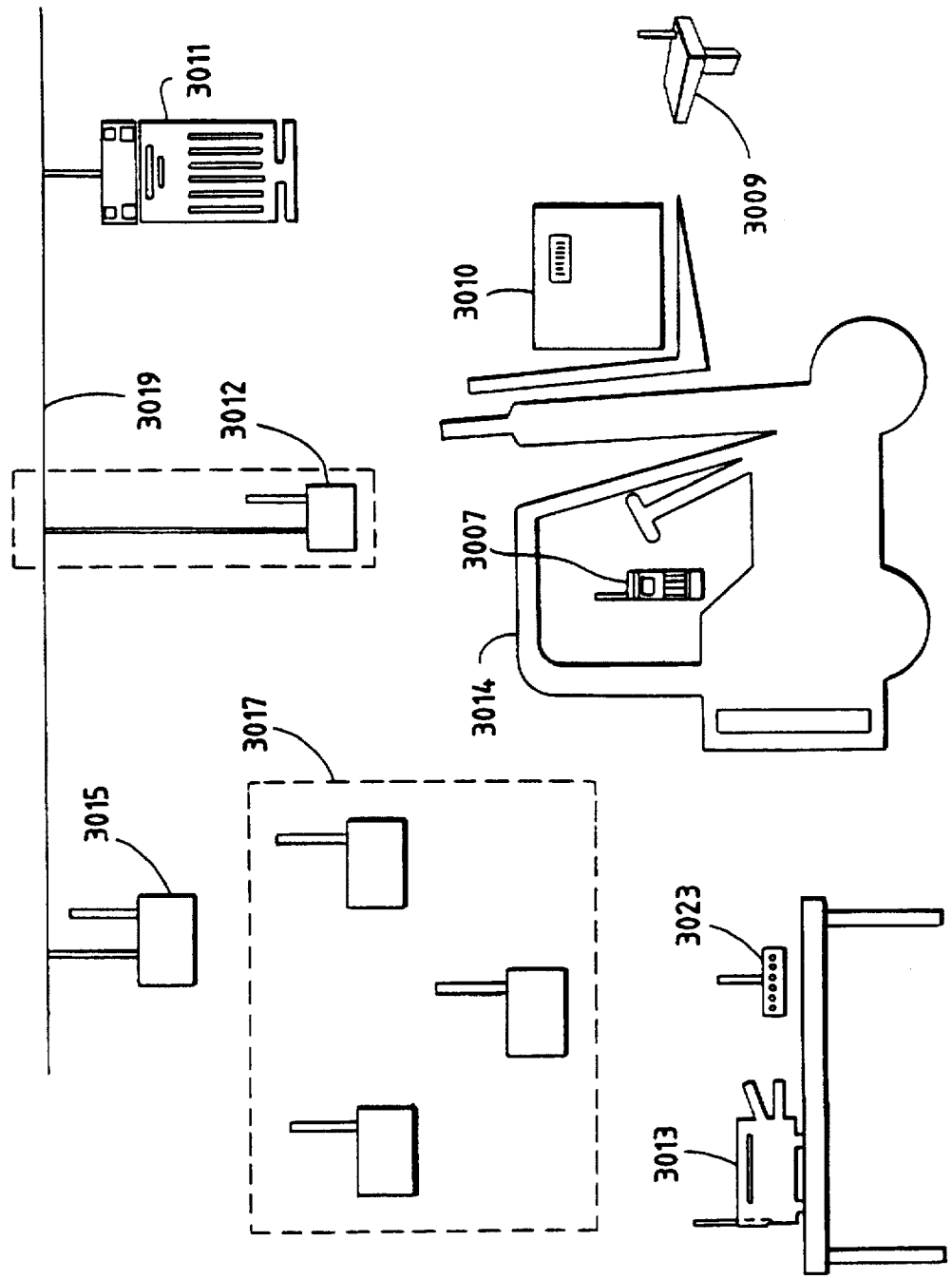
FIG. 28a illustrates a warehouse environment incorporating a communication network which maintains communication connectivity between the various network devices according to the present invention.

FIG. 28a illustrates an embodiment of the hierarchical communication system according to the present invention communication is maintained in a warehouse environment. Specifically, a worker utilizes a roaming computing device, a computer terminal (3007), and a code reader (3009) to collect data such as identifying numbers or codes on warehoused goods, such as the box (3010). As the numbers and codes are collected, they are forwarded through the network to a host computer (3011) for storage and cross-referencing. In addition, the host computer (3011) may, for example, forward cross-referenced information relating to the collected numbers or codes back through the network for display on the terminal (3007) or for printing on a printer (3013). Similarly, the collected information may be printed from the computer terminal (3007) directly on the printer (3013). Other exemplary communication pathways supported include message exchanges between the computer terminal (3007) and other computer terminals (not shown) or the host computer (3011).

Many of the devices found in the illustrative network are battery powered and therefore must conservatively utilize their radio transceivers. For example, the hand-held computer terminal (3007) receives its power from either an enclosed battery or a forklift battery (not shown) via a communication dock within the forklift (3014). Similarly, the code reader (3009) operates on portable battery power as may the printer (3013). The arrangement of the communication network, communication protocols used, and data rate and power level adjustments help to optimize battery conservation without substantially degrading network performance.

In the illustrated embodiment shown in FIG. 28a, the hierarchical communication system of the present invention consists of a premises LAN covering a building or group of building. The premises LAN in the illustrated embodiment includes a hard-wired backbone LAN (3019) and base stations (3015) and (3017). A host computer (3011) and any other non-mobile network device located in the vicinity of the backbone LAN (3019) can be directly attached to the backbone LAN (3019). However, mobile devices and remotely located devices must maintain connectivity to the backbone LAN (3019) through either a single base station such as the base station (3015), or through a multi-hop network of base stations such as is illustrated by the base stations (3015 and 3017). The base stations (3015 and 3017) contain a relatively higher power transmitter, and provide coverage over the entire warehouse floor. Although a single base station may be sufficient, if the warehouse is too large or contains interfering physical barriers, the multi-hop plurality of base stations (3017) may be desirable. Otherwise, the backbone LAN (3019) must be extended to connect all of the base stations (3017) directly to provide sufficient radio coverage. Through the premises LAN, relatively stable, longer range wireless and hard-wired communication is maintained.

Because roaming computing devices, such as the hand-held computer terminal (3007), cannot be directly hard-wired to the backbone LAN (3019), they are fitted with RF transceivers. To guarantee that such a network device can directly communicate on the premises LAN with at least one of the base stations (3015 and 3017), the fitted transceiver is selected to yield approximately the same transmission power as do the base stations (3015 and 3017). However, not all roaming network devices require a direct RF ink to the base stations (3015 and 3017), and some may not require any link at all. Instead, with such devices, communication exchange is generally localized to a small area and, as such, only requires the use of relatively lower power, short range transceivers. The devices which participate in such localized, shorter range communication form spontaneous LANs.

For example, the desire by a roaming terminal to access peripheral devices such as the printer (3013) and modem (3023), results in the roaming terminal establishing a peripheral LAN with the peripheral devices. Similarly, a peripheral LAN might be established when needed to maintain local communication between a code scanner (3009) and the terminal (3007). In an exemplary embodiment, the printer (3013) are located in a warehouse dock with the sole assignment of printing out forms based on the code information gathered from boxes delivered to the dock. In particular, as soon as the code reader gathers information, it relays the information along a peripheral LAN to the terminal (3007). Upon receipt, the terminal (3007) communicates via the premises LAN to the host computer (3011) to gather related information regarding a given box. Upon receipt of the related information, the terminal (3007) determines that printing is desired with the printer (3013) located at the dock. When the forklift (3014) enters the vicinity of the dock, the terminal (3007) establishes a peripheral LAN with the printer (3013) which begins printing the collected code information.

To carry out the previous communication exchange, the printer (3013) and code reader (3009) are fitted with a lower power peripheral LAN transceivers for short range communication. The computer terminal (3007) transceiver is not only capable of peripheral LAN communication, but also with the capability of maintaining premises LAN communication. In an alternate exchange however, the code reader (3009) might be configured to participate on both LANs, so that the code reader (3009) participates in the premises LAN to request associated code information from the host computer (3011). In such a configuration, either the code reader (3009) or terminal (3007) could act as the control point of the peripheral LAN. Alternately, both could share the task.

With capability to participate in the peripheral LAN only, the code reader (3009), or any other peripheral LAN participant, might still gain access to the premises LAN indirectly through the terminal (3007) acting as a relaying device. For example, to reach the host computer (3011), the code reader (3009) first transmits to the computer terminal (3007) via the peripheral LAN. Upon receipt, the computer terminal (3007) relays the transmission to one of the base stations (3015 and 3017) for forwarding to the host (3011). Communication from the host (3011) to the code reader (3009) is accomplished via the same pathway.

It is also possible for any two devices with no access to the premises LAN to communicate to each other. For example, the modem (3023) could receive data and directly transmit it for printing to the printer (3013) via a peripheral LAN established between the two. Similarly, the code reader (3009) might choose to directly communicate code signals through a peripheral LAN to other network devices via the modem (3023).

In an alternate configuration, a peripheral LAN base station (3021) is provided which may be directly connected to the backbone LAN (3019) (as shown) or indirectly connected via the base stations (3015 and 3017). The peripheral LAN base station (3021) is positioned in the vicinity of other peripheral LAN devices and thereafter becomes a control point participant. Thus, peripheral LAN communication flowing to or from the premises LAN avoids high power radio transmissions altogether. However, it can be appreciated that a stationary when peripheral LAN base station may not always be an option when all of the peripheral LAN participants are mobile. In such cases, a high power transmission to reach the premises LAN may be required.

Figure 28B:
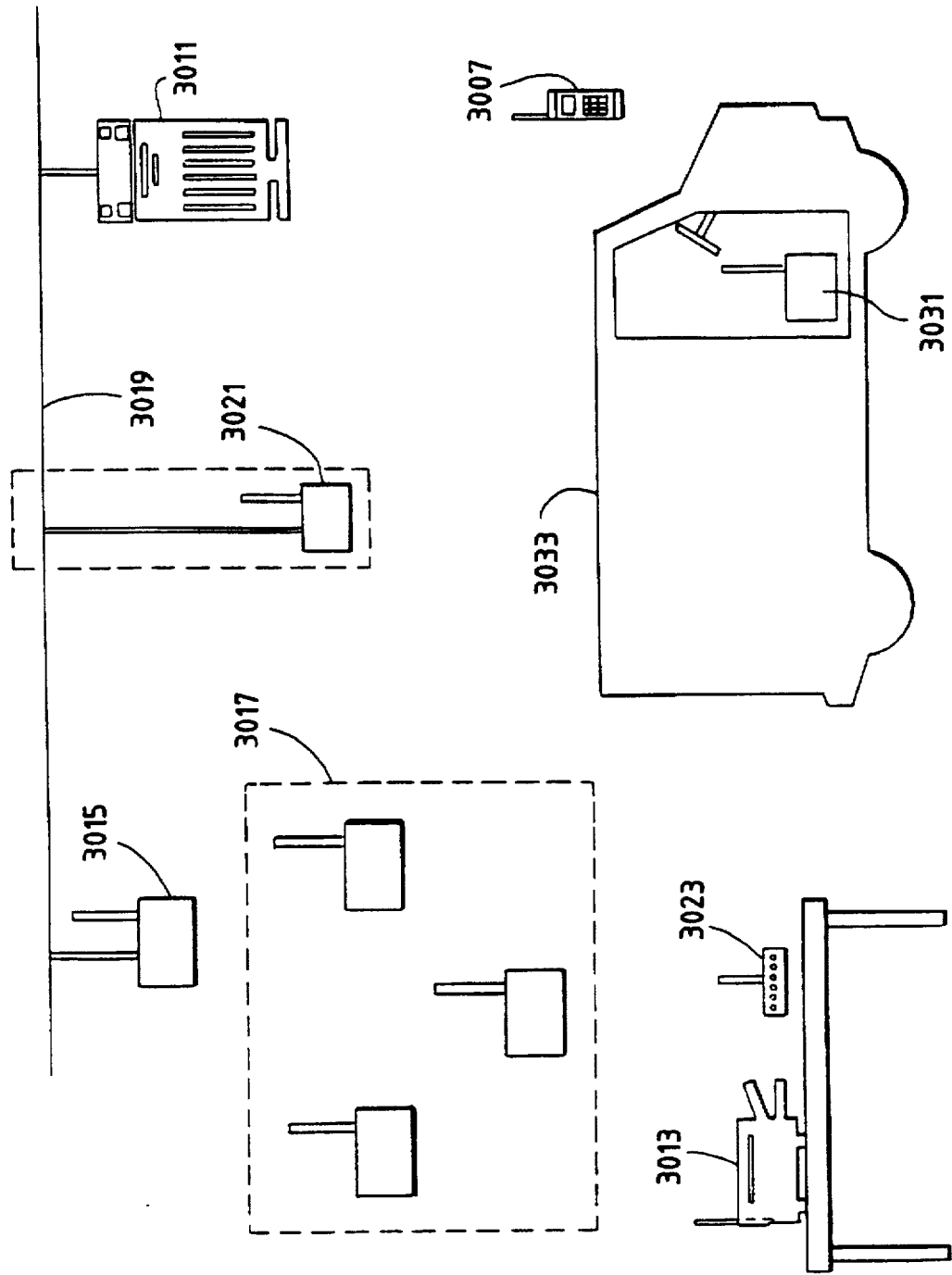
FIG. 28b illustrates other features of the present invention in the use of a vehicular LAN which is capable of detaching from the premises LAN when moving out of radio range of the premises LAN to perform a service, and reattaching to the premises LAN when moving within range to automatically report on the services rendered.

FIG. 28b illustrates other features of the present invention in the use of spontaneous LANs in association with a vehicle which illustrate the capability of automatically establishing a premises and a peripheral LAN when moving in and out of range to perform services and report on services rendered. In particular, like the forklift (3014) of FIG. 28a, a delivery truck (3033) provides a focal point for a spontaneous LAN utilization. Within the truck (3033), a storage terminal (3031) is docked so as to draw power from the battery supply of the truck (3033). Similarly, a computer terminal (3007) may either be docked or ported. Because of greater battery access, the storage terminal (3031) need only be configured for multiple participation in the premises, peripheral and vehicular LANs and in a radio WAN, such as RAM Mobile Data, CDPD, MTEL ARDIS, etc. The storage terminal (3031), although also capable of premises and peripheral LAN participation, need only be configured for vehicular LAN participation.

Prior to making a delivery, the truck enters a docking area for loading. As goods are loaded into the truck, the information regarding the goods is down-loaded into the storage terminal (3031) via the terminal (3007) or code reader (3009) (FIG. 28a) via the premises or peripheral LAN communications. This loading might also be accomplished automatically as the forklift (3014) comes into range of the delivery truck (3033), establishes or joins the peripheral LAN, and transmits the previously collected data as described above in relation to FIG. 28a. Alternately, loading might also be accomplished via the premises LAN.

As information regarding a good is received and stored, the storage terminal (3031) might also request further information regarding any or all of the goods via the peripheral LAN's link to the host computer (3011) through the premises LAN. More likely however, the storage terminal (3031) if appropriately configured would participate on the premises LAN to communicate directly with the host computer (3011) to retrieve such information.

The peripheral LAN base station (3021) if located on the dock could provide a direct low power peripheral LAN connection to the backbone LAN (3019) and to the host computer (3011). Once fully loaded and prior to leaving the dock, the storage device (3031) may generate a printout of the information relating to the loaded goods via a peripheral LAN established with the printer (3013) on the dock. In addition, the information may be transmitted via the peripheral LAN modem (3023) to a given destination site.

Figure 28C:
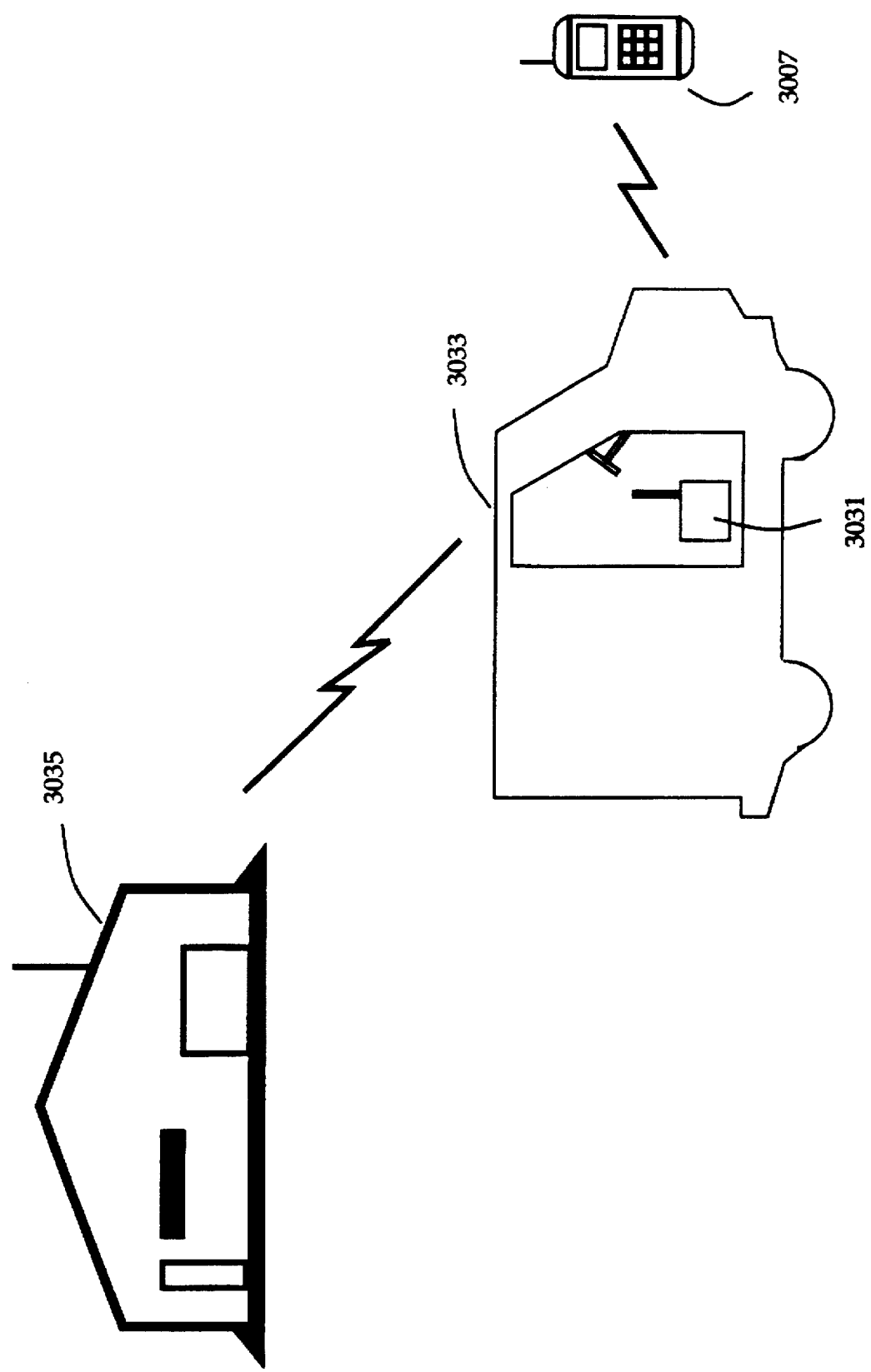
FIG. 28c illustrate other features of the present invention in the use of a vehicular LAN which, when out of range of the premises LAN, is still capable gaining access to the premises LAN via radio WAN communication.

As illustrated in FIG. 28c, once the storage terminal (3031) and hand-held terminal (3007) moves out of range of the premises and peripheral LANs, i.e., the truck (3033) drives away from the dock, the vehicular LAN can only gain access to the premises LAN via the more costly radio WAN communication. Thus, although the storage terminal (3031) might only be configured with relaying control point functionality, to minimize radio WAN communication, the storage terminal (3031) can be configured to store relatively large mounts of information and processing power. Thus, the terminal (3007) can access such information and processing power without having to access devices on the premises LAN via the radio WAN.

Upon reaching the destination, the storage terminal (3031) may participate in any in range peripheral and premises LAN at the delivery site dock. Specifically, as specific goods are unloaded, they are scanned for delivery verification, preventing delivery of unwanted goods. The driver is also informed if goods that should have been delivered are still in the truck. As this process takes place, a report can also be generated via a peripheral or premises LAN printer at the destination dock for receipt signature. Similarly, the peripheral LAN modem on the destination dock can relay the delivery information back to the host computer (3011) for billing information or gather additional information needed, avoiding use of the radio WAN.

If the truck (3033) is used for service purposes, the truck (3033) leaves the dock in the morning with the addresses and directions of the service destinations, technical manuals, and service notes which have been selectively downloaded from the host computer (3011) via either the premises or peripheral LAN to the storage terminal (3031) which may be configured with a hard drive and substantial processing power. Upon pulling out of range, the storage terminal (3031) and the computer terminal (3007) automatically form an independent, detached vehicular LAN. Alternately, the terminals (3007) and (3031) may have previously formed the vehicular LAN before leaving dock. In one embodiment, the vehicular LAN operates using frequency hopping protocol much the same as that of the premises LAN, with the storage terminal (3031) acting much like the premises LAN base stations. Thus, the radio transceiver circuitry for the premises LAN participation may also be used for the vehicular LAN and, as detailed above, a peripheral LAN. Similarly, if the radio WAN chosen has similar characteristics, it may to be incorporated into a single radio transceiver.

At each service address, the driver collects information using the terminal (3007) either as the data is collected, if within vehicular LAN transmission range of the storage terminal (3031), or as soon as the terminal (3007) comes within range. Any stored information within storage terminal (3031) may be requested via the vehicular LAN by the hand-held terminal (3007). Information not stored within the vehicular LAN may be communicated via a radio WAN as described above.

Referring again to FIG. 28b, upon returning to the dock, the storage terminal (3031), also referred to herein as a vehicle terminal, joins in or establishes a peripheral LAN with the peripheral LAN devices on the dock, if necessary. Communication is also established via the premises LAN. Thereafter, the storage terminal (3031) automatically transfers the service information to the host computer (3011) which uses the information for billing and in formulating service destinations for automatic downloading the next day.

Figure 29:
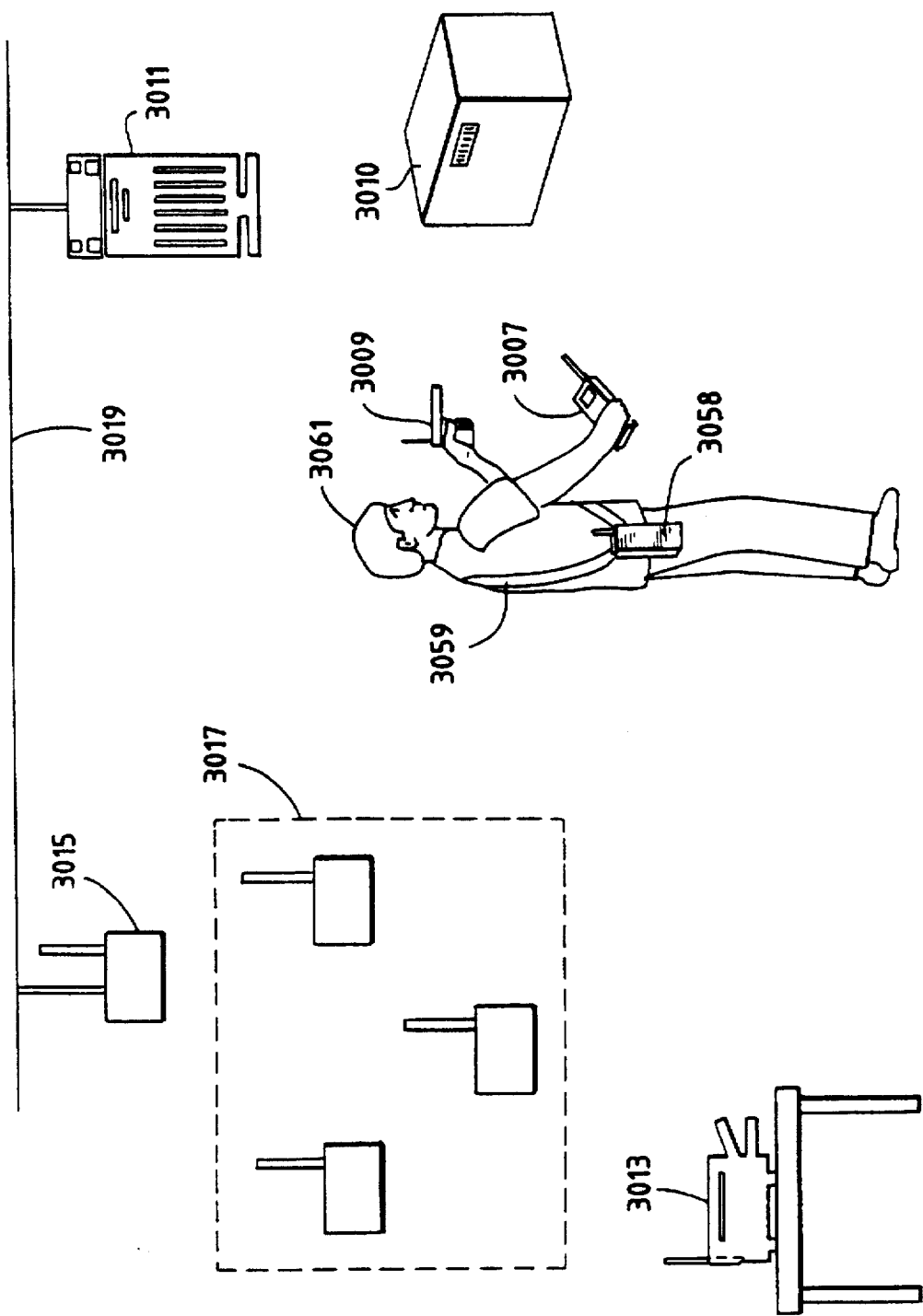
FIG. 29 is a diagrammatic illustration of the use of a peripheral LAN supporting roaming data collection by an operator according to the present invention.

FIG. 29 is a diagrammatic illustration of another embodiment using a peripheral LAN to supporting roaming data collection by an operator according to the present invention. As an operator (3061) roams the warehouse floor he carries with him a peripheral LAN comprising the terminal (3007), code reader (3009) and a portable printer (3058). The operator collects information regarding goods, such as the box (3010), with the code reader (3009) and the terminal (3007). If the power resources are equal, the terminal (3007) may be configured and designated to also participate in the premises LAN.

Corresponding information to the code data must be retrieved from the host computer (3011). The collected code information and retrieved corresponding information can be displayed on the terminal (3007). After viewing for verification, the information can be printed on the printer (3058). Because of this data flow requirement, the computer terminal (3007) is selected as the peripheral LAN device which must also carry the responsibility of communicating with the premises LAN.

If during collection, the operator decides to power down the computer terminal (3007) because it is not needed, the peripheral LAN becomes detached from the premises LAN. Although it might be possible for the detached peripheral LAN to function, all communication with the host computer (3011) through the premises LAN is placed in a queue awaiting reattachment. As soon as the detached peripheral LAN comes within range of an attached peripheral LAN device, i.e., a device attached to the premises LAN, the queued communications are relayed to the host.

To avoid detachment when the terminal (3007) is powered down, the code reader (3009) may be designated as a backup to the terminal (3007) for performing the higher power communication with the premises LAN. As described in more detail below in reference to FIG. 33c regarding the idle sense protocol, whenever the code reader (3009) determines that the terminal (3007) has stopped providing access to the premises LAN, the code reader (3009) will take over the role if it is next in line to perform the backup service. Thereafter, when the computer terminal (3007) is powered up, it monitors the peripheral LAN channel, requests and regains from the code reader (3009) the role of providing an interface with the premises LAN. This, however, does not restrict the code reader (3009) from accessing the premises LAN although the reader (3009) may choose to use the computer terminal (3007) for power conservation reasons.

In addition, if the computer terminal (3007) reaches a predetermined low battery threshold level, the terminal (3007) will attempt to pass the burden of providing premises LAN access to other peripheral LAN backup devices. If no backup device exists in the current peripheral LAN, the computer terminal (3007) may refuse all high power transmissions to the premises LAN. Alternatively, the computer terminal (3007) may either refuse predetermined select types of requests, or prompt the operator before performing any transmission to the premises LAN. However, the computer terminal (3007) may still listen to the communications from the premises LAN and inform peripheral LAN members of waiting messages.

Figure 30:
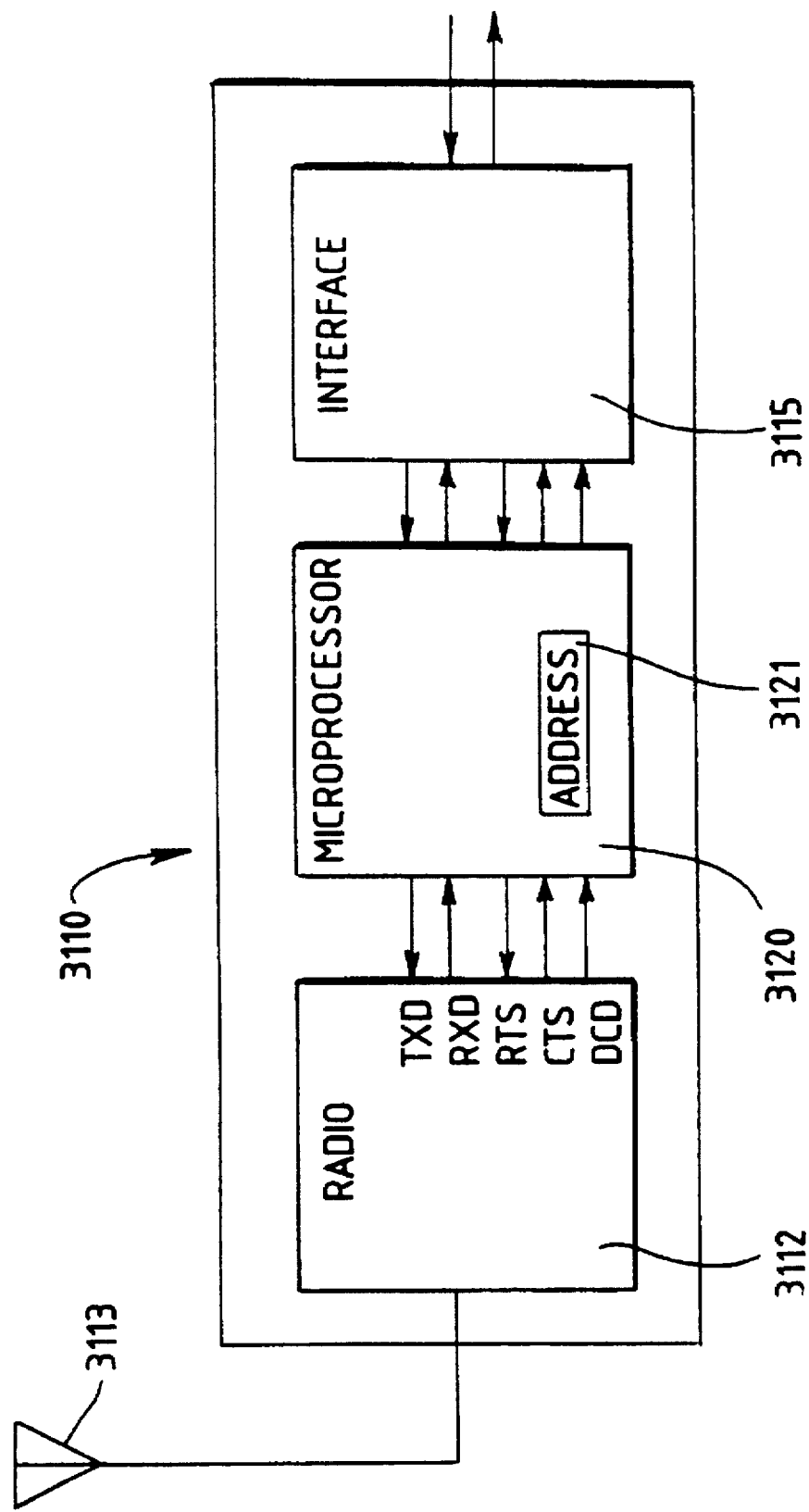
FIG. 30 is a block diagram illustrating the functionality of RF transceivers built in accordance with the present invention.

FIG. 30 is a block diagram illustrating the functionality of RF transceivers built in accordance with the present invention. Although preferably plugging into PCMCIA slots of the computer terminals and peripherals, the transceiver (3110) may also be built-in or externally attached via available serial, parallel or ethernet connectors for example. Although the transceivers used by potential peripheral LAN master devices may vary from those used by peripheral LAN slave devices (as detailed below), they all contain the illustrated functional blocks.

In particular, the transceiver (3110) contains a radio unit (3112) which attaches to an attached antenna 3113. The radio unit (3112) used in peripheral LAN slave devices need only provide reliable low power transmissions, and are designed to conserve cost, weight and size. Potential peripheral LAN master devices not only require the ability to communicate with peripheral LAN slave devices, but also require higher power radios to also communicate with the premises LAN. Thus, potential peripheral LAN master devices and other non-peripheral LAN slave devices might contain two radio units (3112) or two transceivers (3110)—one serving the premises LAN and the other serving the peripheral LAN—else only contain a single radio unit to service both networks.

In embodiments where cost and additional weight is not an issue, a dual radio unit configuration for potential peripheral LAN master devices may provide several advantages. For example, simultaneous transceiver operation is possible by choosing a different operating band for each radio. In such embodiments, a 2.4 GHz radio is included for premises LAN communication while a 27 MHz radio supports the peripheral LAN. Peripheral LAN slave devices receive only the 27 MHz radio, while the non-potential peripheral LAN participants from the premises LAN are fitted with only the 2.4 GHz radios. Potential peripheral LAN master devices receive both radios. The low power 27 MHz peripheral LAN radio is capable of reliably transferring information at a range of approximately 40 to 100 feet asynchronously at 19.2 KBPS. An additional benefit of using the 27 MHz frequency is that it is an unlicensed frequency band. The 2.4 GHz radio provides sufficient power (up to 1 Watt) to communicate with other premises LAN devices. Many different frequency choices could also be made such as the 900 MHz band, etc.

In embodiments where cost and additional weight are at issue, a single radio unit configuration is used for potential peripheral LAN master devices. Specifically, in such embodiments, a dual mode 2.4 GHz radio supports both the peripheral LAN and premises LANs. In a peripheral LAN mode, the 2.4 GHz radio operates at a single frequency, low power level (sub-milliwatt) to support peripheral LAN communication at relatively close distances 20–30 feet). In a high power (up to 1 Watt) or main mode, the 2.4 GHz radio provides for frequency-hopping communication over relatively long distance communication connectivity with the premises LAN. Although all network devices might be fitted with such a dual mode radio, only peripheral LAN master devices use both modes. Peripheral LAN slave devices would only use the low power mode while all other premises LAN devices would use only the high power mode. Because of this, to save cost, peripheral LAN slave devices are fitted with a single mode radio operating in the peripheral LAN mode. Non-peripheral LAN participants are also fitted with a single mode (main mode) radio unit for cost savings.

Connected between the radio unit (3112) and an interface (3110), a microprocessor (3120) controls the information flow between through the transceiver (3110). Specifically, the interface (3115) connects the transceiver (3110) to a selected computer terminal, a peripheral device or other network device. Many different interfaces (3115) are used and the choice will depend upon the connection port of the device to which the transceiver (3110) will be attached. Virtually any type of interface (3110) could be adapted for use with the transceiver (3110) of the present invention. Common industry interface standards include RS-232, RS-422, RS-485, 10BASE2 Ethernet, 10BASE5 Ethernet, 10BASE-T Ethernet, fiber optics, IBM 4/16 Token Ring, V.11, V.24, V.35, Apple Localtalk and telephone interfaces. In addition, via the interface (3115), the microprocessor (3120) maintains a radio independent, interface protocol with the attached network device, isolating the attached device from the variations in radios being used.

The microprocessor (3120) also controls the radio unit (3112) to accommodate communication with the either the premises LAN, the peripheral LAN, or both (for dual mode radios). Moreover, the same radio might also be used for vehicular LAN and radio WAN communication as described above. More specifically, in a main mode transceiver, the microprocessor (3120) utilizes a premises LAN protocol to communicate with the premises LAN. Similarly, in a peripheral LAN mode transceiver, the microprocessor (3120) operates pursuant to a peripheral LAN protocol to communicate in the peripheral LAN. In the dual mode transceiver, the microprocessor (3120) manages the use of and potential conflicts between both the premises and peripheral LAN protocols. Detail regarding the premises and peripheral LAN protocols can be found in reference to FIGS. 33–36 below.

In addition, as directed by the corresponding communication protocol, the microprocessor (3120) controls the power consumption of the radio (3112), itself and the interface (3115) for power conservation. This is accomplished in two ways. First, the peripheral LAN and premises protocols are designed to provide for a low power mode or sleep mode during periods when no communication involving the subject transmitter is desired as described below in relation to FIGS. 33–34. Second, both protocols are designed to adapt in both data rate and transmission power based on power supply (i.e., battery) parameters and range information as described in reference to FIGS. 35–36.

In order to insure that the proper device is receiving the information transmitted, each device is assigned a unique address. Specifically, the transceiver (3110) can either have a unique address of its own or can use the unique address of the device to which it is attached. The unique address of the transceiver can either be one selected by the operator or system designer or one which is permanently assigned at the factory such as an IEEE address. The address (3121) of the particular transceiver (3110) is stored with the microprocessor (3120).

In the illustrated embodiments of FIGS. 28–29, the peripheral LAN master device is shown as being either a peripheral LAN base station or a mobile or portable computer terminal. From a data flow viewpoint, in considering the fastest access through the network, such choices for the peripheral LAN master devices appear optimal. However, any peripheral LAN device might be assigned the role of the master, even those that do not seem to provide an optimal data flow pathway but may provide for optimal battery usage. For example, in the personal peripheral LAN of FIG. 29, because of the support from the belt (3059), the printer might contain the greatest battery capacity of the personal peripheral LAN devices. As such, the printer might be designated the peripheral LAN master device and be fitted with either a dual mode radio or two radios as master devices require. The printer, or other peripheral LAN slave devices, might also be fitted with such required radios to serve only as a peripheral LAN master backup. If the battery power on the actual peripheral LAN master, i.e., the hand-held terminal (3007) (FIG. 29, drops below a preset threshold, the backup master takes over.

Figure 31:
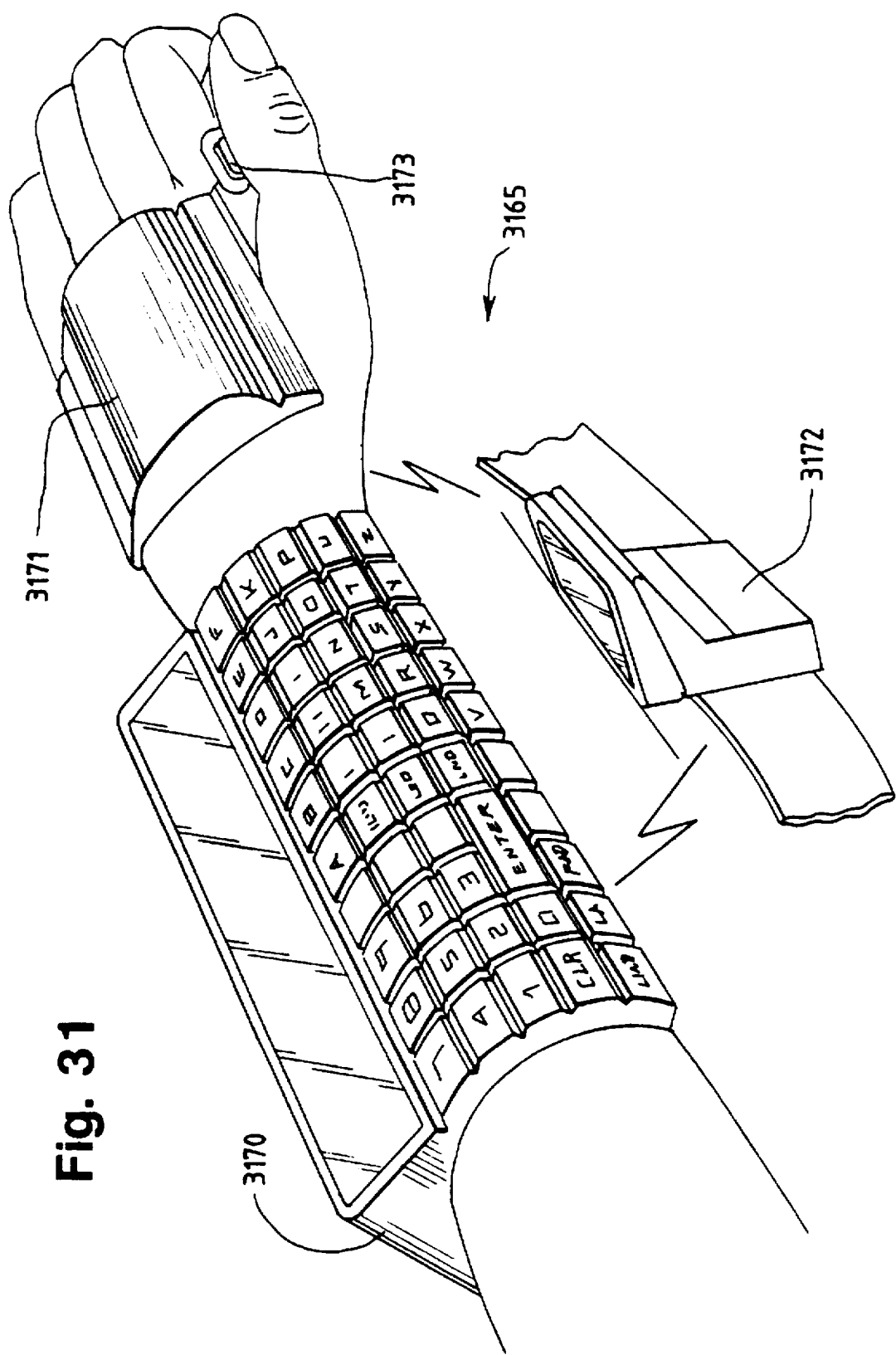
FIG. 31 is a diagrammatic illustration of an alternate embodiment of the peripheral LAN shown in FIG. 2.

FIG. 31 is a drawing which illustrates an embodiment of the personal peripheral LAN shown in FIG. 29 which designates a printer as the peripheral LAN master device. Specifically, in a personal peripheral LAN (3165), a computer terminal (3170) is strapped to the forearm of the operator. A code reader (3171) straps to the back of the hand of the user and is triggered by pressing a button (3173) with the thumb. Because of their relatively low battery energy, the computer terminal (3170) and code reader (3171) are designated peripheral LAN slave devices and each contain a peripheral LAN transceiver having a broadcast range of two meters or less. Because of its greater battery energy, the printer 3172 contains a dual mode radio and is designated the peripheral LAN master device.

Figure 32:
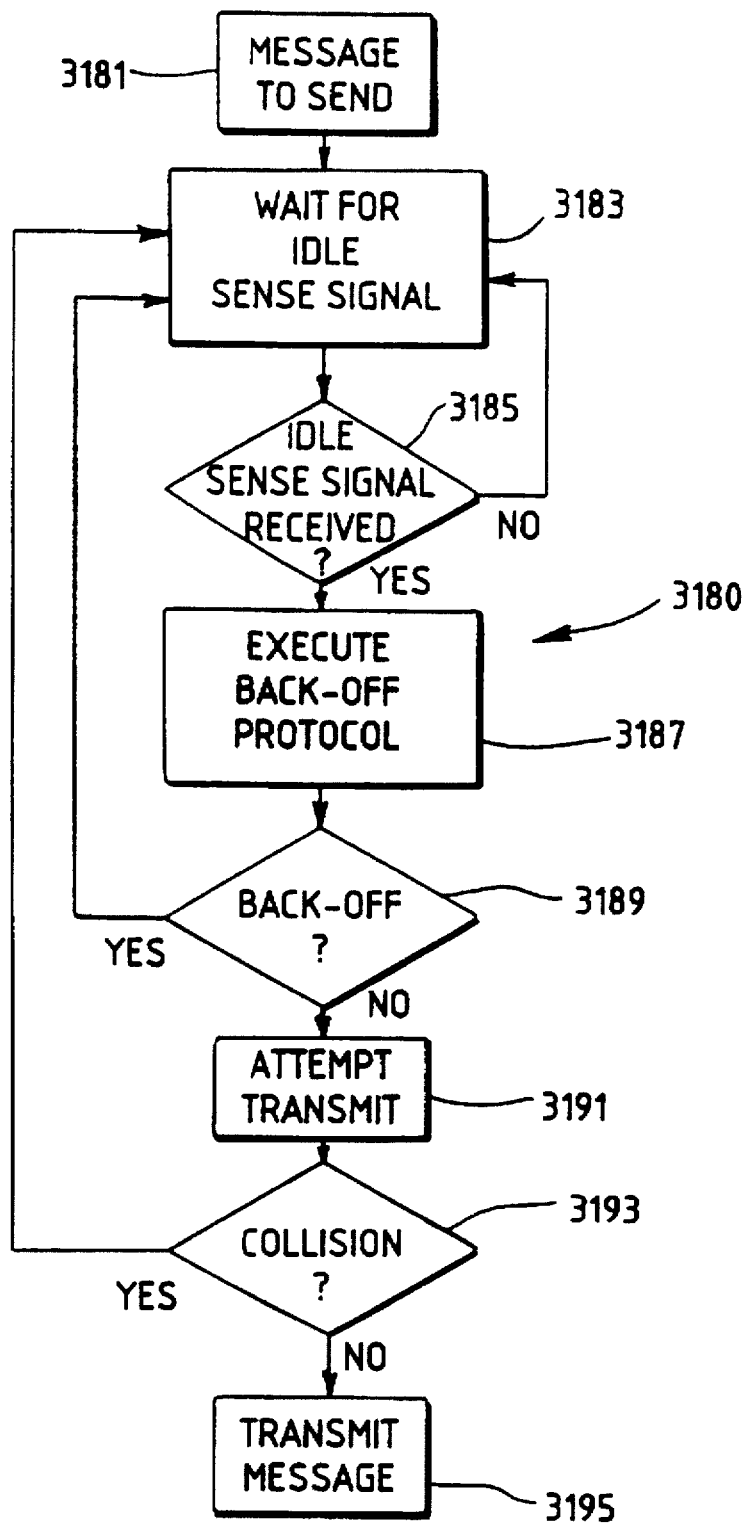
FIG. 32 is a block diagram illustrating a channel access algorithm used by peripheral LAN slave devices in accordance with the present invention.

FIG. 32 is a block diagram illustrating a channel access algorithm used by peripheral LAN slave devices according to the present invention. At a block (3181), when a slave device has a message to send, it waits for an idle sense message to be received from the peripheral LAN master device at a block (3183). When an idle sense message is received, the slave device executes a back-off protocol at a block (3187) in an attempt to avoid collisions with other slave devices waiting to transmit. Basically, instead of permitting every slave device from repeatedly transmitting immediately after an idle sense message is received, each waiting slave is required to first wait for a pseudo-random time period before attempting a transmission. The pseudo-random back-off time period is generated and the waiting takes place at a block (3187). At a block (3189), the channel is sensed to determine whether it is clear for transmission. If not, a branch is made back to the block (3183) to attempt a transmission upon receipt of the next idle sense message. If the channel is still clear, at a block (3191), a relatively small "request to send" type packet is transmitted indicating the desire to send a message. If no responsive "clear to send" type message is received from the master device, the slave device assumes that a collision occurred at a block (3193) and branches back to the block (3183) to try again. If the "clear to send" message is received, the slave device transmits the message at a block (3195).

Several alternate channel access strategies have been developed for carrier sense multiple access (CSMA) systems and include 1-persistent, non-persistent and p-persistent. Such strategies or variations thereof could easily be adapted to work with the present invention.

Figure 33A:
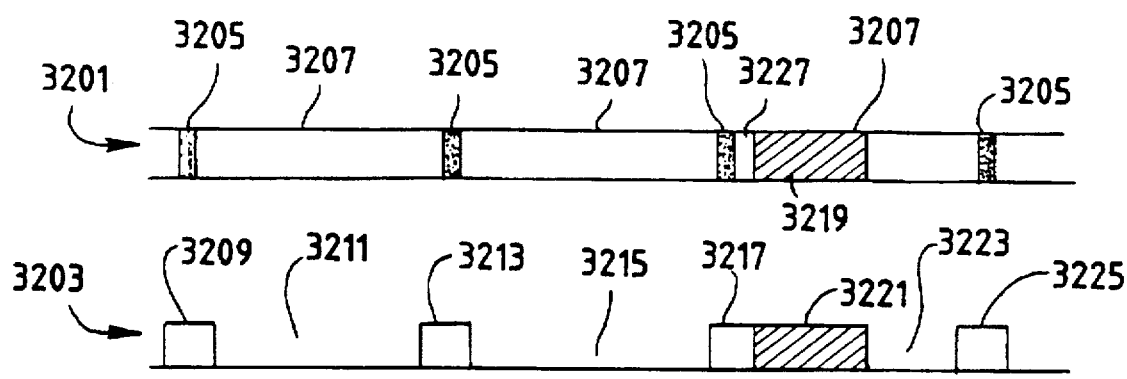
FIG. 33a is a timing diagram of the protocol used according to the present invention illustrating a typical communication exchange between a peripheral LAN master device having virtually unlimited power resources and a peripheral LAN slave device.

FIG. 33a is a timing diagram of the protocol used according to one embodiment the present invention illustrating a typical communication exchange between a peripheral LAN master device having virtually unlimited power resources and a peripheral LAN slave device. Time line (3201) represents communication activity by the peripheral LAN master device while time line (3203) represents the corresponding activity by the peripheral LAN slave device. The master periodically transmits an idle sense message (3205) indicating that it is available for communication or that it has data for transmission to a slave device. Because the master has virtually unlimited power resources, it "stays awake" for the entire time period (3207) between the idle sense messages (3205). In other words, the master does not enter a power conserving mode during the time periods (3207).

The slave device uses a binding protocol (discussed below with regard to FIG. 33c) to synchronize to the master device so that the slave may enter a power conserving mode and still monitor the idle sense messages of the master to determine if the master requires servicing. For example, referring to FIG. 33a, the slave device monitors an idle sense message of the master during a time period (3209), determines that no servicing is required, and enters a power conserving mode during the time period (3211). The slave then activates during a time period (3213) to monitor the next idle sense message of the master. Again, the slave determines that no servicing is required and enters a power conserving mode during a time period (3215). When the slave activates again during a time period (3217) to monitor the next idle sense message, it determines from a "request to send" type message from the master that the master has data for transmission to the slave. The slave responds by sending a "clear to send" type message during the time period (3217) and stays activated in order to receive transmission of the data. The master is thus able to transmit the data to the slave during a time period (3219). Once the data is received by the slave at the end of the time period (3221), the slave again enters a power conserving mode during a time period (3223) and activates again during the time period (3225) to monitor the next idle sense message.

Alternatively, the slave may have data for transfer to the master. If so, the slave indicates as such to the master by transmitting a message during the time period (3217) and then executes a backoff algorithm to determine how long it must wait before transmitting the data. The slave determines from the backoff algorithm that it must wait the time period (3227) before transmitting the data during the time period (3221). The slave devices use the backoff algorithm in an attempt to avoid the collision of data with that from other slave devices which are also trying to communicate with the master. The backoff algorithm is discussed more fully above in reference to FIG. 32.

The idle sense messages of the master may also aid in scheduling communication between two slave devices. For example, if a first slave device has data for transfer to a second slave device, the first slave sends a message to the master during the time period (3209) requesting communication with the second slave. The meter then broadcasts the request during the next idle sense message. Because the second slave is monitoring the idle sense message, the second slave receives the request and stays activated at the end of the idle sense message in order to receive the communication. Likewise, because the first slave is also monitoring the idle sense message, it too receives the request and stays activated during the time period (3215) to send the communication.

Figure 33B:
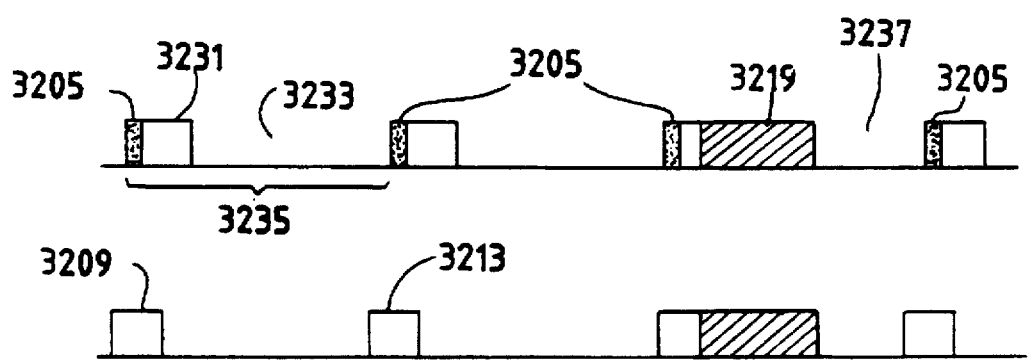
FIG. 33b is a timing diagram of the protocol used according to the present invention illustrating a typical communication exchange between a peripheral LAN master device having limited power resources and a peripheral LAN slave device.

FIG. 33b is a timing diagram of the protocol used according to one embodiment of the present invention illustrating a typical communication exchange between a peripheral LAN master having limited power resources and a peripheral LAN slave device. This exchange is similar to that illustrated in FIG. 33a except that, because it has limited power resources, the master enters a power conserving mode. Before transmitting an idle sense message, the master listens to determine if the channel is idle. If the channel is idle, the master transmits an idle sense message (3205) and then waits a time period (3231) to determine if any devices desire communication. If no communication is desired, the master enters a power conserving mode during a time period (3233) before activating again to listen to the channel. If the channel is not idle, the master does not send the idle sense message and enters a power saving mode for a time period (3235) before activating again to listen to the channel.

Communication between the master and slave devices is the same as that discussed above in reference to FIG. 33a except that, after sending or receiving data during the time period (3219), the master device enters a power conserving mode during the time period (3237).

Figure 33C:
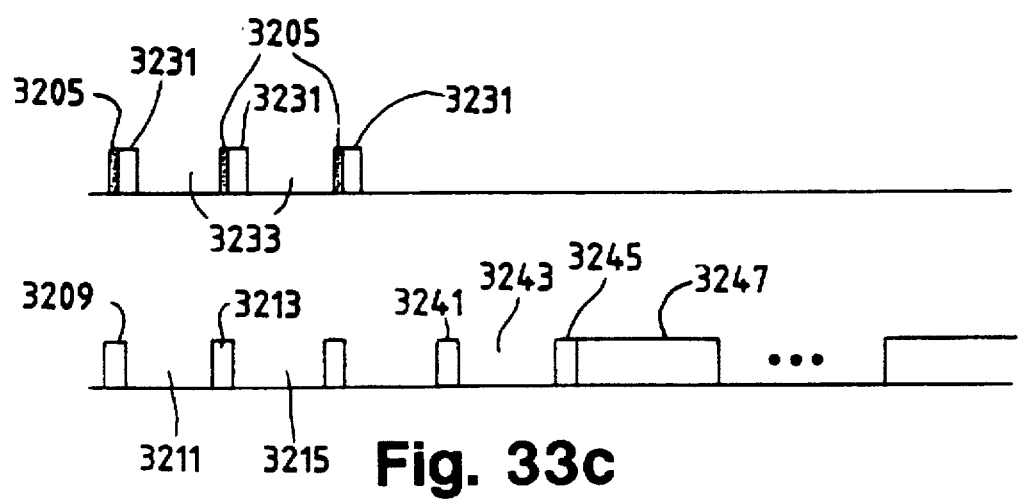
FIG. 33c is also a timing diagram of the protocol used which illustrates a scenario wherein the peripheral LAN master device fails to service the peripheral LAN slave devices.

FIG. 33c is also a timing diagram of one embodiment of the protocol used according to the present invention which illustrates a scenario wherein the peripheral LAN master device fails to service peripheral LAN slave devices. The master device periodically sends an idle sense message (3205), waits a time period (3231), and enters a power conserving mode during a time period (3233) as discussed above in reference to FIG. 33b. Similarly, the slave device monitors the idle sense messages during time periods (3209) and (3213) and enters a power conserving mode during time periods (3211) and (3215). For some reason, however, the master stops transmitting idle sense messages. Such a situation may occur, for example, if the master device is portable and is carried outside the range of the slave's radio. During a time period (3241), the slave unsuccessfully attempts to monitor an idle sense message. The slave then goes to sleep for a time period (3243) and activates to attempt to monitor a next idle sense message during a time period (3245), but is again unsuccessful.

The slave device thereafter initiates a binding protocol to attempt to regain synchronization with the master. While two time periods (3241) and (3245) are shown, the slave may initiate such a protocol after any number of unsuccessful attempts to locate an idle sense message. With this protocol, the slave stays active for a time period (3247), which is equal to the time period from one idle sense message to the next, in an attempt to locate a next idle sense message. If the slave is again unsuccessful, it may stay active until it locates an idle sense message from the master, or, if power consumption is a concern, the slave may enter a power conserving mode at the end of the time period (3247) and activate at a later time to monitor for an idle sense message. In the event the master device remains outside the range of the slave devices in the peripheral LAN for a period long enough such that communication is hindered, one of the slave devices may take over the functionality of the master device. Such a situation is useful when the slave devices need to communicate with each other in the absence of the master. Preferably, such a backup device has the ability to communicate with devices on the premises LAN. If the original master returns, it listens to the channel to determine idle sense messages from the backup, indicates to the backup that it has returned and then begins idle sense transmissions when it reestablishes dominance over the peripheral LAN.

Figure 34:
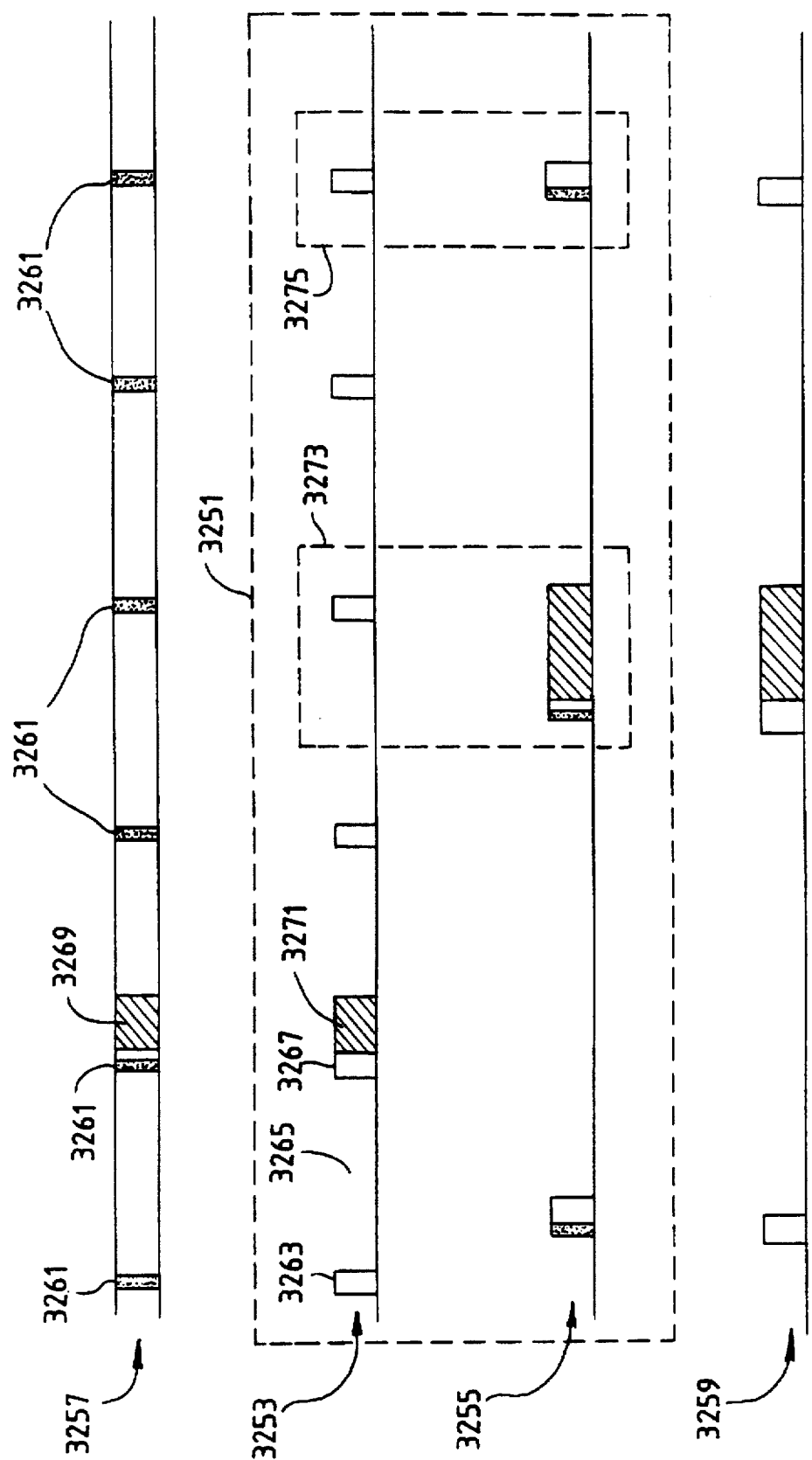
FIG. 34 is a timing diagram illustrating the peripheral LAN master device's servicing of both the higher power portion of the premises LAN as well as the lower power peripheral LAN subnetwork with a single or plural radio transceivers.

FIG. 34 is a timing diagram illustrating one embodiment of the peripheral LAN master device's servicing of both the high powered premises LAN and the low powered peripheral LAN subnetwork, with a single or plural radio transceivers, in accordance with present invention. Block (3251) represents typical communication activity of the master device. Line (3253) illustrates the master's communication with a base station on the premises LAN while line (3255) illustrates the master's communication with a slave device on the peripheral LAN. Lines (3257) and (3259) illustrate corresponding communication by the base station and slave device, respectively.

The base station periodically broadcasts HELLO messages (3261) indicating that it is available for communication. The master device monitors the HELLO messages during a time period (3263), and, upon determining that the base does not need servicing, enters a power conserving mode during a time period (3265). The master then activates for a time period to monitor the next HELLO message from the base. If the master has data to send to the base, it transmits the data during a time period (3271). Likewise, if the base has data to send to the master, the base transmits the data during a time period (3269). Once the data is received or sent by the master, it may again enter a power conserving mode. While HELLO message protocol is discussed, a number of communication protocols may be used for communication between the base and the master device. As may be appreciated, the peripheral LAN master device acts as a slave to base stations in the premises LAN.

Generally, the communication exchange between the master and the slave is similar to that described above in reference to FIG. 33b. Block (3273), however, illustrates a situation where the master encounters a communication conflict, i.e., it has data to send to or receive from the slave on the peripheral LAN at the same time it will monitor the premises LAN for HELLO messages from the base. If the master has two radio transceivers, the master can service both networks. If, however, the master only has one radio transceiver, the master chooses to service one network based on network priority considerations. For example, in block (3213), it may be desirable to service the slave because of the presence of data rather than monitor the premises LAN for HELLO messages from the base. On the other hand, in block (3275), it may be more desirable to monitor the premises LAN for HELLO messages rather than transmit an idle sense message on the peripheral LAN.

Figure 35:
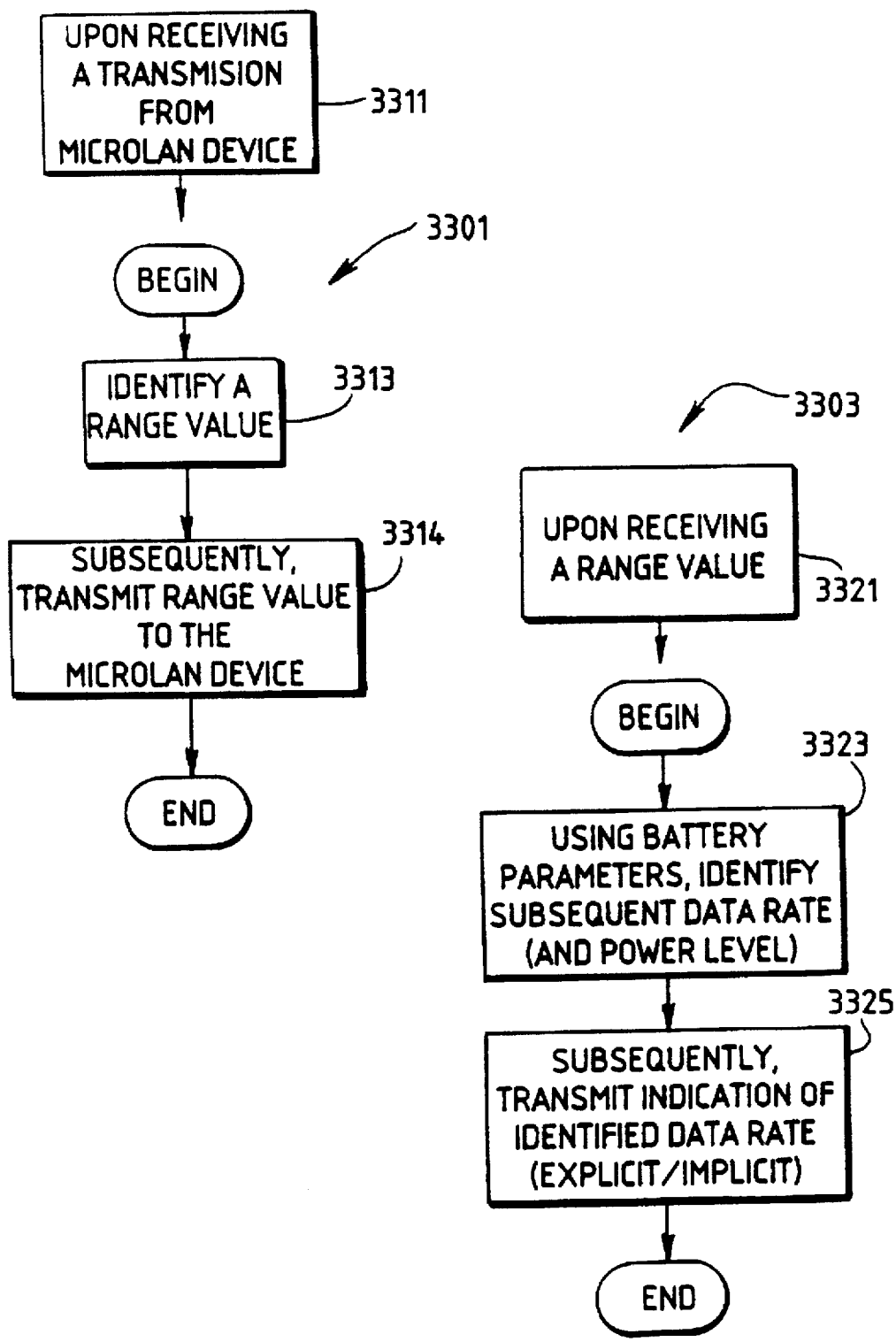
FIGS. 35 and 36 are block diagrams illustrating additional power saving features according to the present invention wherein ranging and battery parameters are used to optimally select the appropriate data rate and power level of subsequent transmissions.
Figure 36:
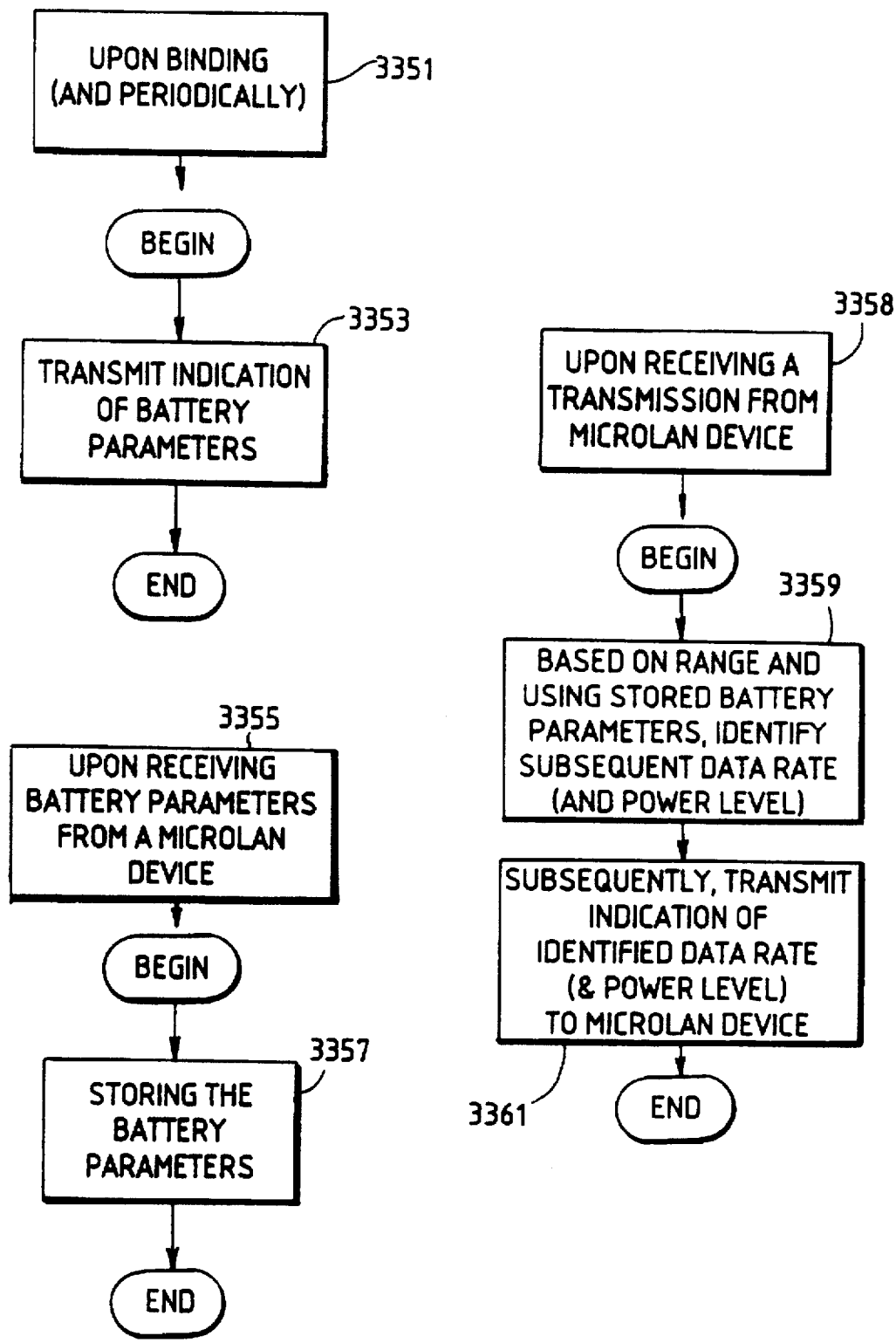

FIGS. 35 and 36 are block diagrams illustrating additional power saving features according to the present invention, wherein ranging and battery parameters are used to optimally select the appropriate data rate and power level for subsequent transmissions. Specifically, even though network devices such as the computer terminal (3007) in FIGS. 28–29 have the capability of performing high power transmissions, because of battery power concerns, such devices are configured to utilize minimum transmission energy. Adjustments are made based on ranging information and on battery parameters. Similarly, within the peripheral LAN, even though lower power transceivers are used, battery conservation issues also justify the use of such data rate and power adjustments. This process is described in more detail below in reference to FIGS. 35 and 36.

More specifically, FIG. 35 is a block diagram which illustrates a protocol (3301) used by a destination peripheral LAN device and a corresponding protocol (3303) used by a source peripheral LAN device to adjust the data rate and possibly the power level for future transmission between the two devices. At a block (3311), upon receiving a transmission from a source device, the destination device identifies a range value at a block (3313). In a low cost embodiment, the range value is identified by considering the received signal strength indications (RSSI) of the incoming transmission. Although RSSI circuitry might be placed in all peripheral LAN radios, the added expense may require that only peripheral LAN master devices receive the circuitry. This would mean that only peripheral LAN master devices would perform the function of the destination device. Other ranging values might also be calculated using more expensive techniques such as adding GPS (Global Position Service) circuitry to both radios. In such an embodiment, the range value transmitted at the block (3313) would consist of the GPS position of the destination peripheral LAN device. Finally, after identifying the range value at the block (3313), the destination device subsequently transmits the range value to the slave device from which the transmission was received, at a block (3314).

Upon receipt of the range value from the destination device at a block (3321), the source peripheral LAN device evaluates its battery parameters to identify a subsequent data rate for transmission at a block (3323). If range value indicates that the destination peripheral LAN device is very near, the source peripheral LAN device selects a faster data rate. When the range value indicates a distant master, the source device selects a slower rate. In this way, even without adjusting the power level, the total energy dissipated can be controlled to utilize only that necessary to carry out the transmission. However, if constraints are placed on the maximum or minimum data rates, the transmission power may also need to be modified. For example, to further minimize the complexity associated with a fully random range of data rate values, a standard range and set of several data rates may be used. Under such a scenario, a transmission power adjustment might also need to supplement the data rate adjustment. Similarly, any adjustment of power must take into consideration maximum and minimum operable levels. Data rate adjustment may supplement such limitations. Any attempted modification of the power and data rate might take into consideration any available battery parameters such as those that might indicate a normal or current battery capacity, the drain on the battery under normal conditions and during transmission, or the fact that the battery is currently being charged. The latter parameter proves to be very significant in that when the battery is being charged, the peripheral LAN slave device has access to a much greater power source for transmission, which may justify the highest power transmission and possibly the slowest data rate under certain circumstances.

Finally, at a block (3325), an indication of the identified data rate is transmitted back to the destination device so that future transmissions may take place at the newly selected rate. The indication of data rate may be explicit in that a message is transmitted designating the specific rate. Alternately, the data rate may be transferred implicitly in that the new rate is chose and used by the source, requiring the destination to adapt to the change. This might also be done using a predefined header for synchronization.

FIG. 36 illustrates an alternate embodiment for carrying out the data rate and possibly power level adjustment. At a block (3351) upon binding and possibly periodically, the source peripheral LAN device sends an indication of its current battery parameters to the destination peripheral LAN device. This indication may be each of the parameters or may be an averaged indication of all of the parameters together. At a block (3355), upon receipt, the destination peripheral LAN device 355 stores the battery parameters (or indication). Finally, at a block (3358), upon receiving a transmission from the source device, based on range determinations and the stored battery parameters, the destination terminal identifies the subsequent data rate (and possibly power level). Thereafter, the new data rate and power level are communicated to the source device either explicitly or implicitly for future transmissions.

Figure 37:
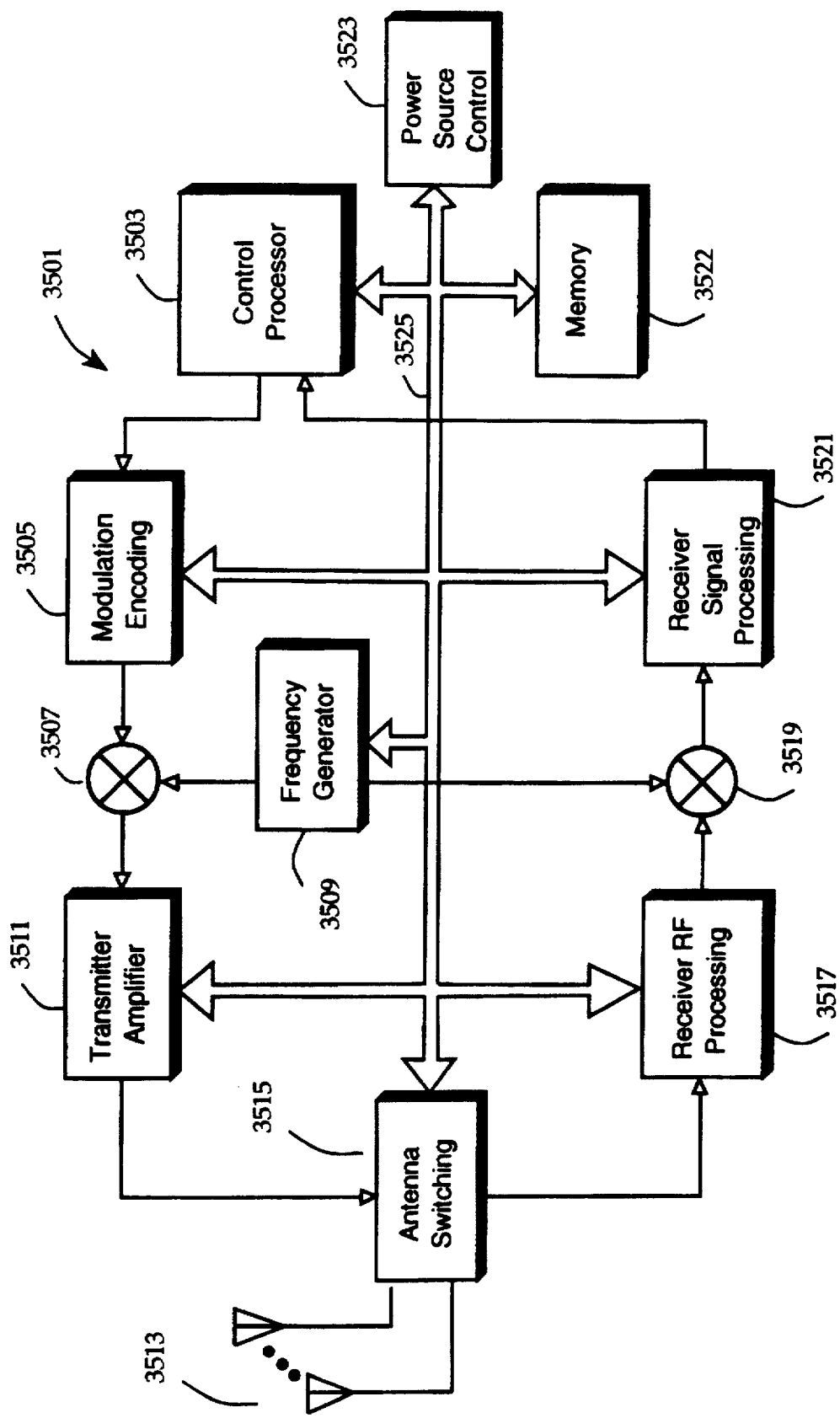
FIG. 37 illustrates an exemplary block diagram of a radio unit capable of current participation off multiple LANs according to the present invention.

FIG. 37 illustrates an exemplary block diagram of a radio unit (3501) capable of concurrent participation on multiple LAN's. To transmit, a control processor (3503) sends a digital data stream to a modulation encoding circuit (3505). The modulation encoding circuit (3505) encodes the data stream in preparation for modulation by frequency translation circuit (3507). The carrier frequency used to translate the data stream is provided by a frequency generator circuit (3509). Thereafter, the modulated data stream is amplified by a transmitter amplifier circuit (3511) and then radiated via the one of a plurality of antennas (3513) that has been selected via an antenna switching circuit (3515). Together, the modulation encoding circuitry (3505), translator (3507), amplifier (3511) and associated support circuitry constitute the transmitter circuitry.

Similarly, to receive data, the RF signal received by the selected one of the plurality of antennas (3513) is communicated to a receiver RF processing circuit (3517). After performing a rather coarse frequency selection, the receiver RF processing circuit (3517) amplifies the RF signal received. The amplified received signal undergoes a frequency shift to an IF range via a frequency translation circuit (3519). The frequency translation circuit (3519) provides the center frequency for the frequency shift. Thereafter, a receiver signal processing circuit receives the IF signal, performs a more exact channel filtering and demodulation and forwards the received data to the control processor (3503), ending the process. Together, the receiver signal processing (3521), translator (3517), receiver RF processing (3517) and associated support circuitry constitute the receiver circuitry.

The control processor (3503) operates pursuant to a set of software routines stored in memory (3522) which may also store incoming and outgoing data. Specifically, the memory (3522) contains routines which define a series of protocols for concurrent communication on a plurality of LANs. As part of such operation, the control processor (3503) provides for power savings via a power source control circuit (3523), i.e., whenever the participating protocols permit, the control processor (3503) causes selective power down of the radio transceiver circuitry via a control bus (3525). Also via the bus (3525), the control processor sets the frequency of the frequency generator (3509) so as to select the appropriate band and channel of operation required by a correspondingly selected protocol. Similarly, the control processor (3503) selects the appropriate antenna (via the antenna switching circuitry (3515)) and channel filtering in preparation for operation on a selected LAN. Responding to the software routines stored in the memory (3522), the control processor (3503) selects the appropriate LANs to establish participation, detaches from those of the selected LANs in which participation is no longer needed, identifies from the selected LANs a current priority LAN in which to actively participate, maintains a time-shared servicing of the participating LANs. Further detail regarding this process follows below.

In one embodiment, the control processor (3503) constitutes a typical microprocessor on an independent integrated circuit. In another embodiment, the control processor (3503) comprises a combination of distributed processing circuitry which could be included in a single integrated circuit as is a typical microprocessor. Similarly, the memory (3522) could be any type of memory unit(s) or device(s) capable of software storage.

The radio circuitry illustrated is designed with the frequency nimble frequency generator (3509) so as to be capable of operation on a plurality of LANs/WANs. Because each of the plurality may be allocated different frequency bands, more than one antenna may be desirable (although a single antenna could be used, a channel to antenna mismatch might result in an unacceptable transmission-reception inefficiency). Thus, to select the appropriate configuration, the control processor (3503) first identifies the LAN/WAN on which to participate and selects the corresponding radio configuration parameters from the memory (3521). Thereafter, using the configuration parameters and pursuant to control routines stored in the memory (3522), the control processor (3503) sets the frequency of the generator (3509), selects the appropriate antenna via the antenna switching circuit (3515), and configures the receiver RF and signal processing circuits (3517) and (3521) for the desired LAN/WAN.

More particularly, the antenna switching circuit (3515) comprises a plurality of digital switches, each of which is associated with one of the plurality of antennas (3513) so as to permit selective connection by the control processor (3503) of any available antenna to the transceiver circuitry.

Figure 38:
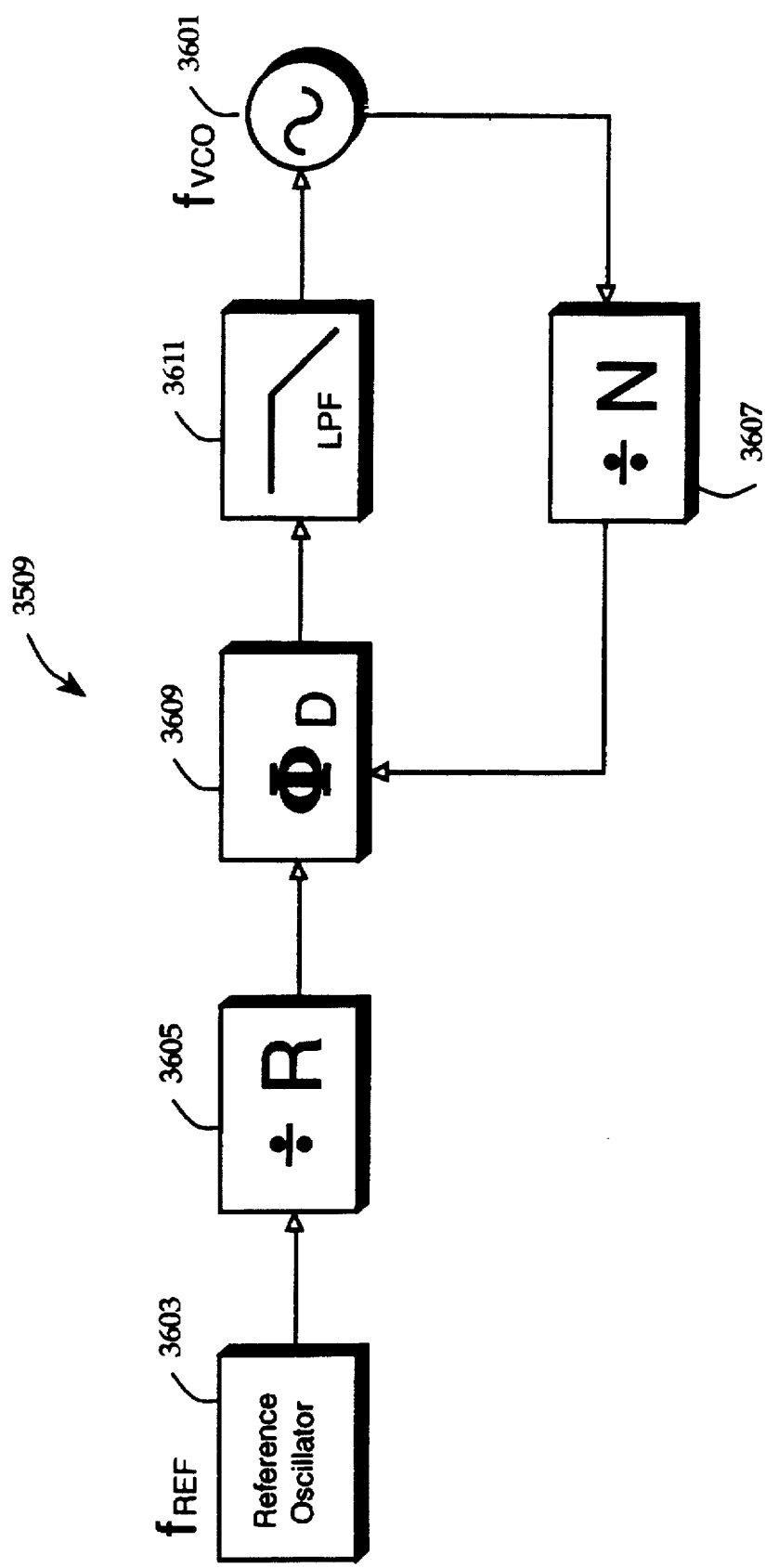
FIG. 38 illustrates an exemplary functional layout of the frequency generator of FIG. 37 according to one embodiment of the present invention.

FIG. 38 illustrates an exemplary functional layout of the frequency generator (3509) of FIG. 37 according to one embodiment of the present invention. Basically, the frequency generator (3509) responds to the control processor (3503) by producing the translation frequency necessary for a selected LAN/WAN. The illustrated frequency generator comprises a voltage controlled oscillator (VCO) (3601). As is commonly known, for a VCO, the center frequency Fvco tracks the input voltage. However, because typical VCO's are subject to drift, the VCO is stabilized by connecting it in a phase locked loop to a narrowband reference, such as a crystal reference oscillator (3603). The oscillator (3603) outputs a signal of a fixed or reference frequency $F_{REF}$ to a divide-by-R circuit (3605), which divides as its name implies the reference frequency $F_{REF}$ by the known number R. A phase detector (3609) receives the divided-by-R output of the circuit (3609) and the feedback from the output of the VCO (3601) via a divide-by-N circuit (3607). Upon receipt, the phase detector (3609) compares the phase of the outputs from the circuits (3605) and (3607). Based on the comparison, a phase error signal is generated and applied to a low-pass loop filter (3611). The output of the filter (3611) is applied to the input of the VCO (3601) causing the center frequency of the VCO (3601) to lock-in. Therefore, if the output of the VCO (3601) begins to drift out of phase of the reference frequency, the phase detector (3609) responds with a corrective output so as to adjust the center frequency of the VCO (3601) back in phase.

With the illustrated configuration, the center frequency of the VCO (3601) is a function of the reference frequency as follows:

$$F_{VCO}=(F_{REF}*N)/R$$

Thus, to vary the center frequency of the VCO (3601) to correspond to a band of a selected LAN/WAN in which active participation is desired, the control processor (3503) (FIG. 37) need only vary the variables "R" and "N" and perhaps the frequency of the reference oscillator. Because the output $F_{REF}$ of the reference oscillator (3603) is quite stable, the phase lock loop as shown also keeps the output frequency $F_{VCO}$ of the VCO (3601) stable.

More specifically, although any other scheme might be implemented, the value R in the divide-by-R circuit (3605) is chosen so as to generate an output equal to the channel spacing of a desired LAN/WAN, while the value N is selected as a multiplying factor for stepping up the center frequency of the VCO (3601) to the actual frequency of a given channel. Moreover, the frequency of the reference oscillator is chosen so as to be divisible by values of R to yield the channel spacing frequencies of all potential LANs and WANs. For example, to participate on both MTEL Corporation's Two Way Paging WAN (operating at 900 MHz with 25 KHz channel spacing) and ARDIS Corporation's 800 MHz specialized mobile radio (SMR) WAN (having 12.5 KHz channel spacing), the reference frequency is chosen to be a whole multiple of 25 KHz. Moreover, the value N is chosen to effectively multiply the output of the divide-by-R circuit (3605) to the base frequency of a given channel in the selected WAN.

For frequency hopping protocols, the value of R is chosen so as to yield the spacing between frequency hops. Thus, as N is incremented, each hopping frequency can be selected. Randomizing the sequence of such values of N provides a hopping sequence for use by a base station as described above. Pluralities of hopping sequences (values of N) may be stored in the memory (3522) (FIG. 37) for operation on the premises LAN, for example.

In addition to the single port phase locked loop configuration for the frequency generator (3509), other configurations might also be implemented. Exemplary circuitry for such configurations can be found in copending U.S. patent application Ser. No. 08/205,639 (now U.S. Pat. No. 5,555, 276), filed Mar. 4, 1994 by Mahany et al., entitled "Method of and Apparatus For Controlling Modulation of Digital Signals in Frequency-Modulated Transmissions". This application is incorporated herein in its entirety.

Figure 39:
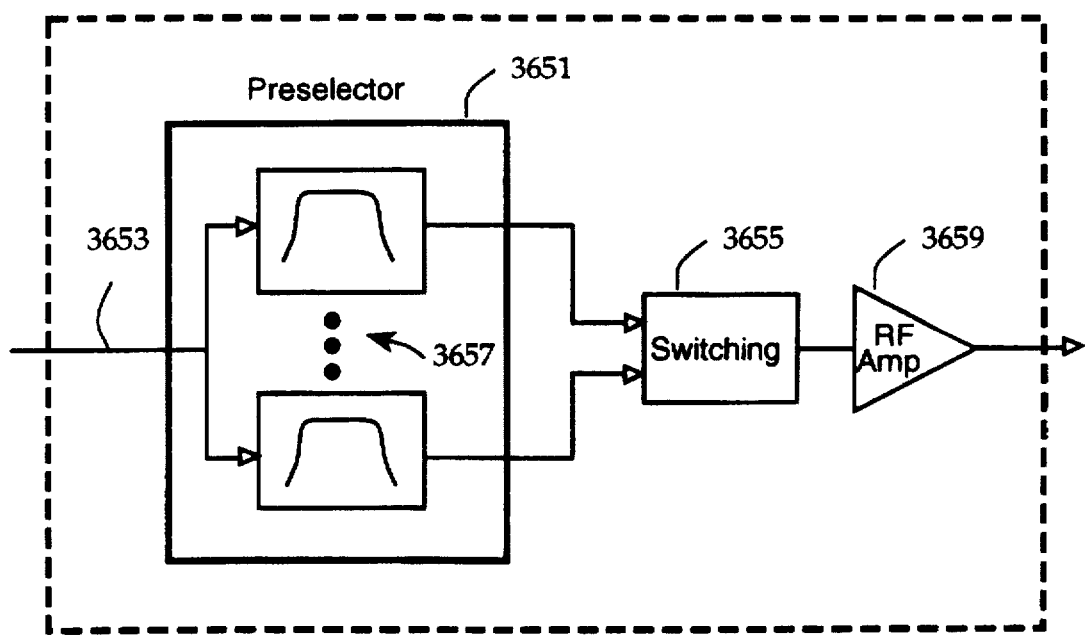
FIG. 39 illustrates further detail of the receiver RF processing circuit of FIG. 37 according to one embodiment of the present invention.

FIG. 39 illustrates further detail of the receiver RF processing circuit (3517) of FIG. 37 according to one embodiment of the present invention. Specifically, a preselector (3651) receives an incoming RF data signal from a selected one of the plurality of antennas (3513) (FIG. 37) via an input line (3653). The preselector (3651) provides a bank of passive filters (3657), such as ceramic or dielectric resonator filters, each of which provides a coarse filtering for one of the LAN/WAN frequencies to which it is tuned. One of the outputs from the bank of passive filters (3657) is selected by the control processor (3503) via a switching circuit (3655) so as to monitor the desired one of the available LANs/WANs. Thereafter, the selected LAN/WAN RF signal is amplified by an RF amplifier (3659) before translation by the frequency translation circuit (3519) (FIG. 37).

Figure 40:
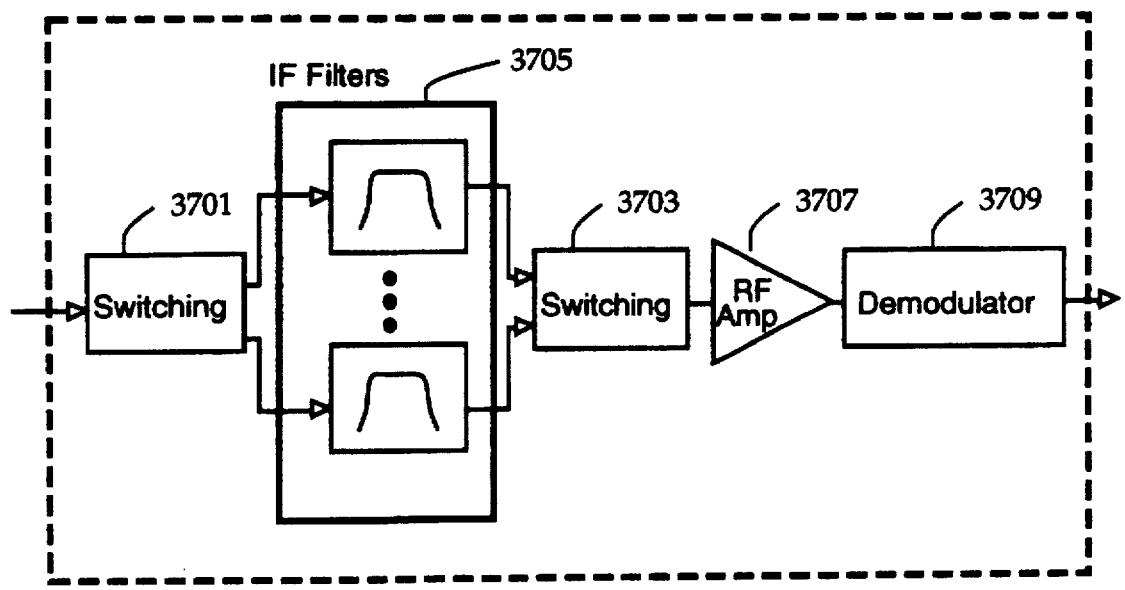
FIG. 40 illustrates further detail of the receiver signal processing circuit of FIG. 37 according to one embodiment of the present invention.

FIG. 40 illustrates further detail of the receiver signal processing circuit (3521) of FIG. 37 according to one embodiment of the present invention. In particular, digital switching circuits (3701) and (3703) respond to the control processor (3503) by selecting an appropriate pathway for the translated IF data signal through one of a bank of IF filters (3705). Each IF filter is an analog crystal filter, although other types of filters such as a saw filter might be used. The IF filters (3705) provide rather precise tuning to select the specific channel of a given LAN/WAN.

After passing through the switching circuit (3703), the filtered IF data signal is then amplified by an IF amplifier (3707). The amplified IF signal is then communicated to a demodulator (3709) for demodulation. The control processor retrieves the incoming demodulated data signal for processing and potential storage in the memory (3522) (FIG. 37).

Figure 41:
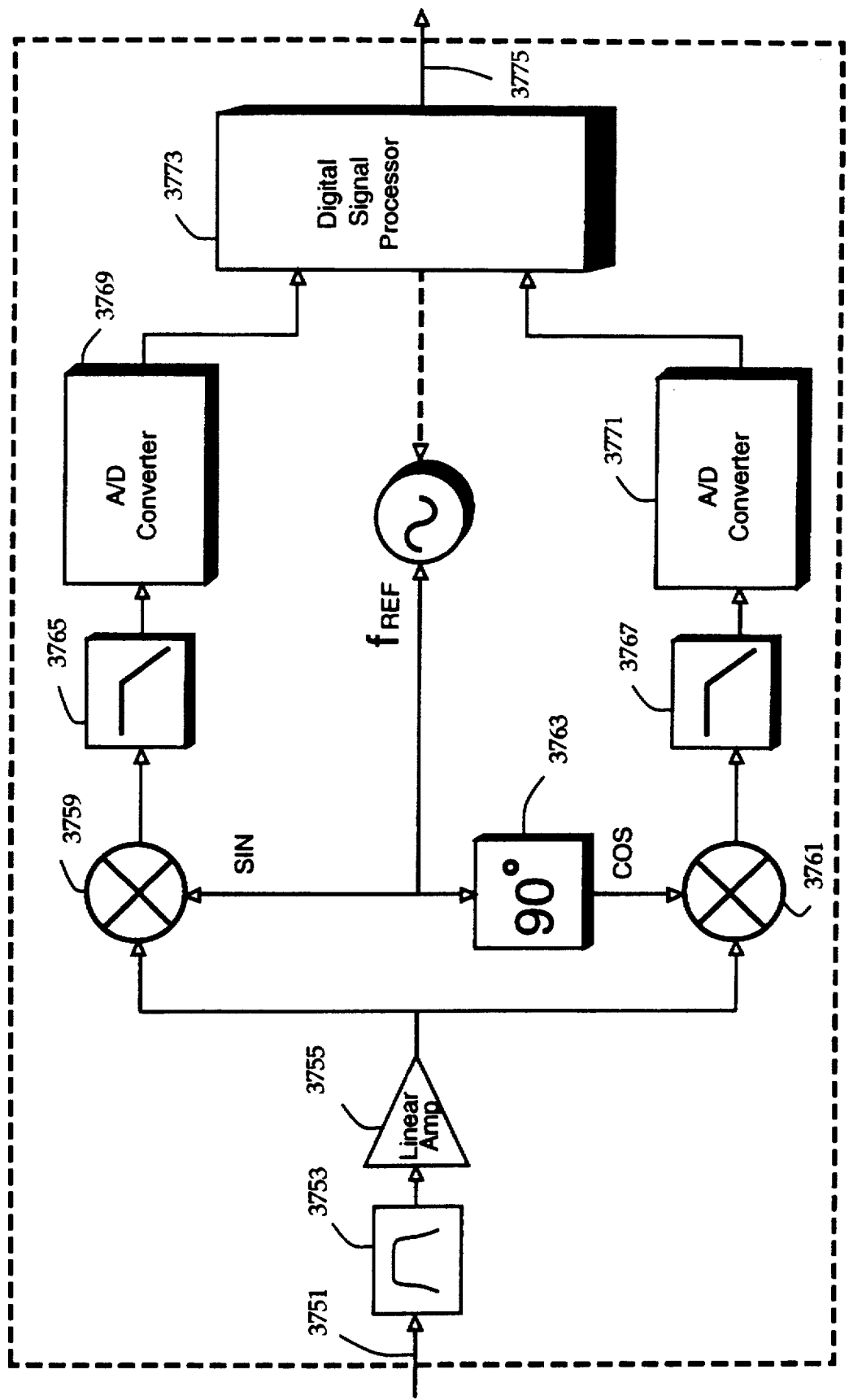
FIG. 41 illustrates further detail of the receiver signal processing circuit of FIG. 37 according to another embodiment of the present invention.

FIG. 41 illustrates further detail of the receiver signal processing circuit (3521) of FIG. 37 according to another embodiment of the present invention. Specifically, the IF signal resulting from the translation by the frequency translator circuitry (3519), enters the receiver signal processing circuit via an input (3751). Thereafter, the IF signal passes through an anti-aliasing filter (3753), and is amplified by a linear amplifier (3755). An IF oscillator (3757) supplies a reference signal $f_{REF}$ for translation of the incoming IF signal at frequency translation circuits (3759) and (3761). A phase shift circuit (3763) provides for a 90 degree shift of $f_{REF}$, i.e., if $f_{REF}$ is considered a SINE wave, then the output of the circuit (3763) is the COSINE of $f_{REF}$. Both the SINE and COSINE frequency translation pathways provide for channel selection of the incoming data signal. Thereafter the data signals are passed through corresponding low pass filters (3765) and (3767) in preparation for sampling by analog to digital (A/D) converters (3769) and (3771). Each A/D converter forwards the sampled data to a digital signal processor (3773) which provides for further filtering and demodulation. The digital signal processor (3773) thereafter forwards the incoming data signal to the control processor (3503) (FIG. 37) via an output line (3775). Moreover, although the digital signal processor (3773) and the control processor (3507) are discrete components in the illustrated example, they may also be combined into a single integrated circuit.

Figure 42:
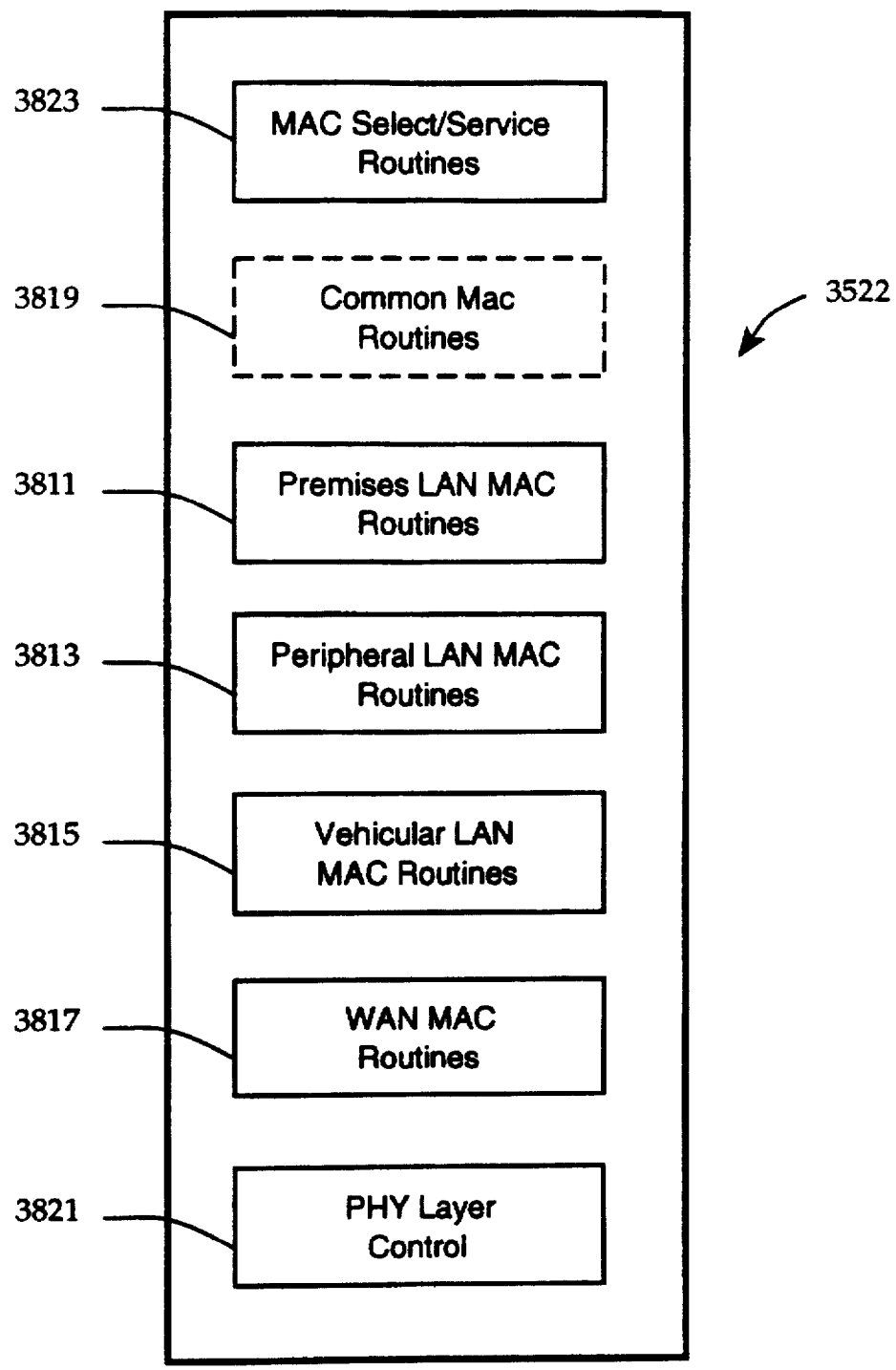
FIG. 42 illustrates further detail of the memory unit of FIG. 37 according to one embodiment of the present invention.

FIG. 42 illustrates further detail of some of the storage requirements of the memory (3522) of FIG. 37 according to one embodiment of the present invention. To control the radio, the control processor (3503) (FIG. 37) accesses the information in the memory (3522) needed for radio setup and operation on a plurality of LANs/WANs. Among other information, the memory (3522) stores: 1) a plurality of software protocols, one for each LAN/WAN to be supported, which define how the radio is to participate on the corresponding LAN; and 2) an overriding control set of routines which govern the selection, use and interaction of the plurality of protocols for participation on desired LANs/WANs.

Specifically, in the memory unit (3522), among other information and routines, software routines relating to the medium access control (MAC) layer of the communication protocol layers can be found. In general, a MAC layer provides detail regarding how communication generally flows through a corresponding LAN or WAN. The MAC layer is fairly independent of the specific radio circuitry and channel characteristics of the LAN or WAN.

As illustrated, premises LAN, peripheral LAN, vehicular LAN and WAN MAC routines (3811), (3813), (3815) and (3817) provide definition as to how the control processor (3503) (FIG. 37) should operate while actively participating on each LAN or WAN. Although only the several sets of MAC routines are shown, many other sets might also be stored or down-loaded into the memory (3522). Moreover, the sets of MAC routines (3811)-17 might also share a set of common routines (3819). In fact, the sets d MAC routines (3811)-17 might be considered a subset of an overall MAC which shares the common MAC routines (3819).

Below the MAC layer in the communication hierarchy, hardware and channel related software routines and parameters are necessary for radio control. For example, such routines govern the specific switching for channel filtering and antenna selection required by a given LAN or WAN. Similarly, these routines govern the control processor 3503's selection of parameters such as for R and N for the frequency generator (3509) (FIG. 38), or the selective power-down (via the power source control circuitry (3503)—FIG. 37) of portions or all of the radio circuitry whenever possible to conserve battery power. As illustrated, such routines and parameters are referred to as physical (PHY) layer control software (3821). Each of the sets of MAC routines (3811)-17 and (3819) provide specific interaction with the PHY layer control software (3821).

A set of MAC select/service routines (3823) govern the management of the overall operation of the radio in the network. For example, if participation on the premises LAN is desired, the MAC select/service routines (3823) direct the control processor (3503) (FIG. 37) to the common and premises MAC routines (3819) and (3811) respectively. Thereafter, if concurrent participation with a peripheral LAN is desired, the select/service routines (3823) direct the control processor (3503) to enter a sleep mode (if available). The control processor (3503) refers to the premises LAN MAC routines (3811), and follows the protocol necessary to establish sleep mode on the premises LAN. Thereafter, the select/service routines (3823) directs the control processor (3503) to the peripheral LAN MAC routines (3813) to establish and begin servicing the peripheral LAN. Whenever the peripheral LAN is no longer needed, the select/service routines (3823) direct a detachment from the peripheral LAN (if required) as specified in the peripheral LAN MAC routines (3813). Similarly, if during the servicing of the peripheral LAN a overriding need to service the premises LAN arises, the processor (3503) is directed to enter a sleep mode via the peripheral LAN MAC routines (3813), and to return to servicing the premises LAN.

Although not shown, additional protocol layers as well as incoming and outgoing data are also stored with the memory (3522), which, as previously articulated, may be a distributed plurality of storage devices.

Figure 43:
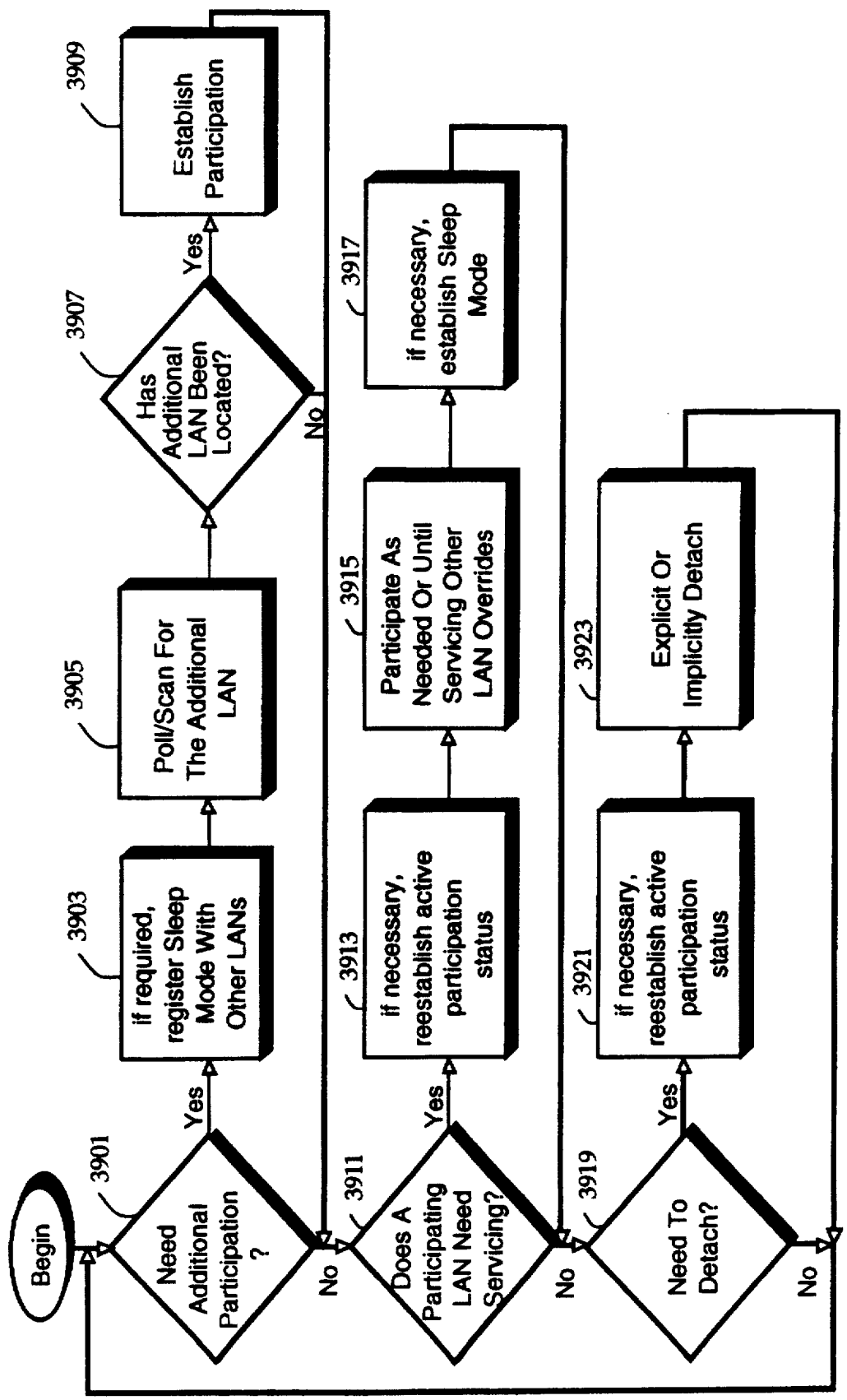
FIG. 43 illustrates a software flow chart describing the operation of the control processor in controlling the battery powered radio unit to participate on multiple LANs.

FIG. 43 illustrates a software flow chart describing the operation of the control processor (3503) (FIG. 37) in controlling the radio unit to participate on multiple LANs according to one embodiment of the present invention. Specifically, at a block (3901), the control processor first determines whether the radio unit needs to participate on an additional LAN (or WAN). If such additional participation is needed, at a block (3903), the radio unit may register sleep mode operation with other participating LANs if the protocols of those LANs so require and the radio unit has not already done so. Next, at a block (3905), the control processor causes the radio unit to poll or scan to locate the desired additional LAN. If the additional LAN is located at a block (3907), participation of the radio unit on the additional LAN is established at a block (3909).

If additional participation is not needed at block (3901), or if the additional LAN has not been located at block (3907), or once participation of the radio unit on the additional LAN has been established at block (3909), the control processor next determines at a block (3911) whether any of the participating LANs require servicing. If any given participating LAN requires servicing, at a block (3913), the radio unit may be required by the protocol of the given LAN to reestablish an active participation status on that LAN, i.e., indicate to the given LAN that the radio unit has ended the sleep mode. Next, at a block (3915), the radio unit services the given LAN as needed or until the servicing of another LAN takes priority over that of the given LAN. At a block (3917), the radio unit may then be required to register sleep mode operation with the given LAN if the LAN's protocol so requires.

At that point, or if no participating LAN needs servicing at block (3911), the control processor determines at a block (3919) whether the radio needs to detach from any given participating LAN. If so, the radio unit may implicitly detach at a block (3923) if the protocol of the LAN from which the radio wishes to detach requires no action by the radio unit. However, at a block (3921), the radio unit may be required to establish active participation on the LAN in order to explicitly detach at block (3923). For example, such a situation may arise when a portable terminal desires to operate on a shorter range vehicular LAN and detaches from a premises LAN. The portable terminal my be required by the protocol of the premises LAN to establish active communication on the premises LAN to permit the radio unit to inform the premises LAN that it is detaching and can only be accessed through the vehicular LAN.

Once the radio unit is detached at block (3923), or if the radio unit does not need to detach from any participating LANs at block (3919), the control processor returns to block (3901) to again determine whether the radio unit needs to participate on an additional LAN, and repeats the process.

Figure 44:
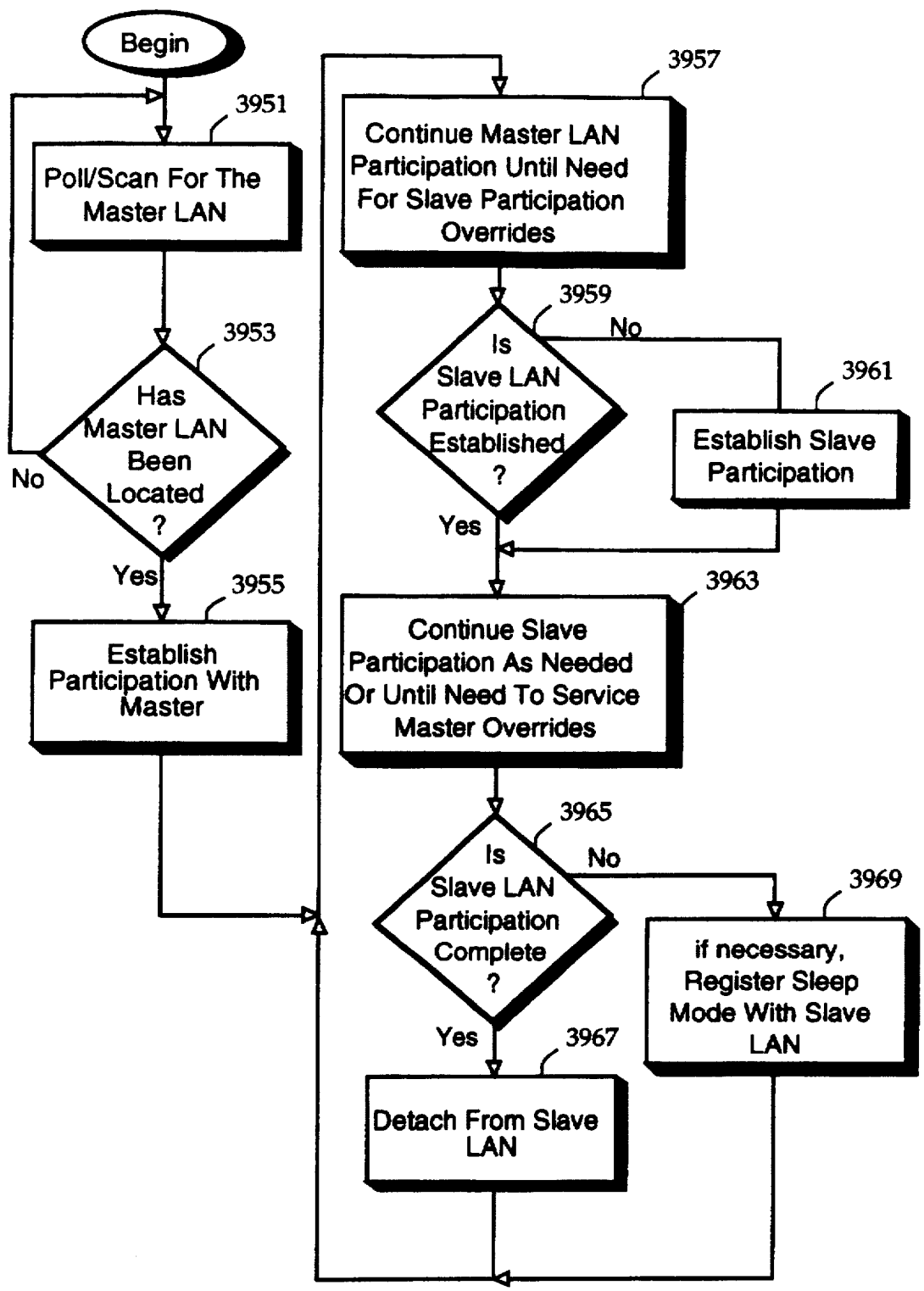
FIG. 44 is an alternate embodiment of the software flow chart wherein the control processor participates on a master LAN and, when needed, on a slave LAN.

FIG. 44 is an alternate embodiment of the software flow chart wherein the control processor participates on a master LAN and, when needed, on a slave LAN. Specifically, at a block (3951), the control processor causes the radio unit to poll or scan in order to locate the master LAN. If the master LAN has not been located at a block (3953), polling or scanning for the master LAN continues. Once the master LAN is located, participation with the master is established at a block (3955). At a block (3957), the radio unit participates with the master LAN until the need for the radio unit to participate on the slave LAN takes precedence. When that condition occurs, the control processor determines at a block (3959) whether participation of the radio unit on the slave network is established. If not, such participation is established at a block (3961). Next, at a block (3963), the radio unit services the slave LAN as needed or until the servicing of the master LAN takes priority. If the control processor determines at a block (3965) that servicing of the slave LAN has been completed, the radio unit detaches from the slave LAN at a block (3967) and returns to block (3957) to continue participation on the master LAN.

However, if the control processor determines at block (3965) that servicing has not been, or may not be, completed, the radio unit does not detach from the slave LAN. In that case, before returning to block (3957) to service the master LAN, the radio unit may be required by the protocol of the slave LAN to register sleep mode operation with the slave LAN at a block (3969).

Obviously, many modifications and variations of the present invention are possible in light of the above teachings. It is therefore to be understood that, within the scope of the appended claims, the invention may be practiced otherwise than as specifically described.

I claim:

1. A hierarchal communication system for linking portable and mobile computer devices, comprising:
    a first local area network, said first local area network including an infrastructure network comprising at least two radio base stations wherein said radio base stations are interconnected by at least one of wired and wireless communication, and said first local area network further including at least one of said portable and mobile computer devices;
    first communication means for controlling communication between said portable and mobile computer devices and said infrastructure network;
    a second local area network, said second local area network including one or more peripheral devices and at least one of said portable and mobile computer devices; and
    second communication means for controlling communication between said peripheral devices and at least one of said portable and mobile computer devices.

2. The hierarchal communication system of claim 1 wherein said first communication means includes reservation access communication protocol.

3. The hierarchal communication system of claim 2 wherein said reservation access communication protocol includes means for facilitating frequency hopping synchronization.

4. The hierarchal communication system of claim 2 wherein said reservation access communication protocol includes means for supporting adaptive data rate selection based upon the quality of communication on the communication channel.

5. The hierarchal communication system of claim 1 wherein said second local area network comprises a Microlink Network.

6. The hierarchal communication system of claim 1 wherein said second communication means includes reservation access communication protocol.

7. The hierarchal communication system of claim 1 including means for preventing interference between said first communication means and said second communication means.

8. In a hierarchical communications network, the method of communicating with roaming computing devices comprising:
    communicatively connecting a plurality of base stations operating with different communication parameters;
    communicating between base stations and roaming computing devices with common communication parameters; and
    transmitting information to roaming computer devices that is indicative of communication parameters of neighboring base stations (operating with different communication parameters) so as to facilitate attachment of a roaming computing device associated with a first base station having a first set of communication parameters to a second base station having a second set of communication parameters as the roaming computing device moves from the vicinity of the first base station to the vicinity of the second base station.

9. The method of claim 8 wherein the communication parameters of neighboring base stations transmitted from base stations to roaming computing devices include:
    addresses of neighboring base stations; and
    cost of connection through neighboring base stations.

10. The method of claim 9 wherein the communication parameters of neighboring base stations transmitted from base stations to roaming computing devices include frequency hopping sequences of neighboring base stations.

11. The method of claim 9 wherein the communication parameters of neighboring base stations transmitted from base stations to roaming computing devices include spread spectrum spreading codes of neighboring base stations.

12. The method of claim 9 wherein the communication parameters of neighboring base stations transmitted from base stations to roaming computing devices include channel frequencies of neighboring base stations.

13. In a hierarchal communications network comprising a plurality of base stations and a plurality of mobile computing devices, a method of communicating between said base stations and said plurality of mobile computing devices within a predetermined time interval, said method comprising:
    communicating addresses of each of said plurality of mobile computing devices;
    communicating current communications channel parameters;
    controlling contention between said mobile computing devices with communication requirements;
    allocating time for asynchronous and scheduled communication in the same time interval;
    communicating with said mobile computing devices with communication requirements during the time allocated for asynchronous communication; and
    communicating with said at least one mobile computing device requiring scheduled communication during the time allocated for scheduled communication.

14. The method of claim 13 wherein spread spectrum frequency hopping is employed and wherein at least one time interval occurs in each frequency dwell.

15. The method of claim 14 including:
    initially monitoring the channel before address and parameter communication begins; and bypassing the rest of the time interval, in response to the initial monitoring, if channel interference above a particular threshold is detected.

16. The method of claim 13 wherein the length of the time intervals is optimized based on network parameters.

17. The method of claim 16 wherein said network parameters include data link layer packet size.

18. The method of claim 16 wherein said network parameters include the expected portions of asynchronous and scheduled communications.

19. The method of claim 16 wherein said network parameters include the maximum velocities of mobile computing devices in the networks.

20. The method of claim 13 wherein the step of controlling contention utilizes slotted reservation access.

21. The method of claim 20 wherein said slotted reservation access includes:
determining the number of access slots to be provided for poll requests; and
determining an access probability factor to be provided for poll requests, wherein a poll request is transmitted or deferred according to said access probability factor.

22. The method of claim 21 wherein the steps of determining the number of access slots and determining an access probability factor are responsive to network channel loading conditions.

23. The method of claim 21 wherein the number of access slots and the access probability factor are communicated in a reservation poll message near the beginning of said time interval.

24. The method of claim 13 wherein said mobile computing devices enter a sleep mode to preserve power when not requiring communication, the method of managing said sleep mode comprising the steps:
maintaining the internal clock of said mobile computing devices during sleep;
sleeping for a predetermined number of time intervals; and
waking from sleep to synchronize the Internal clock of said mobile computing devices and to cheek for pending messages.

25. The method of claim 24 wherein the method of managing said sleep mode further includes the step of waking from sleep a short time period prior to the anticipated synchronization signal whereby the mobile computing devices increase the likelihood that synchronization will be achieved.

26. A radio unit for operation in a communication system having a plurality of local area networks comprising:
a transceiver for communicating on a plurality of local area networks;
a memory device which stores a plurality of communication protocols, each communication protocol governing radio operation on one of the plurality of local area networks; and
a control processor which selects from the memory device one of the plurality of communication protocols to enable the transceiver to communicate on a corresponding one of the plurality of local area networks.

27. The radio unit of claim 26 wherein each of the communication protocols comprises means for establishing communication of the transceiver on the corresponding one of the plurality of local area networks.

28. The radio unit of claim 26 further comprising a power source which is controlled by the control processor, and wherein the control processor causes the radio unit to enter a power saving mode when the transceiver is not actively communicating on any of the plurality of local area networks.

29. A radio unit for operation in a communication system having a plurality of local area networks comprising:
a transceiver for communicating on a plurality of local area networks;
a memory device which stores a plurality of communication protocols, each communication protocol governing radio operation on one of the plurality of local area networks;
a control processor which selects from the memory device one of the plurality of communication protocols to enable the transceiver to communicate on a corresponding one of the plurality of local area networks; and
the control processor resolving conflicts among the plurality of communication protocols on a priority basis.

30. The radio unit of claim 29 wherein the control processor causes the radio unit to enter a low power consumption mode when the transceiver is not actively communicating on any of the plurality of local area networks.

31. A radio unit for operation in a communication system having a plurality of local area networks comprising:
a transceiver for communicating on a plurality of local area networks;
a memory device which stores a plurality of communication protocols, each communication protocol governing radio operation on one of the plurality of local area networks;
a control processor which selects from the memory device one of the plurality of communication protocols to enable the transceiver to communicate on a corresponding one of the plurality of local area networks; and
the control processor causing the radio unit to enter a low power consumption mode when the radio unit is not actively communicating on any of the plurality of local area networks.

32. A communication system comprising:
a first RF local area network operating using a first communication protocol;
a second RF local area network operating using a second communication protocol;
a radio unit having a control processor, a memory device, and a transceiver, the memory device storing the first and second communication protocols and the transceiver configured for communication on both the first and second RF local area networks;
a radio unit communicating on the first RF local area network pursuant to the first communication protocol while communicating on the second RF local area network pursuant to the second communication protocol; and
the control processor resolving conflicts between the first and second communication protocols.

33. The communication system of claim 32 wherein the radio unit participates as a slave on the first local area network and as a master on the second local area as a master.

34. The communication system of claim 33 wherein the first RF local area network comprises a premises local area network.

35. The communication system of claim 33 wherein the second RF local area network comprises a spontaneous local area network.

36. The communication system of claim 35 wherein the spontaneous local area network comprises a peripheral local area network.

37. The communication system of claim 35 wherein the spontaneous local area network comprises a vehicular local area network.

38. A communication system comprising:

a premises local area network;

a spontaneous local area network;

a radio unit having a control processor and a transceiver for communicating on both the premises local area network and the spontaneous local area network; and the radio unit participating as a slave to the premises local area network while participating as a master to the spontaneous local area network pursuant to control by the control processor.

39. The communication system of claim 38 wherein the spontaneous local area network comprises a peripheral local area network.

40. The communication system of claim 39 wherein the peripheral local area network uses narrow band, single frequency operation.

41. The communication system of claim 38 wherein the spontaneous local area network comprises a vehicular local area network.

42. The communication system of claim 41 wherein the vehicular local area network uses frequency hopping operation.

43. The communication system of claim 38 wherein the premises local area network uses frequency hopping operation.

44. A communication system comprising:

a first RF local area network operating using a first communication protocol;

a second RF local area network operating using a second communication protocol;

a radio unit having a control processor and a transceiver for communicating on both the first and second RF local area networks;

the radio unit communicating on the first RF local area network pursuant to the first communication protocol while communicating on the second RF local area network pursuant to the second communication protocol; and the control processor resolving conflicts between the first and second communication protocols and causing the radio unit to enter a state of low power consumption when the radio unit is not actively communicating on either the first or the second RF local area networks.

45. The communication system of claim 44 wherein the radio unit participates as a slave on the first local area network and as a master on the second local area network.

46. A communication system comprising:

a first RF local area network comprising a first plurality of network devices;

a second RF local area network comprising a second plurality of network devices;

a radio unit having a control processor and configured to communicate with both the first and second pluralities of network devices;

when within range of one of the second plurality of network devices, the radio unit participates as a master in the second RF local arena network pursuant to control by the control processor; and when within range of one of the first plurality of network devices, the radio unit participates as a slave in the first RF local area network pursuant to control by the control processor.

47. In a communications network comprising a plurality of nodes including at least one controlling node and at least one terminal node, a frequency hopping spread spectrum communications protocol comprising:

including at least one time interval for communications access in each frequency dwell;

resolving channel contention before actual data transmission, thereby minimizing collisions during data transmission and reducing inefficiencies due to packet loss and retransmission time;

wherein the step of resolving channel contention includes slotted reservation access;

wherein said slotted reservation access includes determining the number of access slots to be provided for poll requests; and wherein said slotted reservation access includes determining an access probability factor to be provided for poll requests, wherein a poll request is transmitted or deferred according to said access probability factor.

48. The protocol of claim 47 wherein the steps of determining the number of access slots and determining an access probability factor are responsive to network channel loading conditions.

49. The protocol of claim 47 wherein the number of access slots and the access probability factor are communicated in a reservation poll message near the beginning of said time interval.

50. In a communications network comprising a plurality of nodes including at least one controlling node and at least one terminal node, a frequency hopping spread spectrum communications protocol comprising:

including at least one time interval for communications access in each frequency dwell;

resolving channel contention before actual data transmission, thereby minimizing collisions during data transmission and reducing inefficiencies due to packet loss and retransmission time;

wherein the step of resolving channel contention includes slotted reservation access; and wherein the step of resolving channel contention includes capture means for granting channel access to one node over another node in a collision condition based on significantly greater signal strength.

51. In a communications network comprising a plurality of nodes including at least one controlling node and at least one terminal node, a frequency hopping spread spectrum communications protocol comprising:

including at least one time interval for communications access in each frequency dwell;

resolving channel contention before actual data transmission, thereby minimizing collisions during data transmission and reducing inefficiencies due to packet loss and retransmission time;

wherein the step of resolving channel contention includes slotted reservation access; and wherein the addresses of devices desiring communication are placed in a polling queue and polled sequentially.

52. The protocol of claim 51 wherein the addresses are placed in the polling queue according to a fixed order with addresses of active nodes with outbound messages first, addresses with inbound messages from previous time intervals second, and addresses with inbound messages from the current time interval third.

53. The protocol of claim 51 wherein data is transferred in fragments and wherein a data message consists of one or more fragments.

54. The protocol of claim 53:

wherein a clear message is sent when the polling queue is empty; and wherein nodes may attempt to gain access to the communications channel after the channel is determined clear by receipt of the clear message according to single slot reservation access procedures before the end of the time interval.

55. The protocol of claim 53 wherein nodes may attempt to gain access to the communications channel after the channel is determined clear by detecting a quiet interval not less than the duration of a poll message plus a maximum fragment length after a channel reservation period has expired, according to single slot reservation access procedures before the end of the time interval.

56. In a communications network comprising a plurality of nodes including at least one controlling node and at least one terminal node, a frequency hopping spread spectrum communications protocol comprising:

including at least one time interval for communications access in each frequency dwell:

supporting synchronous communication in each of said frequency dwell time intervals;

supporting scheduled, time-bounded communication in each of said frequency dwell time intervals;

wherein the number of access slots allocated for synchronous communication and for scheduled, time-bounded communication is determined and transmitted in a reservation poll message early in said time intervals; and wherein the number of access slots allocated for scheduled, time-bounded communication is based on the length of said time intervals.

* * * * *